United States Patent [19]
Strolle et al.

[11] Patent Number: 5,596,418
[45] Date of Patent: Jan. 21, 1997

[54] DEEMPHASIS AND SUBSEQUENT REEMPHASIS OF HIGH-ENERGY REVERSED-SPECTRUM COMPONENTS OF A FOLDED VIDEO SIGNAL

[75] Inventors: Christopher H. Strolle, Glenside, Pa.; Allen L. Limberg, Ringoes, N.J.; Werner F. Wedam, Lawrenceville, N.J.; Raymond Schnitzler, Highland Park, N.J.; Hermann J. Weckenbrock, Bordentown, N.J.; Jung W. Ko, Lawrenceville, N.J.; Jong K. Yun, Suwon, Rep. of Korea

[73] Assignee: SamSung Electronics Co., Ltd., Suwon, Rep. of Korea

[21] Appl. No.: 478,766

[22] Filed: Jun. 7, 1995

Related U.S. Application Data

[60] Division of Ser. No. 87,362, Jul. 8, 1993, which is a continuation-in-part of Ser. No. 604,493, Oct. 26, 1990, abandoned, and a continuation-in-part of Ser. No. 635,197, Jan. 2, 1991, abandoned, which is a continuation-in-part of Ser. No. 569,029, Aug. 17, 1990, Pat. No. 5,113,262.

[51] Int. Cl.$^6$ .......................................... H04N 9/79
[52] U.S. Cl. .............................. 386/9; 358/316; 358/318; 348/427; 348/438; 348/663; 348/666; 348/708; 348/712; 386/10; 386/33; 386/44
[58] Field of Search .................... 358/310, 315, 358/316, 318; 348/426, 427, 436, 437, 438, 663, 666, 708, 712; H04N 9/79, 9/797

[56] References Cited

U.S. PATENT DOCUMENTS

| | | | |
|---|---|---|---|
| 4,621,286 | 11/1986 | Reitmeier et al. | 348/436 |
| 4,660,072 | 4/1987 | Fukinuki | 348/436 |
| 4,668,988 | 5/1987 | Sasaki et al. | 358/315 |
| 4,720,751 | 1/1988 | Peters | 358/310 |
| 4,742,386 | 5/1988 | Wilkinson | 348/396 |
| 4,745,460 | 5/1988 | Fukinuki | 348/436 |
| 4,811,116 | 3/1989 | Baumeister | 358/310 |
| 4,831,463 | 5/1989 | Faroudja | 358/310 |
| 4,870,481 | 9/1989 | Kawamata | 348/451 |
| 4,885,631 | 12/1989 | Fukinuki et al. | 348/436 |
| 4,891,699 | 1/1990 | Hamada et al. | 358/314 |
| 4,943,848 | 7/1990 | Fukinuki | 348/436 |
| 4,963,991 | 10/1990 | Honjo | 358/335 |
| 4,984,093 | 1/1991 | Schmidtmann et al. | 358/390 |
| 5,031,030 | 7/1991 | Hurst, Jr. | 348/427 |
| 5,063,457 | 11/1991 | Ishikawa et al. | 358/330 |
| 5,067,009 | 11/1991 | Ganse | 348/487 |
| 5,113,262 | 5/1992 | Strolle et al. | 358/310 |
| 5,161,030 | 11/1992 | Song | 358/310 |
| 5,182,642 | 1/1993 | Gersdorff et al. | 348/403 |

FOREIGN PATENT DOCUMENTS

| | | |
|---|---|---|
| 0015499A1 | 9/1980 | European Pat. Off. . |
| 0484154A2 | 5/1992 | European Pat. Off. . |

OTHER PUBLICATIONS

Journal of British I.R.E. on "Reduction of Television Bandwidth by Frequency–Interlace", Feb. 1960, pp. 127–136 (disclosed by Howson and Bell).

*Primary Examiner*—Thai Q. Tran
*Assistant Examiner*—Khoi Truong
*Attorney, Agent, or Firm*—Robert E. Bushnell, Esq.

[57] ABSTRACT

A system for reproducing a luminance signal from a medium containing a previously recorded luminance signal with a high-frequency portion thereof compressed in dynamic range includes a circuit for recovering that luminance signal from the medium. Filtering is done to separate the low-frequency and compressed-in-dynamic-range high-frequency portions of the recovered luminance signal from each other. A corer responds to the separated compressed-in-dynamic-range high-frequency portion of the recovered luminance signal to provide a cored high-frequency portion with expanded dynamic range and reduced noise. The level of the cored high-frequency portion with expanded dynamic range and reduced noise is then boosted by a predetermined amount to compensate for energy losses during the compression of the dynamic range and added back to the low-frequency portion of the recovered luminance signal to reproduce a full-band luminance signal with at least partially restored dynamic range for high-frequencies and without readily visible high-frequency noise.

19 Claims, 20 Drawing Sheets

ORIGINAL INPUT SIGNAL

FOLDING (SUBNYQUIST SAMPLING)

FIXED DEEMPHASIS OF FOLDED HIGH LUMA

ADAPTIVE DEEMPHASIS OF FOLDED HIGH LUMA

ADAPTIVE DEEMPHASIS OF FOLDED HIGH LUMA

DEEMPHASIS AND SUBSEQUENT REEMPHASIS OF HIGH-ENERGY REVERSED-SPECTRUM COMPONENTS OF A FOLDED VIDEO SIGNAL

This a divisional of application Ser. No. 08/087,362, filed 8 Jul. 1993 which is a continuation-in-part of U.S. patent application Ser. No. 07/604,493 filed 26 Oct. 1990, now abandoned, and is a continuation-in-part of U.S. patent application Ser. No. 07/635,197 filed 2 Jan. 1991, now abandoned, as a continuation-in-part of U.S. patent application Ser. No. 07/569,029 filed 17 Aug. 1990 and issued 12 May 1992 as U.S. Pat. No. 5,113,262.

The inventions described herein relate to circuitry for deemphasizing high frequencies in a luminance signal and for reemphasizing high frequencies in a reproduced luminance signal, useful in a system for transmitting a wide bandwidth luminance signal through a narrow bandwidth channel in a backward compatible manner.

RELATED PATENTS & PATENT APPLICATIONS

The subject matter of the present application is related to the subject matter disclosed and claimed in the following prior co-pending U.S. patent applications, the claimed inventions of which were commonly assigned to or under an obligation of assignment to the assignee of the present application at the time the respective inventions were made, and in which prior applications at least one named inventor is in common with the present application: Ser. No. 531,070 filed May 31, 1990; Ser. No. 545,486 filed Jun. 29, 1990; Ser. No. 599,566 filed Oct. 18, 1990; Ser. No. 604,493 filed Oct. 26, 1990; Ser. No. 607,709 filed Nov. 1, 1990; Ser. No. 635,197 filed Jan. 2, 1991; Ser. No. 711,980 filed Jun. 7, 1991; Ser. No. 819,890 filed Jan. 13, 1992; Ser. No. 839,542 filed Feb. 24, 1992; Ser. No. 881,131 filed May 11, 1992; Ser. No. 910,491 filed Jul. 8, 1992; Ser. No. 996,525 filed Dec. 23, 1992; and Ser. No. 059,765 filed May 11, 1993, the disclosures of which prior applications are incorporated hereinto by reference thereto.

The specification and drawing of U.S. patent application Ser. No. 008,813 filed 25 Jan. 1993 entitled ADAPTIVE DEEMPHASIS AND REEMPHASIS OF HIGH FREQUENCIES IN VIDEO TAPE RECORDING, UTILIZING A RECORDED CONTROL SIGNAL, and assigned to Samsung Electronics Co., Ltd., are appended hereto for purposes of incorporation into this specification. The specification and drawing of U.S. patent application Ser. No. 819,890 filed 13 Jan. 1992 entitled DIGITAL MODULATORS FOR USE WITH SUB-NYQUIST SAMPLING OF RASTER-SCANNED SAMPLES OF IMAGE INTENSITY, and assigned to Samsung Electronics Co., Ltd., are appended hereto for purposes of incorporation into this specification.

The specification and drawing of U.S. Pat. No. 5,113,262 issued 12 May 1992 to C. H. Strolle et alii and entitled VIDEO SIGNAL RECORDING SYSTEM ENABLING LIMITED BANDWIDTH RECORDING AND PLAYBACK are incorporated herein by reference. The specification and drawing of U.S. Pat. No. 5,218,449 issued 8 Jun. 1993 to J. W. Ko et alii and entitled NERVOUS CLOCK SIGNAL GENERATOR FOR VIDEO RECORDER are incorporated herein by reference. The inventions described and claimed in U.S. Pat. Nos. 5,113,262 and 5,218,449 were commonly assigned to or under an obligation of assignment to the assignee of the current application at the times the respective inventions were made by the current applicants and their co-inventors.

BACKGROUND OF THE INVENTION

The invention relates generally to a video signal processing system for processing a wide bandwidth video signal into a reduced bandwidth signal suitable for transmission and/or recording via a narrow bandwidth signal medium, whereby the information content of the wide bandwidth video signal is retained in the reduced bandwidth signal and the reduced bandwidth signal is compatible with conventional narrow bandwidth reception apparatus, and for receiving and/or reproducing and processing the transmitted reduced bandwidth signal for recovering therefrom the information content of the original wide bandwidth signal. The invention in certain of its aspects relates more particularly to signal processing useful in a narrow bandwidth format video cassette recorder (VCR), for converting a wide bandwidth input video signal to a reduced bandwidth video signal containing the information content of the input wide bandwidth video signal within the reduced bandwidth, whereby the reduced bandwidth video signal may be recorded and reproduced conventionally by such narrow bandwidth format VCR. The invention in other of its aspects relates more particularly to processing the reproduced narrow bandwidth video signal to recover the information content of the wide bandwidth video signal therefrom, whereby a wide bandwidth video signal may be reconstructed for yielding improved video bandwidth of the reproduced signal comparable to the full bandwidth of the input video signal, while maintaining backward compatibility of the recorded reduced bandwidth video signal for playing back video cassettes recorded by this improved video signal processing system on available conventional narrow bandwidth format VCRS or video cassette players (VCPs).

Conventional consumer type VCRs record video information onto video tape cassettes in one of several formats. The well-known VHS format system uses a relatively narrow bandwidth format and produces degraded picture quality in comparison to standard broadcast video chiefly because the recorded VHS format video signal has insufficient horizontal resolution. An enhanced VHS format type recording system, popularly called Super VHS or S-VHS, produces enhanced picture quality by recording a wider bandwidth video signal on the video tape cassette using a higher FM carrier frequency for the luminance information, thus yielding improved picture resolution. Such a format requires a higher FM carrier frequency, higher quality tape in the cassette and higher quality recording and playback mechanisms, heads and circuitry. However, the S-VHS format is not backward compatible with standard VHS format VCRs. I.e., although an S-VHS format VCR can reproduce (playback) cassettes recorded on either S-VHS format or standard VHS format VCRS, a standard VHS format VCR or VCP cannot play back cassettes recorded on S-VHS format VCRS.

It is desirable that an improved video recording system be able to record wider bandwidth video signals on a standard quality cassette than those recordable by conventional narrow bandwidth VCRs, while still maintaining backward compatibility with conventional narrow bandwidth VCRs, and not require especially high quality magnetic tape or record and playback mechanisms. That is, it is desirable that normal-quality, narrow-bandwidth recording tape medium video cassettes may be recordable with wider-bandwidth, higher-frequency video information using the improved system and be able to be compatibly played back by conventional narrow bandwidth VCRs without producing noticeable visual artifacts in the reproduced image, even if the conventional VCR may not be able to reproduce the full-bandwidth signal recorded on such a cassette.

It has long been a goal of video engineers to increase the amount of information transmitted through a given narrow-band channel, such as an NTSC signal channel, which is limited to a nominal 4.2 Mhz of useful bandwidth. Because the frame and line rates (temporal and vertical resolution) usually are fixed, restricting the bandwidth translates into restricting the horizontal resolution. In some cases, the nominal bandwidth of the channel is limited to 3 MHz or even 2.5 MHz, resulting in an image with insufficient horizontal resolution.

It has long been recognized that in scanned television systems, the signal energy is concentrated spectrally in the spatio-temporal domain at periodic intervals according to the scanning frequencies, and the video spectrum has so-called "holes" or gaps between these discrete signal areas. In these gaps, which gaps also occur at regular intervals, the signal energy is generally comparatively small. The NTSC composite (i.e., "colorplexed") color video system represents a system which uses one of these "holes" to carry the color information. In the NTSC system, the chrominance or "chroma" signal containing the color information is transmitted combined with the baseband video as a pair of color-difference or mixture signals encoded in quadrature amplitude modulation of a suppressed nominally 3.58 MHz color subcarrier. I.e., the color-difference or mixture signals are encoded in respective amplitude-modulation sidebands of a pair of in-phase and quadrature color subcarriers, both of which subcarriers are suppressed. The frequency of the color subcarrier (3.579545 MHz, which is 227.5 times the horizontal scanning frequency of 15.734 kHz) was very carefully selected so that a minimum disturbance occurs when a color video signal is displayed on a black-and-white receiver. Specifically, the NTSC color subcarrier frequency is interleaved horizontally, vertically, and temporally with the luminance signal spectrum to minimize crosstalk and intermodulation between the luminance and chrominance components of the composite video signal.

It was recognized at around the time of the adoption of the NTSC colorplexed system that such frequency spectrum "holes" could also be used to transmit additional horizontal information to increase the horizontal resolution of the reproduced image. In such systems, the higher frequency horizontal information is interleaved spectrally with the lower frequency horizontal information in a similar manner as the chrominance information is in the NTSC color system. An article entitled "REDUCTION OF TELEVISION BANDWIDTH BY FREQUENCY INTERLACE" by E. A. Howson and D. A. Bell in Journal of the British I. R. E., February, 1960, pp. 127–136 contains a description of such a system which utilizes analog signal processing techniques. The artifacts resulting from the frequency interleaving manifest themselves as annoying dot crawl patterns in such a system, so it does not accurately reproduce the full-bandwidth image in its original form.

German Patent Publication No. 82100286.2 entitled "Verfahren zum Ubedagen von Fernsehsignalen uber einen genormten bandbreitebegrenzten Ubertragunskanal und Anordnung zum Durchfuhren des Verfahrens," by Professor Wendland et alii describes principles of offset subsampling and bandwidth compression as applied to advanced television systems. This Jan. 1, 1982, patent publication also describes techniques for implementing television systems in accordance with the principles described therein. Sub-Nyquist sampling is done by replacing every odd sample in a first video line with a zero-valued sample, and then on the next line, replacing every even sample with a zero-valued sample. On alternate frames, the patterns are reversed. A television system using sub-Nyquist sampling at the transmitter can use comb filters in the receivers to suppress dot crawl patterns arising from spectrum interleaving.

Theoretically, the Howson and Bell frequency folding technique and the sub-Nyquist sampling technique are equivalent, when a folding carrier frequency $2f_F$ used during spectrum reversal is one-half the sampling frequency $f_S$. The sampled-data digital systems using the sub-Nyquist sampling technique provided improved reconstruction of the received image because of the existence of line and frame combing techniques, which had not been developed at the time of the Howson and Bell system. The sub-Nyquist sampling techniques, however, were developed for totally sampled data digital systems as data reduction (i.e., compression) techniques in digital systems, and the signals generated by these sampling techniques were not generally intended to be passed through a narrowband analog channel.

An article, "DEVELOPMENT OF HDTV RECEIVING EQUIPMENT BASED ON BAND COMPRESSION TECHNIQUE (MUSE)", by Kojima et alii in IEEE Transactions on Consumer Electronics, Vol. CE-32, No. 4, November 1986, pp.759–768, describes another data compression scheme in which compresses bandwidth by sampling every other pixel each frame, but sampling each pixel once every other frame. This scheme works well only for non-moving images. For moving images, a motion vector is developed, and the actual rate of sampling of each pixel is adaptively varied in response to the motion vector so that a sample of the pixel is transmitted every other frame on the average, but more often when that pixel is representing a moving image.

U.S. Pat. No. 4,831,463 issued 16 May 1989 to Y. C. Faroudja and entitled VIDEO PROCESSING IN WHICH HIGH FREQUENCY LUMINANCE COMPONENTS ARE FOLDED INTO A MIDBAND SPECTRUM describes apparatus for processing a video signal having a predetermined bandwidth in order to pass the video information contained therewithin through a limited-bandwidth channel, such as magnetic tape. The Faroudja apparatus takes advantage of the fact that the luminance and chrominance components of a composite video signal are separately recorded on electromagnetic tape in a recording system of the color-under type such as the VHS recording system. In a tape recording system of the color-under type the chrominance components separated from the composite video signal are down-converted in frequency to form a color-under signal recorded directly on the tape; and the luminance components separated from the composite video signal are used to modulate the frequency of a luma carrier recorded on the tape as a bias frequency. In the apparatus described in this patent, a video signal preprocessor includes a comb filter to remove remnant energy in the spectral holes between spectrally active areas in the luminance signal spectrum that would be occupied by chrominance in the NTSC composite video signal. A folding circuit then folds the baseband video luminance signal about a predetermined folding frequency $f_F$ selected so that aliases of the baseband LUMINANCE signal, generated by heterodyning it with a $2f_F$ folding carrier at twice the frequency of the $f_F$ folding frequency, are placed into the spectral holes left after the chrominance separation and comb filtering. A lowpass filter then filters the resulting folded video signal so that its bandwidth is about one-half the bandwidth of the original video signal. The resulting signal may then be transmitted through the limited-bandwidth channel.

The Faroudja '463 patent further describes a post-processor which receives the folded signal from the limited-bandwidth channel. The post-processor includes an unfolding circuit which unfolds the received signal about a predetermined unfolding frequency $f_U$, which is the same as the folding frequency $f_F$. A comb filter then processes the unfolded signal to remove the alias components resulting from the unfolding process. The signal produced by this comb filter closely approximates the original video signal in terms of the bandwidth and information content.

It is interesting to note that the Howson and Bell article describes two bandwidth reduction techniques for video luminance signals by frequency interlacing or interleaving. In a first technique described, the video luminance signal spectrum is divided into two equal half-bands (i.e., band-split at frequency $f_F$), and the upper half-band (i.e., the highband luminance from frequency $f_F$ to frequency $2f_F$) is used to modulate a sub-carrier which has its frequency set to be near the upper frequency limit of the normal video band (i.e., near $2f_F$). The lower sideband of the modulator output is selected and combined with the original lower half-band. The frequency-interlaced signal resulting from such combining contains all of the original luminance signal information, but in one-half the bandwidth of the original signal, and is therefore suitable for transmission over a reduced bandwidth channel.

In a second technique described by Howson and Bell, instead of dividing the main video luminance signal into two half-bands and modulating the $2f_F$ sub-carrier with the high-frequency half-band only, the entire main video (i.e., baseband) luminance signal is used to modulate the $2f_F$ sub-carrier. The lower sideband of the modulator output signal contains the required interleaved signal in correct frequency relationship with the main baseband video signal. If the modulator output is added to the main signal and the resultant added signal is passed through a lowpass filter having its break frequency at approximately one-half the sub-carrier frequency, the lowpass filtered output signal consists of the correct composite reduced bandwidth signal (with the sub-carrier suppressed). Howson and Bell teach that this second technique avoids the need for using complementary lowpass and bandpass filters as required by the first technique employing band-splitting. Howson and Bell adopted this second technique in a described experimental apparatus, though the summary abstract appearing in the Howson and Bell article implies that the first technique using band-splitting was employed.

The folding/unfolding system described in the Faroudja '463 patent is similar in principle to the second technique described and adopted by Howson and Bell, in the following regards. Howson and Bell selected the folding modulation sub-carrier frequency to be an odd multiple of one-half the line scan frequency. In Faroudja '463 the frequency of the folding heterodyne oscillator/mixer, or of the sub-Nyquist sampling clock applied to the multiplier used as the folding modulator, is selected to be a harmonic of an odd multiple of the line and frame scan rate. Any harmonic of an odd multiple of the line and frame scan rate is an odd multiple of one-half the line scan frequency, supposing there to be an odd number of scan lines in each frame. In both systems the folding modulation is performed on the entire baseband luminance signal and lowpass filtering is employed after folding to remove frequencies greater than one-half the folding frequency from the folded signal.

In Howson and Bell the high-band luminance is folded into spectral "holes" available because the television signals are luminance-only signals for black-and-white television. In Faroudja '463 the high-band luminance is folded into spectral "holes" from which the NTSC chrominance sub-carrier has been removed. However, because there may still be residual chroma sidebands present in those areas which might interfere with the folding and unfolding processes, the inventors have found it to be preferable instead to fold the high-band luma into the spectral "holes" described by Fukinuki. Then, any residual chroma components when unfolded will be in complementary phase on successive fields and will be optically canceled in the display monitor. In order to fold the high-band video signal into the same band as the low-band video signal, so as to occupy the Fukinuki portions of the band, the folding carrier is chosen to be a harmonic of an even multiple of both the line and the frame scan rates, which harmonic reverses phase from scan line to scan line and from frame to frame. That is, the phase of the folding carrier is reversed at the scan line rate, each reversal being at a respective instant between scan lines.

Both the Howson and Bell article and the Faroudja '463 patent describe folding systems which, if incorporated into an improved VCR, produce cassettes which cannot be played back on conventional VCRs without introducing unacceptable artifacts into the displayed image. This is primarily due to the amplitude of the folded high-frequency components present within the spectrum of the low-frequency components on the previously recorded cassette. The magnitude of the folded high-frequency components is sufficiently high as to introduce intolerable artifacts and degradation (dot crawl, twinkling, line flicker, etc.) into an image display produced from a video signal from which the folded high-frequency components are not properly removed.

Howson and Bell were not particularly concerned with backward compatibility of the interleaved signal. In fact, they suggested including a pre-emphasis filter for boosting the interleaved high-frequency components of the folded luminance signal in order to minimize the effects of crosstalk from the low-frequency luminance components during the transmission of the folded signal through the channel and to minimize sub-carrier interference at the receiver. If a video cassette recorded by a VHS format VCR modified to include the system taught by Howson and Bell were played back on a standard VHS format VCR, the pre-emphasized high-frequency components would produce an even more objectionable image on the television screen than that produced by the Faroudja system.

Thus, the need has remained for improving the video resolution over that available with the currently used, limited-bandwidth video recording and playback techniques, media and mechanisms in a manner which retains backward playback compatibility with existing VCRs and VCPs. Backward playback compatibility is greatly improved by lowering the amplitude of the high-frequency portion of the luminance signal, before or during its being folded into the low-frequency component, a technique called "deemphasis". The deemphasized folded luminance signal is then combined with the chrominance signal and the combined signal recorded on the video tape. Upon playback, the folded deemphasized luminance signal is separated from the chrominance signal. The separated luminance signal is then unfolded, and the amplitude of the high-frequency portion is increased to restore it to substantially its original level, a technique called "reemphasis". If such a video tape is played back on a VCR which does not have the unfolding and reemphasis circuitry, the artifacts caused by the presence of the high-frequency portion of the luminance signal within the low-frequency portion can be reduced to levels that are not objectionable. This is provided for by reducing the amplitude of the high-frequency portion of the luminance signal, which causes the artifacts, to a reduced level either prior to the folding procedure or during the folding procedure.

U.S. Pat. No. 5,113,262 describes a video signal recording system which includes an adaptive deemphasis circuit in the luminance signal record path and an adaptive reemphasis circuit in the playback path. The adaptive deemphasis circuit in U.S. Pat. No. 5,113,262 includes circuitry for detecting the level of the high-frequency portion of the luminance signal, and circuitry for variably reducing the level of the high-frequency portion in response to the detected signal level. If the level of the high-frequency portion of the luminance signal is high, then the level of the high-frequency portion is reduced by a maximum amount; if the level is low, then the level is reduced by a minimum amount. This operation can be referred to as "compression of the dynamic range of luminance signal high frequencies".

A problem that has subsequently been noted by the inventors with regard to the adaptive deemphasis circuit described in U.S. Pat. No. 5,113,262 arises when recording composite video signals that have accompanying noise in the upper luminance frequencies. The circuitry for detecting the level of the high-frequency portion of the luminance signal detects the noise is detected, and the level of the high-frequency portion is reduced in response to the detected noise. This undesirably wipes out low-level high-frequency luminance detail, causing textured surfaces to appear smooth. This problem is solved in an improved adaptive deemphasis circuit that embodies an aspect of the invention. In this improvement a threshold circuit is introduced after the detector that detects the amplitude of the high-frequency portion of the luminance signal component. This threshold circuit operates as a corer, or base-line clipper. Accordingly, the high-frequency portion of the luminance signal is not deemphasized until its amplitude exceeds a threshold level. This threshold level is set to be above the level of noise in the high-frequency portion of the luminance signal component of the composite video signal received for recording.

An adaptive deemphasis circuit and control signal generator constructed in accordance with this aspect of the invention can also be useful in implementing the video tape recording and playback systems described in U.S. patent application Ser. No. 008,813 filed 25 Jan. 1993 by Christopher H. Stroile and Raymond A. Schnitzler, and entitled ADAPTIVE DEEMPHASIS AND REEMPHASIS OF HIGH FREQUENCIES IN VIDEO TAPE RECORDING, UTILIZING A RECORDED CONTROL SIGNAL. U.S. patent application Ser. No. 008,813 is a continuation-in-part of U.S. patent application Ser. No. 604,494 filed 26 Oct. 1990 by Strolle and Schnitzler, and entitled ADAPTIVE DEEMPHASIS AND REEMPHASIS OF HIGH FREQUENCIES IN A VIDEO SIGNAL UTILIZING A RECORDED CONTROL SIGNAL. The inventions described and claimed in both these Strolle and Schnitzler applications were commonly assigned to or under an obligation of assignment to the assignee of the current application at the times the respective inventions were made by the current applicants and their co-inventors.

The adaptive reemphasis circuit in the playback path of U.S. Pat. No. 5,113,262 performs an operation which can be referred to as "expansion of the dynamic range of luminance signal high frequencies", which is substantially the inverse of the "compression of the dynamic range of luminance signal high frequencies" operation carried out by the adaptive deemphasis circuit during recording. The adaptive deemphasis and adaptive reemphasis procedures described in U.S. Pat. No. 5,113,262 are carried out in response to the high-frequency content of the luminance signal in static as well as dynamic portions of the image. The adaptive reemphasis circuit in the playback path includes circuitry for detecting the level of the high-frequency portion of the unfolded luminance signal, and circuitry for variably increasing the level of the high-frequency portion in response to the detected level. If the level of the high-frequency portion of the unfolded luminance signal is relatively high, then the level is boosted by the maximum amount; if the level is relatively low, then the level is boosted by the minimum amount. Because when the level of the high-frequency portion of the luminance signal is high it is reduced by a maximum amount and when it is low it is reduced by a minimum amount, the level of the high-frequency portion is controlled to always be at about the same level. This deemphasized luminance signal is then folded, recorded, played back and unfolded. Each of these steps may introduce noise.

It is desirable to produce the highest quality image possible in a VCR with unfolding circuitry in the playback path, while maintaining backward compatibility with VCRs without the unfolding circuitry in the playback path. The compression of the dynamic range of luminance signal high frequencies done before recording a video tape should be compensated for by a complementary expansion of the dynamic range of luminance signal high frequencies reproduced from the video tape. This requires that the amount by which the high-frequency portion of the luminance signal is reduced in the record path substantially corresponds to the amount by which the high-frequency portion of the luminance signal is increased in the playback path. A solution described in U.S. Pat. No. 5,113,262, includes an adaptive reemphasis circuit in the playback path. The level of the high-frequency portion of the reproduced luminance after its unfolding is detected and used to control the high-frequency gain of the adaptive reemphasis circuit. This circuit at times responds unfavorably to noise introduced in the record and playback process. If the introduced noise changes the detected level of the high-frequency portion, the reemphasis function is no longer substantially the inverse of the deemphasis function over the entire dynamic range of luminance high frequencies. Solutions to this problem are provided by reemphasis circuits that are constructed in accordance with aspects of the present invention.

Another solution to this problem is described in described in U.S. patent application Ser. No. 604,494 filed 25 Jan. 1993. A control signal, which is generated for controlling the deemphasis of the high-frequency portion of the luminance signal during its processing before being recorded, is encoded for recording on the video tape. During playback from the video tape, the control signal is reproduced and used for controlling the reemphasis of the high-frequency portion of the luminance signal. This avoids adaptive reemphasis circuitry that responds unfavorably to noise introduced in the record and playback process, but complicates the recording and playback procedures considerably.

Recording and playback procedures for transmitting auxiliary signals, such as a control signal for controlling the reemphasis of the high-frequency portion of the luminance signal during playback, are described in U.S. patent application Ser. No. 059,765 filed 11 May 1993 by Christopher H. Strolle, Werner F. Wedam, Jung-Wan Ko, Chandrakant B. Patel and Allen L. Limberg, entitled FREQUENCY-MULTIPLEXING FM LUM A SIGNAL WITH COLOR AND SECOND UNDER SIGNALS HAVING OVERLAPPING FREQUENCY SPECTRA, and assigned to Samsung Electronics Co., Ltd., pursuant to obligations of the inventors to so assign their invention at the time of its making. U.S. patent application Ser. No. 027,772 is a continuation-in-part of their U. S. patent application Ser. No. 531,070 filed 31 May 1990, entitled CHROMA CHANNEL ENCODED WITH AUXILIARY SIGNALS, and assigned to Samsung Electronics Co., Ltd., pursuant to obligations of the inventors to so assign their invention at the time of its making.

Accordingly, an improvement of the adaptive reemphasis circuitry described in U.S. Pat. No. 5,113,262 is desirable to have, which improvement does not respond unfavorably to noise introduced in the record and playback process, and which improvement does not require a control signal to be encoded for recording on the video tape or to be decoded when playing back from the video tape.

SUMMARY OF THE INVENTION

A first aspect of the invention concerns an adaptive deemphasis circuit for reducing the amplitude of the high-frequency portion of a luminance signal respective to its low-frequency portion, for producing a backward compatible video tape recording wherein the high-frequency portion of the luminance signal is folded into its low-frequency portion to form a folded-spectrum luminance signal for modulating the frequency of a luminance carrier wave.

In accordance with a second aspect of the invention, an adaptive deemphasis circuit embodying the first aspect of the invention can be improved so as to be non-responsive to noise in the high-frequency portion of the luminance signal component of the composite video signal received for recording. In this improvement a threshold circuit is introduced after the detector that detects the amplitude of the high-frequency portion of the luminance signal component. This threshold circuit operates as a corer, or base-line clipper. Accordingly, the high-frequency portion of the luminance signal is not deemphasized until its amplitude exceeds a threshold level which is above the level of noise in the high-frequency portion of the luminance signal component of the composite video signal received for recording.

A third aspect of the invention concerns adaptive reemphasis circuits for reproducing a luminance signal from a medium containing a previously recorded luminance signal with its high-frequency portion compressed in dynamic range and folded into its low-frequency portion.

A fourth aspect of the invention concerns adaptive reemphasis circuits embodying the third aspect of the invention and avoiding the emphasizing of noise during reemphasis of the high-frequency portion of the luminance signal compressed in dynamic range during recording. Filtering is done to separate the low-frequency portion of the recovered luminance signal and its compressed-in-dynamic-range high-frequency portion from each other. A corer responds to the separated compressed-in-dynamic-range high-frequency portion of the recovered luminance signal to provide a cored high-frequency portion with expanded dynamic range and reduced noise. The level of the cored high-frequency portion with expanded dynamic range and reduced noise is then boosted by a predetermined amount to compensate for energy losses in the coring procedure and added back to the low-frequency portion of the recovered luminance signal to reproduce a full-band luminance signal with at least partially restored dynamic range for high-frequencies and without readily visible high-frequency noise.

Further aspects of the invention concern the preferred choice of the folding carrier frequency to be a harmonic of an even multiple of both the line and the frame scan rates, which harmonic is then reversed in phase at the scan line rate, each reversal being at a respective instant between scan lines, to form the folding carrier. Such folding carrier conditions the folding circuitry for folding a high-band luminance signal into the Fukinuki holes of the low-band luminance signal during recording. A corresponding unfolding carrier is used during playback for unfolding the high-band luminance signal from the Fukinuki holes of the low-band luminance signal, after which the low-band and high-band luminance signals are combined to recover a full-band luminance signal.

Figure 25:
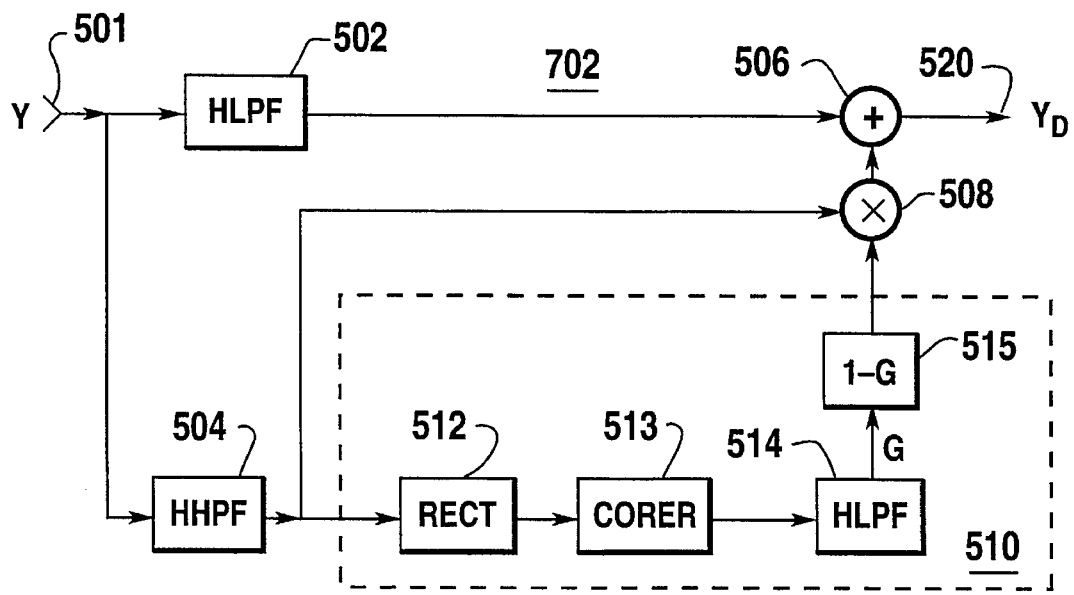
FIG. 25 is a block diagram of a particular adaptive deemphasis circuit of the type shown in FIG. 16, which FIG. 25 circuit embodies an aspect of the invention and can be used in the video signal recording/playback system illustrated in FIG. 1.
Figure 27:
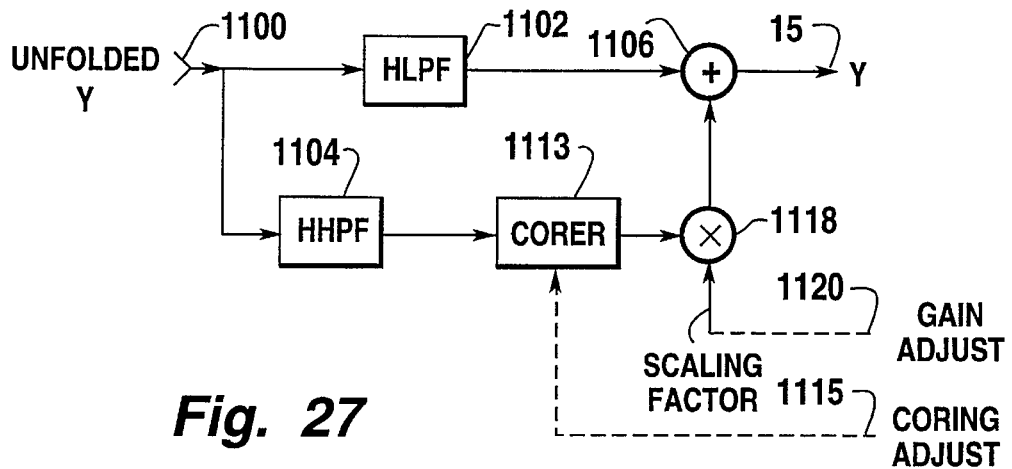
Figure 28:
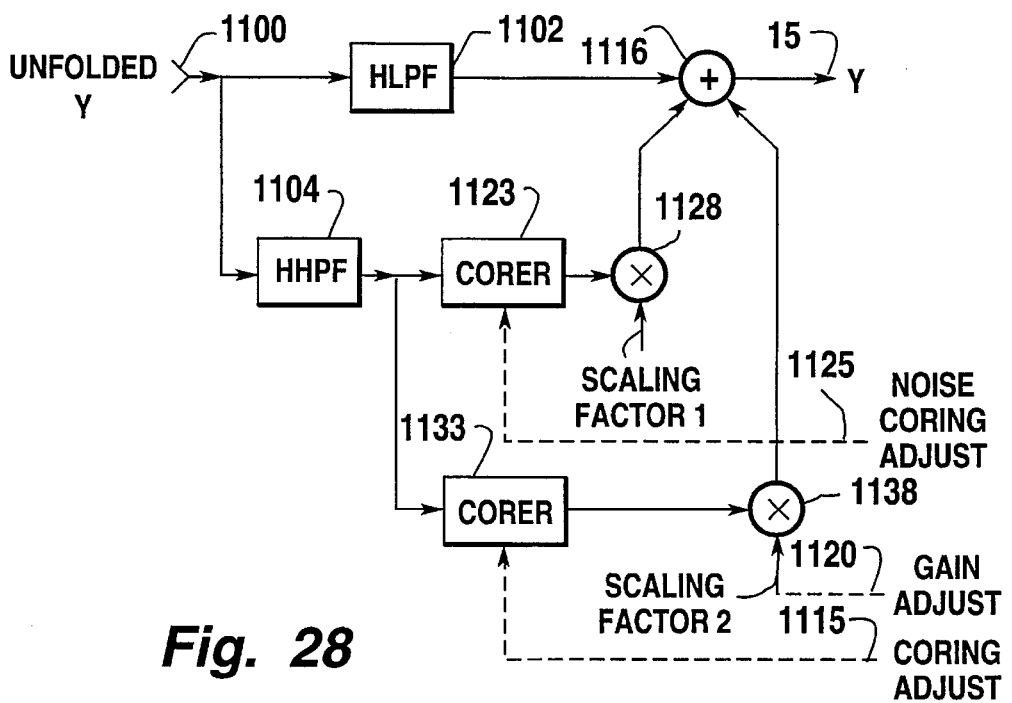
Figure 29:
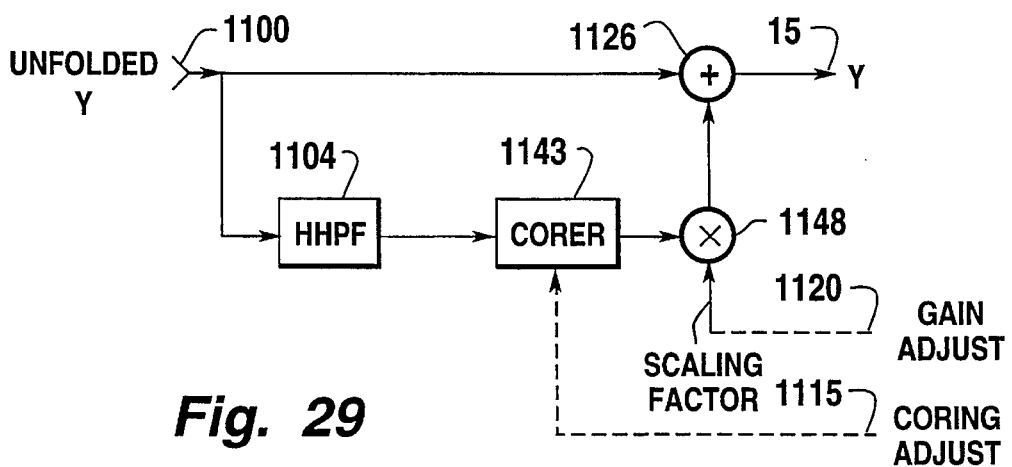

Each of FIGS. 27, 28 and 29 is a block diagram of an adaptive reemphasis circuit which embodies the invention in one of its aspects and can be used in conjunction with the FIG. 25 deemphasis circuit.

Figure 16:
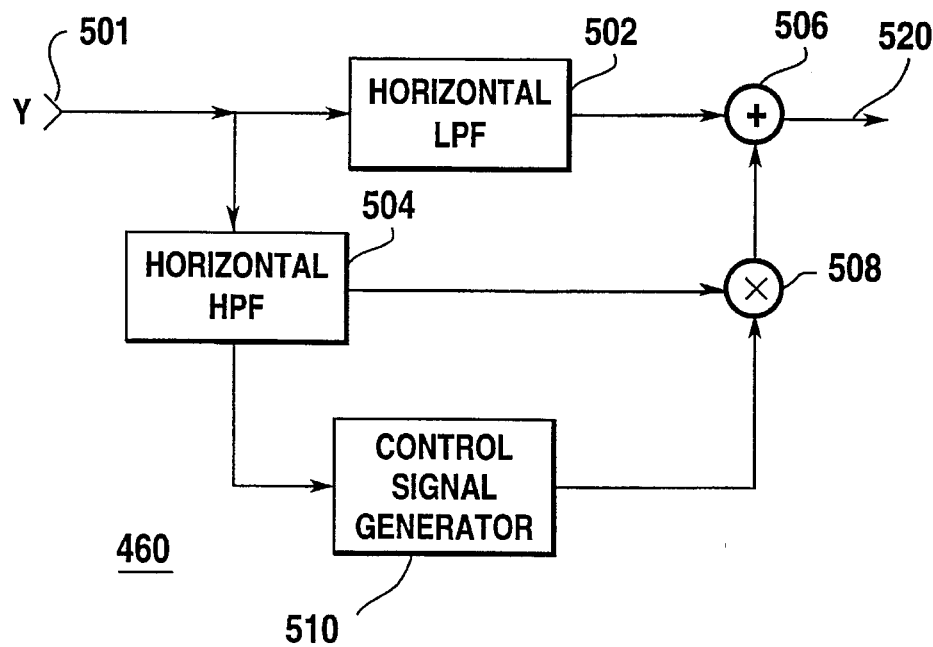
FIG. 16 is a block diagram of one type of adaptive deemphasis circuit with control signal generator, which adaptive deemphasis circuit embodies an aspect of the invention.
Figure 30:
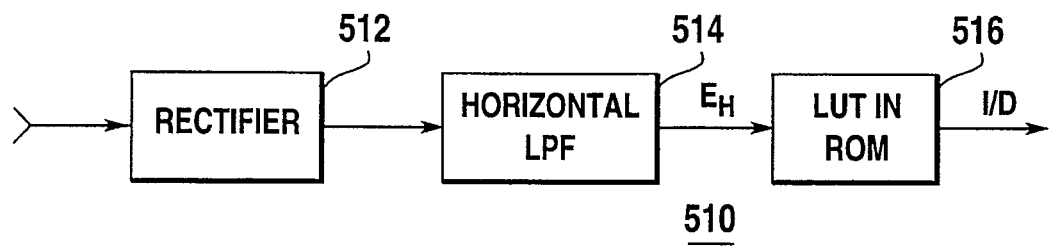

FIG. 30 is a block diagram of a control signal generator including a read-only memory (ROM) for storing a look-up table of control signal values, which control signal generator can be used in the FIG. 16 type of adaptive deemphasis circuit in accordance with an aspect of the invention.

Figure 31:
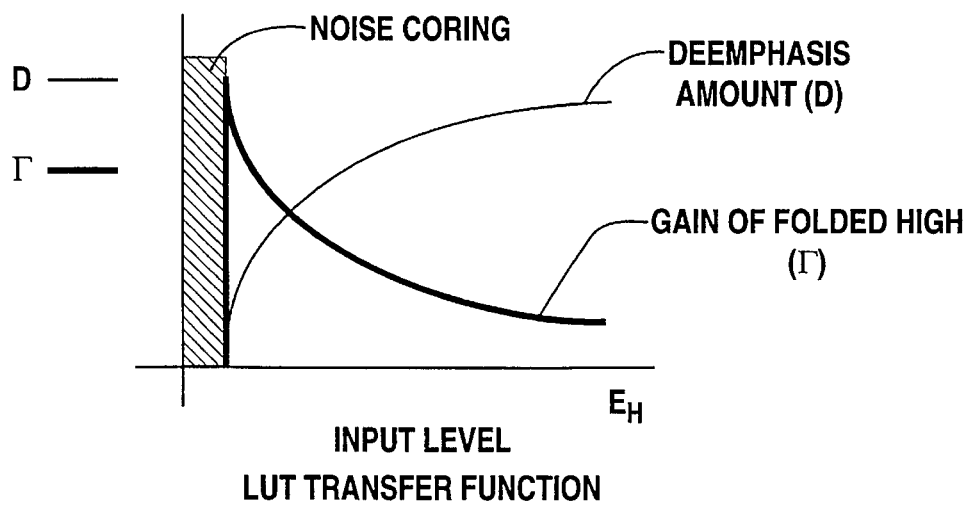

FIG. 31 is a plot of the control signal function provided by the look-up table of control signal values of the FIG. 30 control signal generator ROM, against the level of the energy of those luminance high frequencies; and is further an additional plot of the resultant deemphasis of the luminance high frequencies with noise coring, plotted against the same abscissa.

Figure 32:
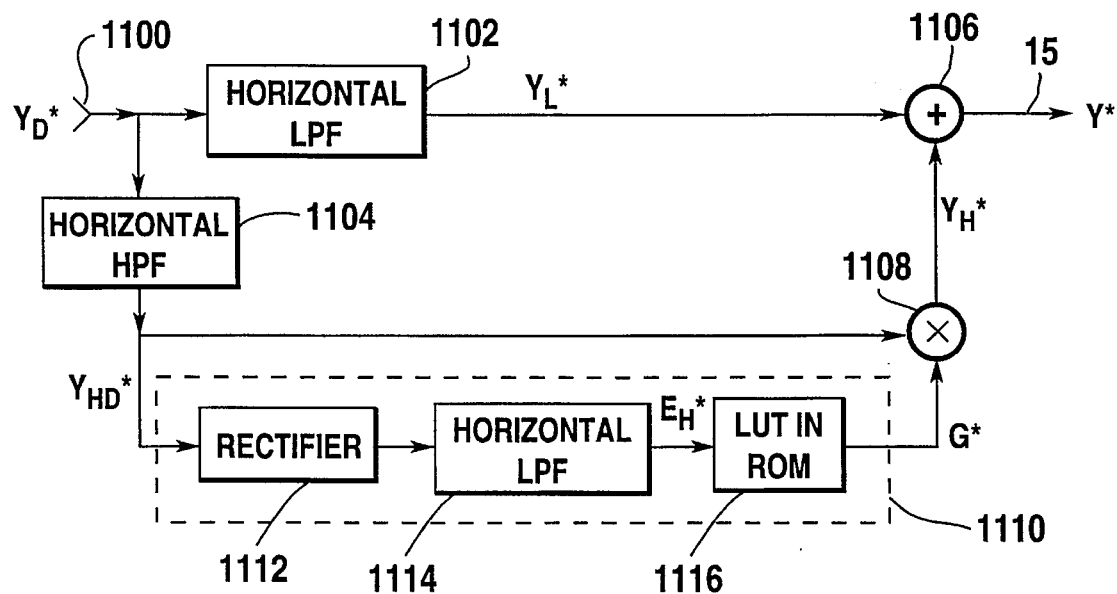

FIG. 32 is a block diagram of an adaptive reemphasis circuit constructed in accordance with an aspect of the invention, which adaptive reemphasis circuit includes a control signal generator that has therewithin a read-only memory (ROM) for storing a look-up table of control signal values.

Figure 33:
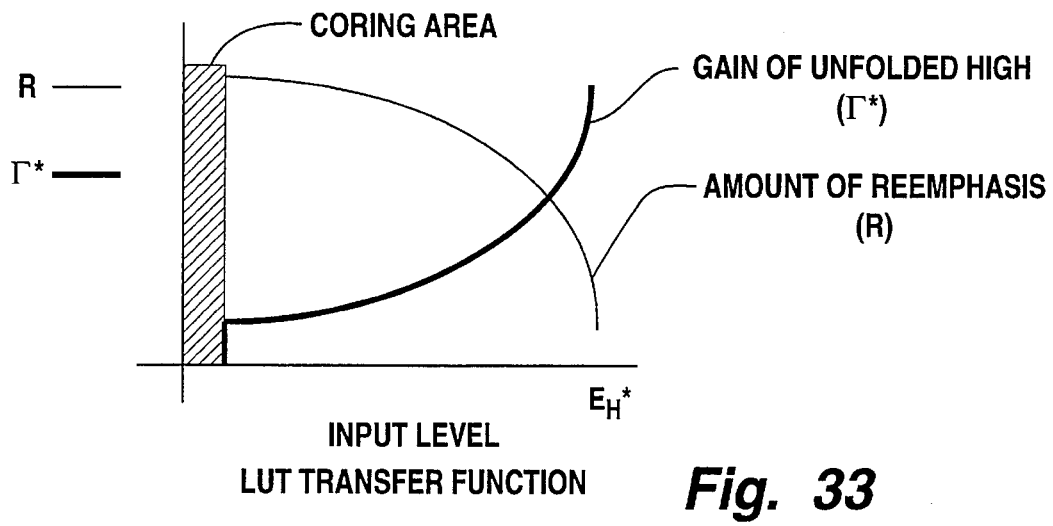

FIG. 33 is a plot of a control signal function as may be provided by the look-up table of control signal values of the FIG. 32 control signal generator ROM, plotted against the level of the energy of those luminance high frequencies; and is further an additional plot of the resultant deemphasis of the luminance high frequencies with noise coring, plotted against the same abscissa.

Figure 34:
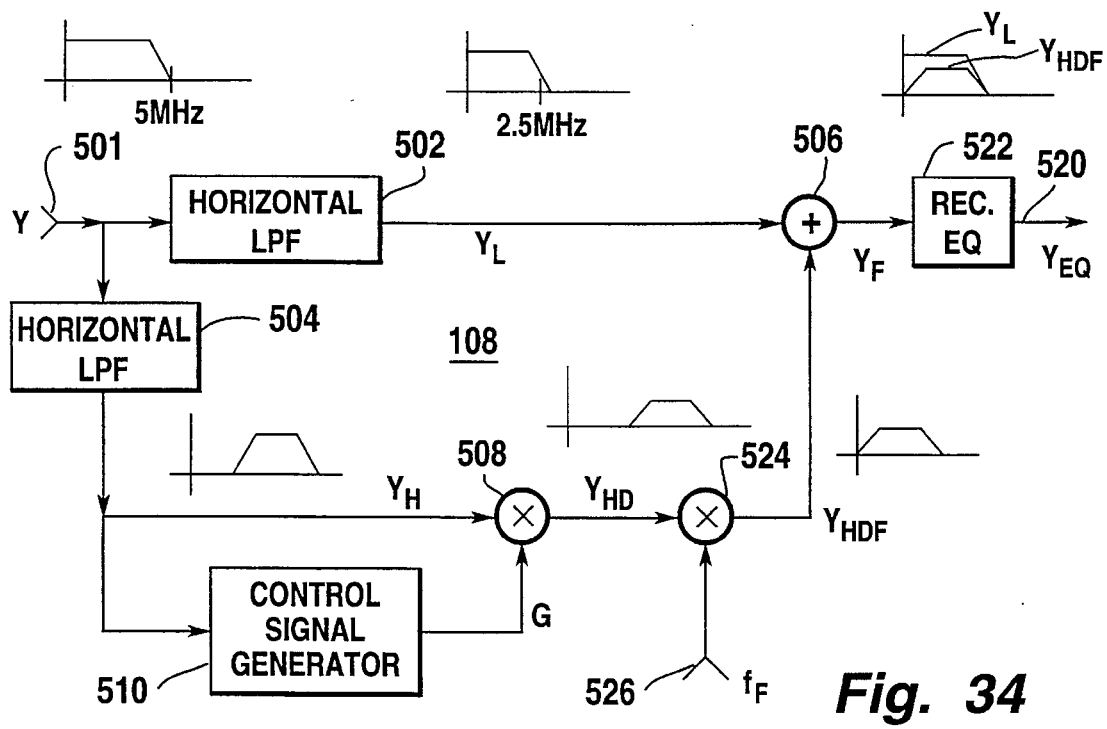

FIG. 34 is a block diagram of combined adaptive deemphasis and folding circuitry, as embodies another aspect of the invention.

Figure 35:
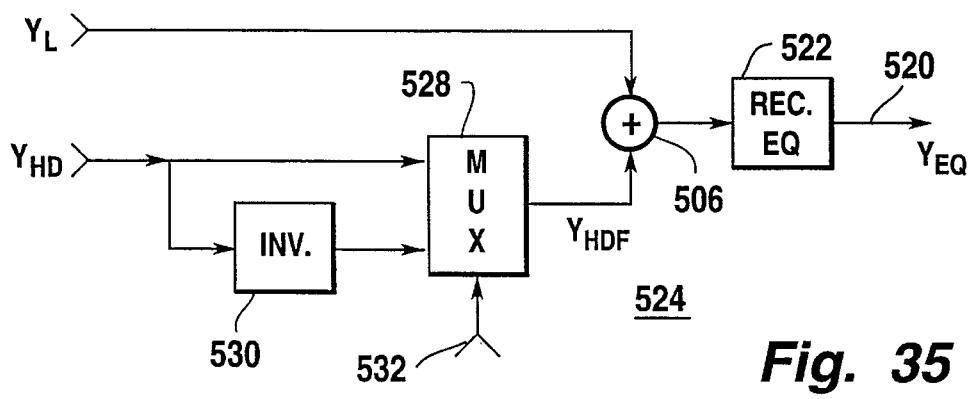

FIG. 35 is a detailed block diagram of a folding modulator in the FIG. 34 combined adaptive deemphasis and folding circuitry.

Figure 36:
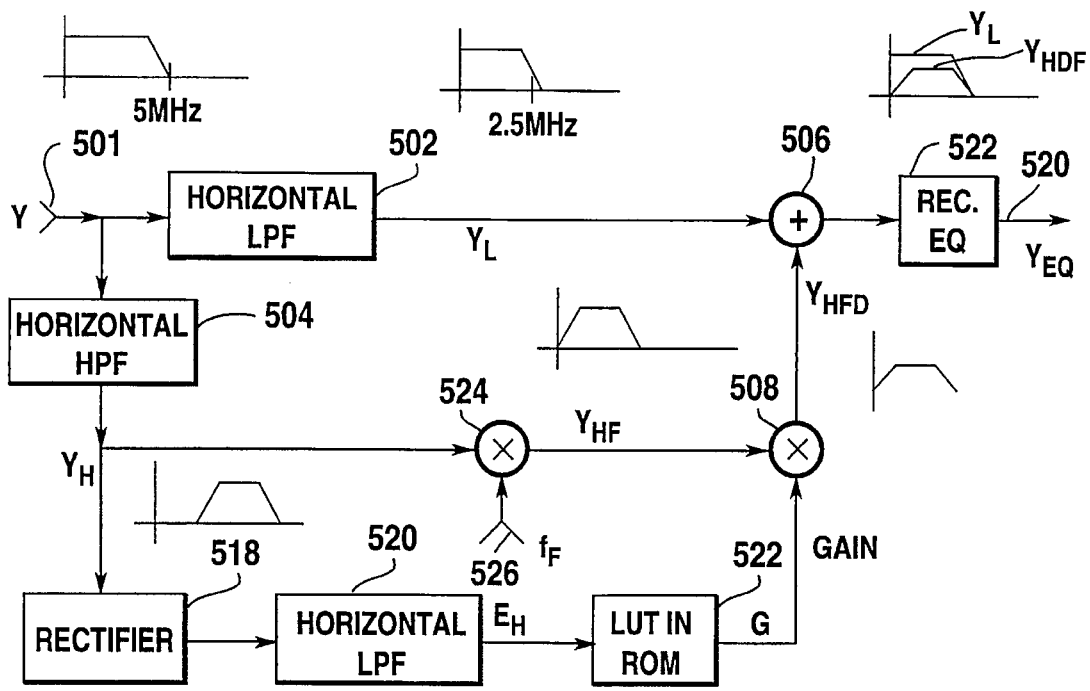

FIG. 36 is a block diagram of a modification of the FIG. 34 combined adaptive deemphasis and folding circuitry, which modified combined adaptive deemphasis and folding circuitry embodies an aspect of the invention.

Figure 37:
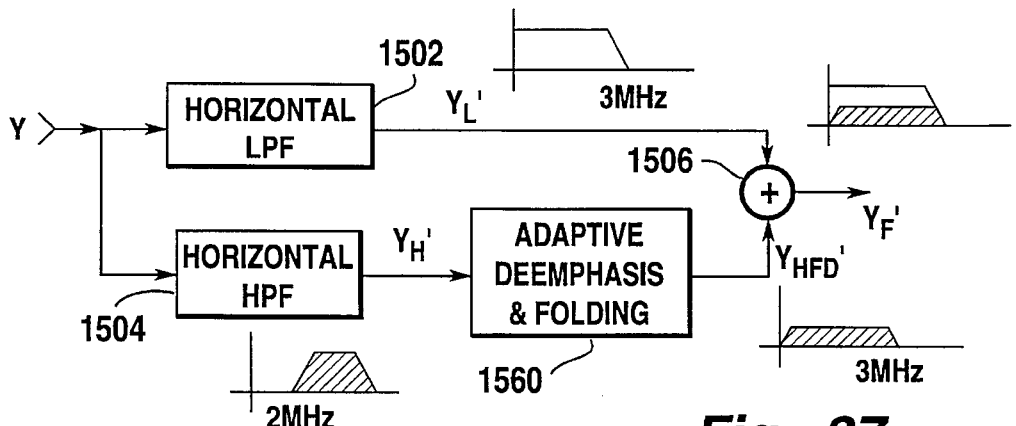
Figure 38:
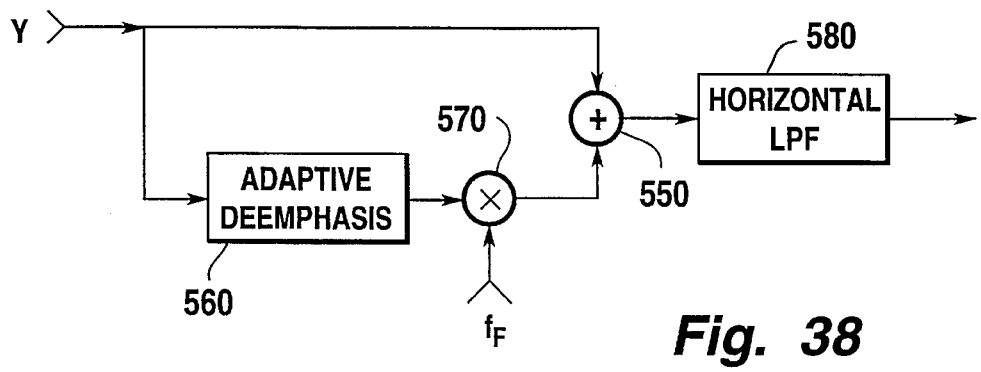

FIGS. 37 and 38 are block diagrams of still further alternative implementations of adaptive deemphasis and folding circuits in accordance with aspects of the invention.

DETAILED DESCRIPTION OF THE INVENTION

A system embodying the present invention in its various aspects may be implemented using analog and/or digital signal processing techniques. For sake of example, an implementation of the system embodying the present invention in its various aspects will be described below using digital signal processing. However, given the description herein, one of ordinary skill in the art will understand that the system embodying the present invention in various of its aspects may be constructed using analog circuitry and analog signal techniques and how such may be implemented.

Equalizing delays have been omitted from the drawing figures to simplify them and to make them easier to understand. One skilled in the art of video signal processor design will appreciate the need for such delays to properly time-align pixels subject to different delays on different processing paths due to the differing processing performed in those paths. One skilled in the art would understand where such delays would be necessary and how long each of the delays would have to be, and such delays will not be described or discussed below.

Additionally, various filters are shown in the drawing figures for filtering in the horizontal, vertical, and temporal directions, having both highpass and lowpass response characteristics. One skilled in the art of video signal processor design will appreciate that some of such filters may be constructed as known tapped-delay-line filter or comb filter designs, and would understand how to properly select the delay periods of the respective delay lines, the number of taps and the weighting of the taps. Consequently, the detailed design of such tapped-delay-line filters and comb filters will not be discussed below, unless such a design detail is important for other reasons.

In logic circuitry, such as that used in implementing the generation of folding carrier, or such as that used in implementing the generation of unfolding carrier, one skilled in the art would understand how to provide the timing delays required to overcome undesired "logic race" conditions; and the detailed design of such logic circuitry to forestall such undesired "logic race" conditions will not be discussed below.

Further, where an analog-to-digital converter (ADC)is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

Also, in the drawing and in the following detailed description, various embodiments constructed in accordance with the present invention its various aspects are directed to an NTSC composite video baseband signal. One skilled in the art would understand how to modify the embodiments in order to process a PAL video signal, a SECAM video signal or a video signal according to any other standard in accordance with the teaching of the present inventors set forth herein.

Figure 1:
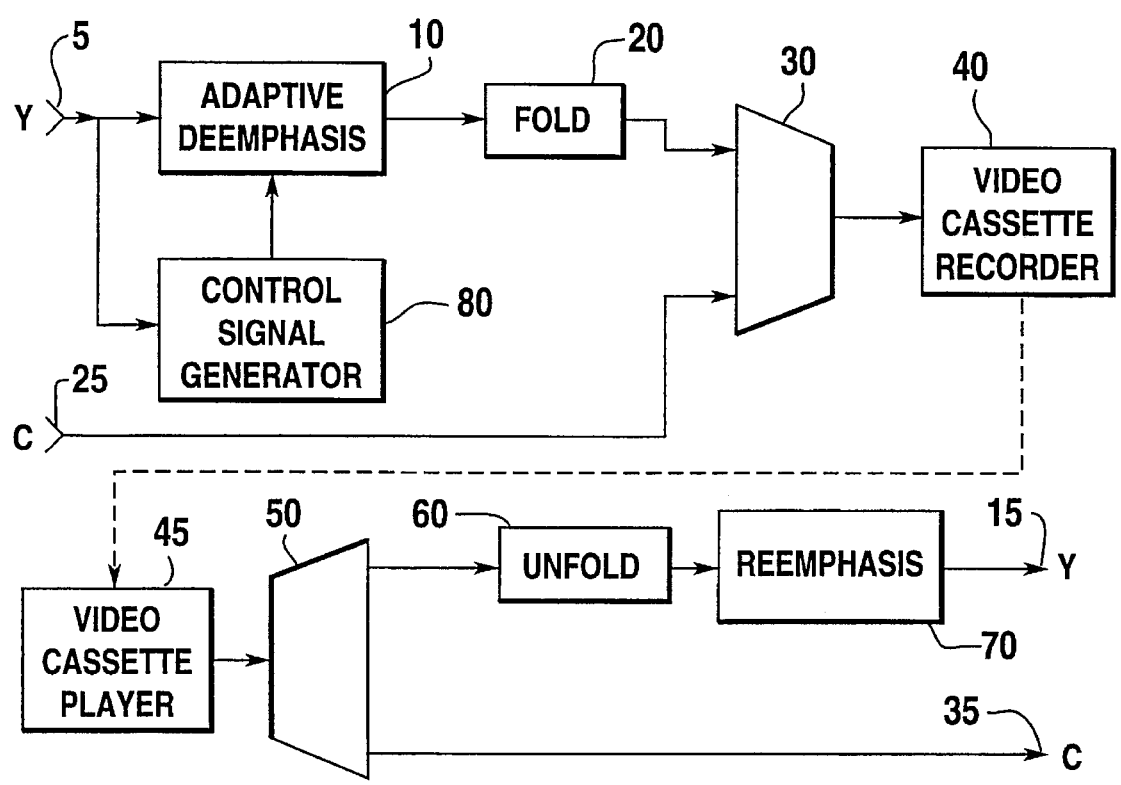
FIG. 1 is a block diagram of a portion of a video signal recording/playback system constructed in accordance with principles of the present invention.

In the FIG. 1 video signal recording/playback system, a luminance signal input terminal 5 is supplied a full-bandwidth luminance signal, from the luminance output terminal of a luminance-chrominance separator in the video signal recording/playback system, or from the luminance output terminal of a video camera, by way of example. The luminance signal input terminal 5 connects to a signal input terminal of an adaptive deemphasis circuit 10 and to an input terminal of a control signal generator 80. A control signal output terminal of the control signal generator 80 connects to a control signal input terminal of the adaptive deemphasis circuit 10. An output terminal of the adaptive deemphasis circuit 10 connects to an input terminal of a folding circuit 20. An output terminal of the folding circuit 20 connects to a luminance signal input terminal of combining circuitry 30. A chrominance signal input terminal 25 is supplied a chrominance signal, from the chrominance output terminal of the luminance-chrominance separator in the video signal recording/playback system, or from the chrominance output terminal of the video camera, with regard to the previously cited examples. Chrominance signal input terminal 25 connects to a chrominance signal input terminal of the combining circuitry 30. An output terminal of the combining circuitry 30 supplies a combined signal to a mechanism for recording the combined signal on a recording medium. The recording mechanism and the medium are made up of well known elements.

In FIG. 1 a video cassette recorder 40 is a representative recording mechanism, which uses video tape cassettes as the recording medium. The combining circuitry 30 that precedes the VCR 40 will then include an oscillator for generating a luminance carrier wave, circuitry for modulating the frequency of the luminance carrier in accordance with the folded luminance signal, circuitry for encoding the chrominance signal in an under signal lower in frequency than the frequency-modulated luminance carrier, and a frequency multiplexer for combining the frequency-modulated luminance carrier with the under signal.

A video cassette player 45 comprises the known elements making up the playback mechanism for retrieving the previously recorded signal from the recording medium. (The recorder 40 or the player 45 or each of them may, in fact, be a machine including a video cassette transport mechanism with both recording and playback electronics.) Signal played back from the video cassette 45 is supplied to an input terminal of a signal separator 50. A luminance signal output terminal of signal separator 50 connects to an input terminal of an unfolding circuit 60. An output terminal of the unfolding circuit 60 connects to a signal input terminal of a reemphasis circuit 70. An output terminal of the reemphasis circuit 70 supplies reconstructed full-bandwidth luminance signal to luminance signal output terminal 15, for subsequent application to means (not shown) for utilizing the reconstructed full-bandwidth luminance signal. That means may be a luminance-chrominance signal combiner for generating a composite video signal, or that means may be the luminance signal input terminal of a high-resolution television monitor, by way of example.

A chrominance signal output terminal of the separating circuit 50 connects to a chrominance signal output terminal 35, for subsequent application to means (not shown) for utilizing the chrominance signal. By way of example, that means may be the luminance-chrominance signal combiner for generating a composite video signal or may be the chrominance signal input terminal of the high-resolution television monitor.

One familiar with video signal recording/playback systems will understand that elements other than those illustrated in FIG. 1 must be present in a recording/playback system. One skilled in the art would understand where these elements should be placed and how they should be interconnected. For clarity, these elements have been omitted from FIG. 1, and will not be discussed in detail below.

In operation, the control signal generator 80 produces a control signal which represents the level of the high-frequency portion of the full-bandwidth luminance signal. The control signal is applied to the control signal input terminal of the adaptive deemphasis circuit 10. The adaptive deemphasis circuit 10 operates to variably decrease the level of the high-frequency portion of the full-bandwidth video signal in response to the control signal from the control signal generator 80. The adaptive deemphasis circuit 10 and control signal generator 80 are described in detail below.

The high-frequency portion of the deemphasized luminance signal from the adaptive deemphasis circuit 10 is then folded into the low-frequency portion in the folding circuit 20. The folded deemphasized luminance signal from the folding circuit 20 and the chrominance signal from the chrominance signal input terminal 25 are combined in the combining circuitry 30 to form a frequency-division-multiplex signal for recording. The chrominance signal is down-converted in frequency to form a color-under signal recorded in a spectral region below the spectral region in which a luma carrier having its frequency modulated in accordance with the folded deemphasized luminance signal is recorded; and the frequency-division-multiplex signal combining the color-under signal and the frequency-modulated luma carrier occupies a bandwidth which is less than the bandwidth of the magnetic medium.

Upon playback, the reproduced frequency-division-multiplex signal from video cassette player 45 is processed by a separating circuit 50 in a known manner. In separating circuit 50, the color-under signal and the frequency-modulated luma carrier are separated by frequency-selective filtering, the frequency modulation of the luma carrier is detected to recover the folded deemphasized luminance signal, and the color-under signal is upconverted to regenerate the chrominance signal. The played back folded luminance signal is supplied to the unfolding circuit and the chrominance signal is supplied to the chrominance signal output terminal 35.

The unfolding circuit 60 unfolds the deemphasized high-frequency portion of the luminance signal from the low-frequency portion, and regenerates the deemphasized full-bandwidth luminance signal. This unfolded deemphasized full-bandwidth luminance signal is supplied to the signal input terminal of the reemphasis circuit 70. The reemphasis circuit 70 boosts the high-frequency portion of the luminance signal by an amount dependent on its energy. The output of the reemphasis circuit 70 is a full-bandwidth luminance signal in which the high-frequency portion has been restored to substantially the correct level.

Because the high-frequency portion of the luminance signal is attenuated before it is folded into the low-frequency portion in folding circuit 20, when the thus recorded video cassette is subsequently played back on a VCR which does not have the unfolding circuit, the artifacts caused by the presence of the high-frequency portion are not objectionable. Such a cassette is backward compatible.

As is described more fully further on in this specification, in combining circuitry 30 of a preferred type for the FIG. 1 video signal recording/playback system, a motion representative signal M is developed by analysis of the frame-to-frame change in the video luminance components of the television signal supplied for recording, and this motion representative signal M is utilized as a control signal for motion-adaptive processing of the video luminance components of the input video signal prior to folding. During reproduction or playback, use of the same motion representative signal M utilized during the record side luminance processing can significantly facilitate luminance processing during reconstruction, so the motion representative signal M is additionally processed in combining circuitry 30 to advantageously combine it with the video chrominance component signal C to provide a composite chrominance-plus-motion signal $(C+M)_R$ to be frequency-muitiplexed with the folded luminance signal $Y_R$, thereby to generate the frequency-multiplexed signal supplied to the VCR 40 for recording. Details of the encoding and decoding of the motion representative signal M will be more fully described later. The chrominance-plus-motion signal $(C+M)_R$ is recorded as a composite under signal instead of the conventional color-under signal recorded in a standard VCR. In a VHS format VCR for example, the 3.58 MHz NTSC chrominance sub-carrier frequency is heterodyned with a 4.21 MHz carrier to down-convert it to about 629 kHz to provide a color-under carrier. In accordance with an aspect of the present invention, the composite chrominance-plus-motion signal $(C+M)_R$ is modulated on another under carrier and combined with the luminance carrier wave frequency-modulated by the luminance signal $Y_R$. The VCR 40 of FIG. 1 records the resulting frequency-multiplexed signal onto a video tape cassette in conventional manner, substantially in accordance with the standard VHS VCR format.

In connection with the modified chrominance encoding and decoding, those skilled in the art will understand that the NTSC chroma carrier is a two-line sequence, out of phase by 180° at the same horizontal position along adjacent lines, whereas the color-under signal carrier is a four-line sequence advanced or retarded in phase by 90° per line at the same horizontal position, with the phase advanced by 90° per line or retarded by 90° per line on alternate field tracks. The other under carrier is a four-line sequence, with the please retarded by 90° per line during the field tracks the color-under signal carrier is advanced by 90° per line, and the phase advanced by 90° per line during the field tracks the color-under signal carrier is retarded by 90° per line.

Figure 2:
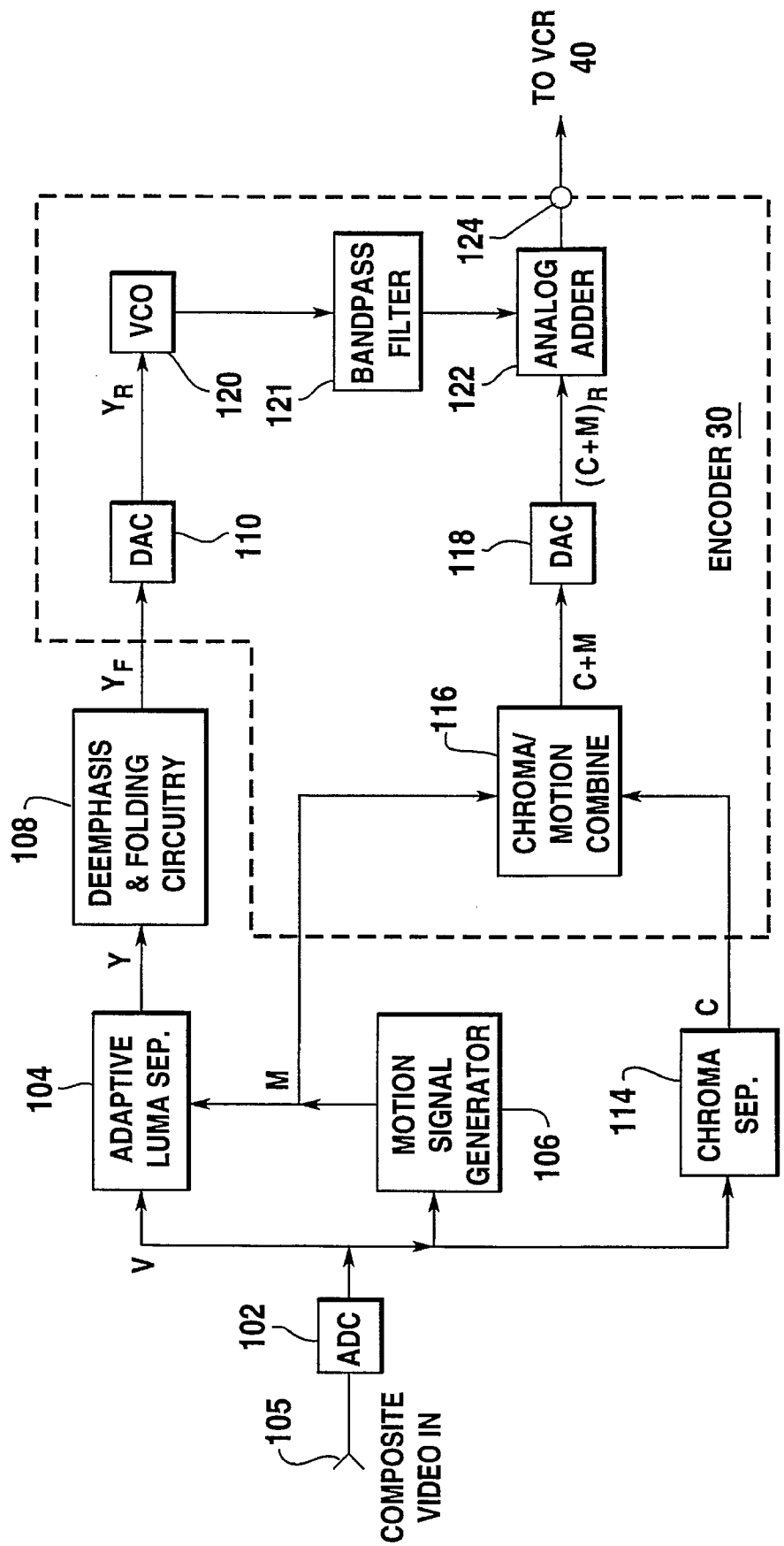
FIG. 2 is a block diagram of an encoder used in the recording portion of the FIG. 1 system.

FIG. 2 is block diagram showing in more detail the recording circuitry preceding the VCR 40. For facilitating the signal processing, digital signal processing techniques may advantageously be implemented, and so input terminal 105 is coupled to an input terminal of an analog-to-digital converter (ADC) 102 which produces a digitized (quantized) composite video output signal V responsive to the analog composite video signal received for recording. An output terminal of ADC 102 is coupled to respective input terminals of an adaptive luminance signal separator 104, a motion signal generator 106 and a chrominance signal separator 114. An output terminal of the adaptive luminance signal separator 104 is coupled to an input terminal of deemphasis and folding circuitry 108. As will be more fully described below, the deemphasis and folding circuitry 108 performs band-splitting of the separated luminance signal from luminance separator 104 into low-frequency and high-frequency luminance components, performs an adaptive deemphasis processing of the high-frequency luminance component, and folds the adaptively deemphasized high-frequency luminance component into the low-frequency luminance component spectrum, thereby to provide a digital bandwidth-limited folded luminance signal $Y_F$.

An output terminal of the deemphasis and folding circuitry 108 is coupled to an input terminal of a digital-to-analog converter (DAC) 110 by which the digital folded luminance signal $Y_F$ is converted to an analog signal $Y_R$. The signal $Y_R$ is supplied to a voltage-controlled oscillator (VCO) 120 for modulating the frequency of a luminance carrier wave. The frequency-modulated luminance carrier wave is supplied from an output terminal of the VCO 120 to the input terminal of a bandpass filter 121, which constrains the bandwidth of the frequency-modulated oscillations so their frequency spectrum does not overlap the frequency spectrum of the color-under signal or the frequency spectrum of a lower-carrier-frequency second under signal. The band-limited frequency-modulated oscillations are applied as a first summand input signal to an analog adder 122, to be combined with under signal(s) in the adder 122 to generate a sum output signal supplied at the terminal 124, which is the output terminal of the combining circuitry 30.

A separated chrominance signal output terminal of the chrominance signal separator 114 is coupled to a chrominance signal input terminal of a chrominance/motion signal combining circuit 116. A motion representative signal output terminal of the motion signal generator 106 is coupled to a control input terminal of the adaptive luminance signal separator 104 and a motion signal input terminal of the chrominance/motion signal combining circuit 116. The chrominance/motion signal combining circuit includes downconverters that generate a composite digital chrominance-plus-motion signal (C+M) output that is lower in frequency than the frequency-modulated luminance carrier wave supplied from the controlled oscillator 120. The composite digital chrominance-plus-motion signal (C+M) output by chrominance/motion signal combining circuit 116 is coupled to an input terminal of a second digital-to-analog converter (DAC) 118 which supplies an analog chrominance-plus-motion signal $(C+M)_R$. An output terminal of DAC 118 supplies a second summand input signal to the analog adder 122, to provide an under signal for frequency-division-multiplexing with the frequency-modulated luminance carrier wave from the controlled oscillator 120, to generate the sum output signal the adder 122 supplies at the terminal 124.

In operation, initially the ADC 102 in the FIG. 2 circuitry converts the composite video signal input at input terminal 105 to a sampled data multi-bit digital composite video signal V. For an NTSC signal having a nominal bandwidth extending from DC up to approximately 4.2 MHz, for example, the sampling frequency may be selected to be about 10 MHz. Digital composite video signal V is supplied to the adaptive luminance separator 104, which extracts the luminance component Y therefrom; to the motion signal generator 106, which derives therefrom a motion representative signal M (hereafter simply referred to as "motion signal M") for controlling the motion-adaptive filtering on the encoder side and also on the decoder side; and to the chrominance signal separator 114, which extracts the chrominance component C therefrom. This chrominance component C comprises quadrature-amplitude-modulation (QAM) sidebands of the suppressed color subcarrier, which subcarrier is at 3.58 MHz for television signals adhering to the NTSC standard.

As controlled by motion signal M, the adaptive luminance separator 104 performs a motion-adaptive spatio-temporal filtering of the digital composite video signal V, to separate the luminance signal Y. It is known in the video signal processing art that frame-comb lowpass filtering (temporal lowpass filtering) may be used to extract the luminance component from a composite video signal with no loss of spatial resolution. However, in the presence of motion in the video image, undesirable artifacts are introduced into the luminance signal extracted by frame-comb filtering. Line-comb lowpass filtering (vertical comb lowpass filtering or spatial lowpass filtering) may also be used to extract the luminance component, even in the presence of motion. However, the luminance component extracted by line-combing has decreased spatial (diagonal) resolution. It is preferable to extract the luminance signal using frame-comb filtering in order to preserve spatial resolution, unless there is motion in an area of the image, in which case it is preferable to use line-comb filtering in that area.

The extracted luminance signal Y is further processed by the adaptive deemphasis and folding circuitry 108. This circuit folds the adaptively deemphasized high-frequency component of the luminance signal Y into the bandwidth of the lower frequency luminance component so that all the information in the full-bandwidth baseband luminance signal Y is contained in a folded luminance signal $Y_F$ having a reduced bandwidth extending up from DC only to about 2.5 MHz, for example. The adaptive deemphasis and folding circuitry 108 will be described in more detail below. The folded luminance signal $Y_F$ is converted to an analog signal $Y_R$ in the DAC 110. The signal $Y_R$ modulates the frequency of the controlled oscillator 120.

In the chrominance/motion signal combining circuitry 116, the extracted motion signal M is used to modulate a carrier. That modulated carrier and the extracted chrominance component signal C are combined into a single composite chrominance-plus-motion signal (C+M) supplied from the circuitry 116 to the DAC 118. A chrominance/ auxiliary signal combining circuit, which may be used as the chrominance/motion signal combining circuit 116, is described in more detail in prior copending commonly assigned U.S. patent application Ser. No. 531,070 filed 11 May 1993 by C. H. Strolle et alii, entitled FREQUENCY MULTIPLEXING FM LUMA SIGNAL WITH COLOR AND SECOND UNDER SIGNALS HAVING OVERLAPPING FREQUENCY SPECTRA and assigned to Samsung Electronics Co., Ltd., pursuant to the obligations of the inventors to so assign their inventions at the time those inventions were made.

The chrominance-plus-motion signal (C+M) is converted into an analog signal $(C+M)_R$ by DAC 118. This $(C+M)_R$ signal is in a form which can be combined in the adder 122 with frequency-modulated luminance carrier wave from the controlled oscillator 120, $(C+M)_R$ being an under signal in a frequency-division-multiplex (FDM) signal supplied at the terminal 124, which the combining circuitry 30 supplies in FIG. 1 to the VCR 40 for recording.

It is pointed out that because the folded highs alternate in phase at 15 Hz, it is impractical to detect frame-to-frame motion after folding the luminance signal frequency spectrum. Accordingly, when recording, motion is detected prior to folding. This is done by temporal differencing and spatial lowpass filtering of the separated baseband luminance prior to folding.

It is helpful for an understanding of certain aspects of the invention to provide a further explanation regarding the choice of the folding and prefiltering processing employed in the adaptive deemphasis and folding circuitry 108, so as to be able to record and reproduce a full-bandwidth (e.g., DC to 5 MHz) luminance signal using a narrow bandwidth video recording format such as the conventional VHS format. It has previously been proposed to shift a high-frequency luminance signal component by filtering and sub-Nyquist sampling to insert it within spectral holes within the spatio-temporal frequency domain occupied by the NTSC chrominance sub-carrier component, but offset relative thereto. See for example, T. Fukinuki et alii, "Extended Definition TV Fully Compatible with Existing Standards", IEEE Transactions on Communications, Vol. COM-32, No. 8, Aug. 1984, pages 948–953; and T. Fukinuki et alii, "NTSC FULL COMPATIBLE EXTENDED DEFINITION TV PROTO MODEL AND MOTION ADAPTIVE PROCESSING", reprinted from IEEE Communications Society "IEEE Global Telecommunications Conference", No. 4.6, Dec. 2–5, 1985, pages 113–117; the disclosures of which are incorporated hereinto by reference thereto.

Figures 3, 4:
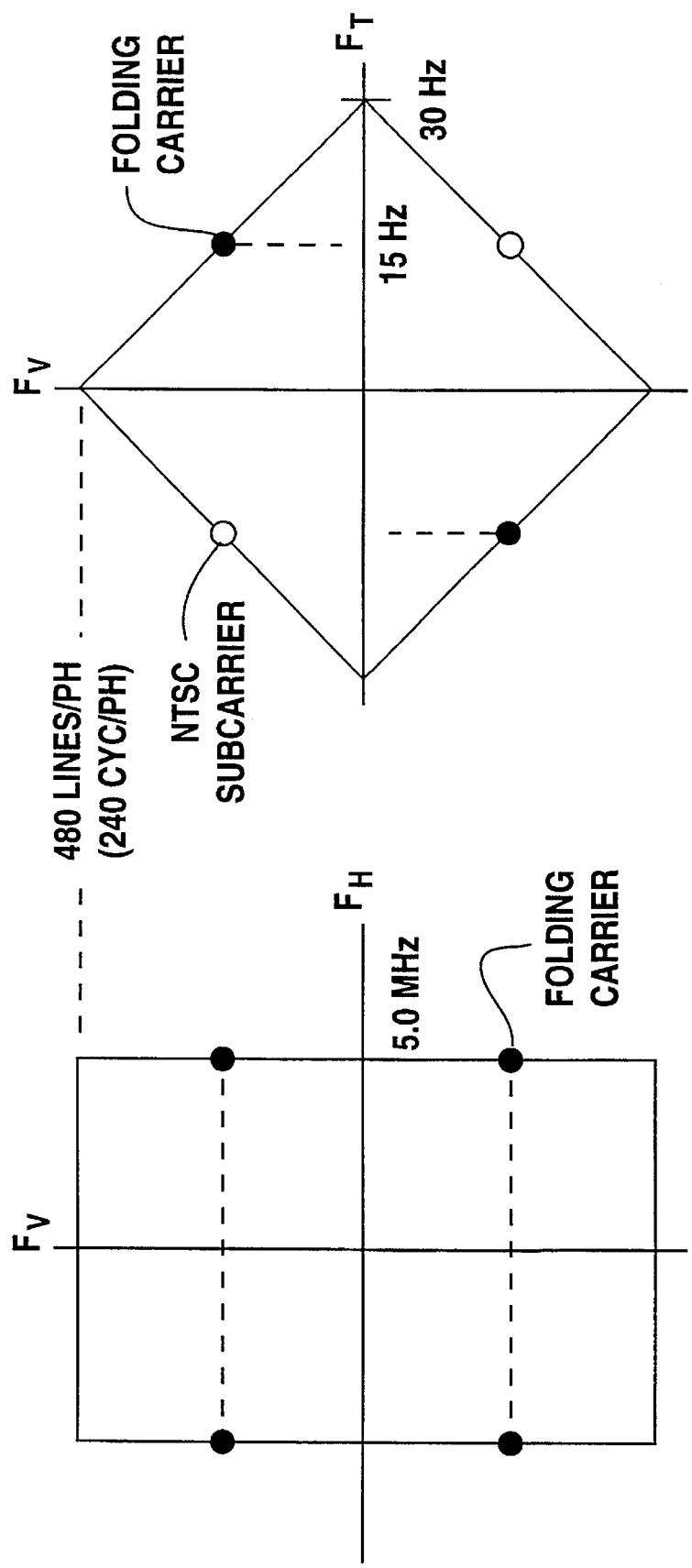
FIG. 3 is a plot of the vertical-spatial-frequency versus horizontal-spatial-frequency characteristics of a folding modulation performed in the folding circuit.
FIG. 4 is a plot of the vertical-spatial-frequency versus temporal-frequency characteristics of the same folding modulation.

FIGS. 3 and 4 show the frequency characteristics of the folding process employed in an aspect of the invention, in the vertical-horizontal frequency spectrum and the vertical frequency-temporal domains, respectively. The folding frequency $f_F$ is selected so as to maximize the distance between the frequency of the folding carrier and the baseband luminance signal in the temporal, vertical and horizontal directions. As illustrated in FIGS. 3 and 4, the folding carrier is preferably placed at one-half the maximum vertical frequency, and one-half the maximum temporal (frame) frequency, to correspond to the so-called Fukinuki holes in the temporal and vertical dimensions, and at a $2f_F$ of about 5 MHz in the horizontal direction. This maximizes the spectral distance between the folding carrier and the vertical and temporal lower frequency components of the luminance signal. The high-band luminance is folded into the so-called "Fukinuki" areas in the upper left and lower right quadrants of the diamond in FIG. 4. Because conventional VCRs employ a component type recording system, it would also have been possible to fold the high-band luminance into the spectral "holes" from which the NTSC chrominance subcarrier has been removed in the upper left and lower right quadrants of the diamond. However, because there may still be residual chroma sidebands present in those areas which might interfere with the folding and unfolding processes, the inventors have found it preferable to fold the high-band luma into the Fukinuki areas as shown, with the result that by folding into these quadrants, any residual chroma components when unfolded will be in complementary phase on successive fields and will be optically canceled in the display monitor.

Preferably, then, the folding carrier is not a harmonic of an odd multiple of both the line and the frame scan rates, which harmonic is continuous in phase from scan line to scan line and from frame to frame, as described by Howson and Bell and later by Faroudja. Preferably, the folding carrier is chosen to be a harmonic of an even multiple of both the line and the frame scan rates, which harmonic reverses phase from scan line to scan line. I.e., the harmonic reverses phase from scan line to scan line within each frame and from frame to frame. When this latter, preferred type of folding carrier is multiplied by a modulating signal of lower frequency, a form of amplitude modulation referred to as "4-field offset modulation" takes place. Any harmonic of an even multiple of the line and frame scan rate is not an odd multiple of one-half the scan line frequency; but, rather, is an even multiple of one-half the scan line frequency which is to say, a multiple of the scan line frequency.

The generation of a folding carrier that is a harmonic of the scan line frequency is readily accomplished using a line-locked voltage-controlled oscillator (VCO) that oscillates at an even multiple of the folding carrier and frequency-dividing from those oscillations to derive the folding carrier. Automatic frequency and phase control (AFPC) voltage for controlling the VCO is developed by dividing the frequency of the oscillations by the number of oscillations that are supposed to occur in a scan line and comparing the quotient frequency to the occurence of horizontal sync pulses to develop an error signal that is lowpass filtered to generate the AFPC voltage. For example, the frequency of the VCO oscillations can be divided by using a digital counter to count each of their crossings of their average-value axis in a prescribed direction. A folding carrier switching between +1 and −1 to provide a 5 MHz square wave can be generated in accordance with one of the least significant bits of the digital counter. Another digital counter can be arranged to count vertical sync pulses separated from the luminance signal, thereby generating a modulo-two frame count for controlling the frame-to-frame alternation of the folding carrier phase. A scan line counter can be arranged to count horizontal sync pulses separated from the luminance signal, and the least significant bit of the scan line count can be used for controlling the line-to-line alternation of the folding carrier phase.

Figure 5:
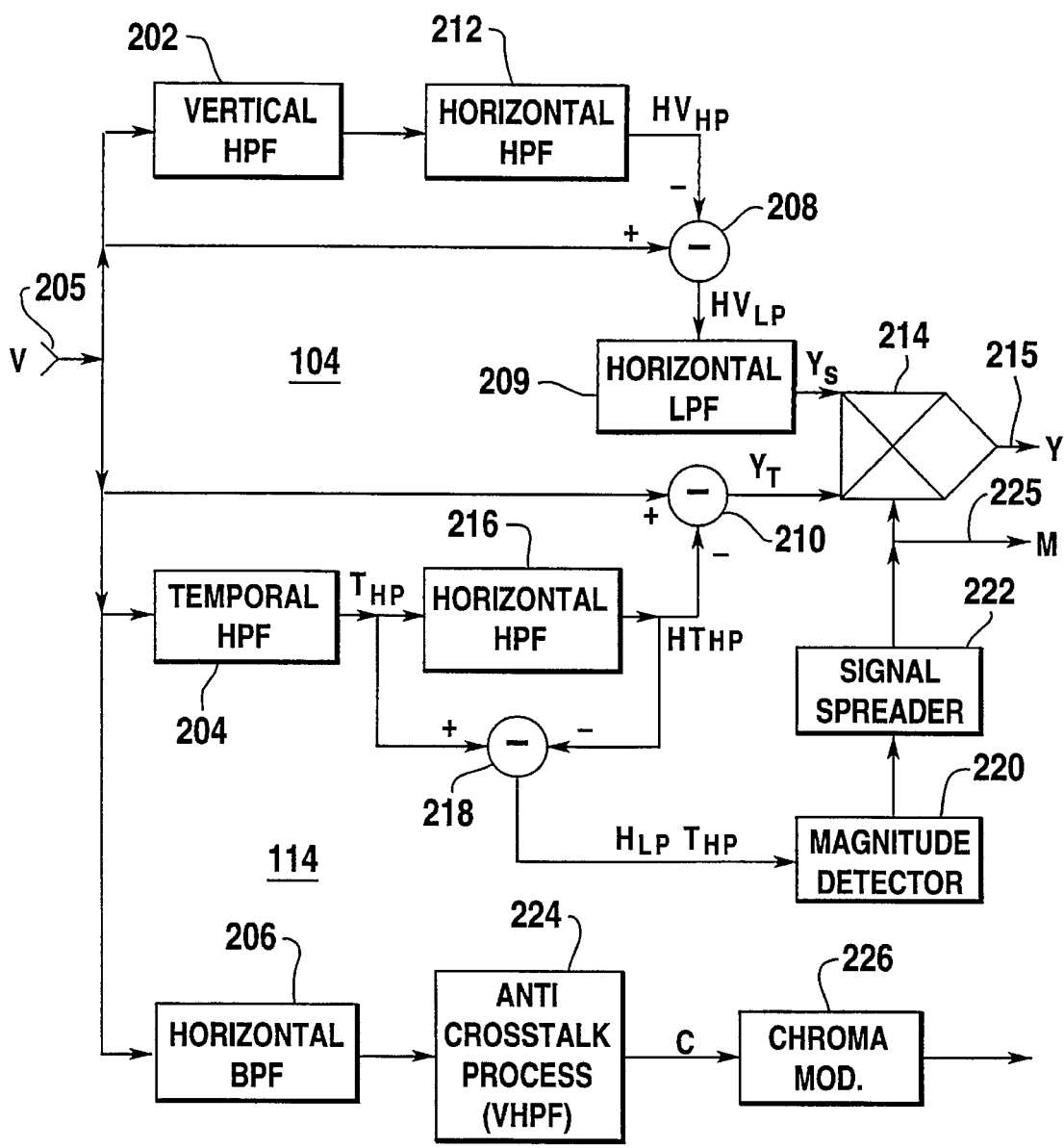
FIG. 5 is a block diagram showing in more detail an adaptive luminance separation portion, a motion signal generating portion and a chrominance signal separating portion of the FIG. 2 encoder.

FIG. 5 is a more detailed block diagram of a portion of the FIG. 2 circuitry. In FIG. 5, an input terminal 205 connects from the output terminal of the ADC 102 of FIG. 2 to receive digitized composite video signal V. Input terminal 205, is coupled to respective input terminals of a vertical highpass filter (VHPF) 202, a temporal highpass filter (THPF) 204, a horizontal bandpass filter (HBPF) 206 and to respective minuend input terminals of subtractors 208 and 210. An output terminal of the VHPF 202 is coupled to an input terminal of a horizontal highpass filter (HHPF) 212, which may have a break frequency of 1.7 MHz, for example. An output terminal of HHPF 212 is copied to a subtrahend input terminal of subtractor 208. An output terminal of subtractor 208 is coupled to an input terminal of a horizontal lowpass filter (HLPF) 209. An output terminal of HLPF 209 is coupled to a first data input terminal of a soft switch 214. An output terminal of soft switch 214 is coupled to an output terminal 215. Output terminal 215 is coupled to the input terminal of the deemphasis an folding circuitry 108 of FIG. 2.

An output terminal of THPF 204 is coupled to an input terminal of a horizontal highpass filter (HHPF) 216 and to a minuend input terminal of a subtractor 218. An output terminal of HHPF 216 is coupled to respective subtrahend input terminals of subtractors 210 and 218. An output terminal of subtractor 210 is coupled to a second data input terminal of soft switch 214.

An output terminal of subtractor 218 is coupled to an input of a signal magnitude detector (rectifier) 220. An output terminal of magnitude detector 220 is coupled to an input terminal of a signal spreader 222. An output terminal of signal spreader 222 is coupled to an output terminal 225 and to a control input terminal of soft switch 214. Output terminal 225 is coupled to the motion signal input terminal of chrominance motion signal combining circuit 116 of FIG. 2.

An output terminal of HBPF 206 is coupled to an input terminal of an anti-crosstalk processor 224 for processing the chrominance component prior to combining with the motion signal. An output terminal of anti-crosstalk processor 224 is coupled to an input terminal of a chrominance signal modulator 226 forming a part of the chrominance/motion signal combining circuit 116 of FIG. 2 that converts the 3.58 MHz color subcarrier sidebands to a color-under signal centered at 629 kHz, as will be described in detail further on in this specification.

The horizontal HPFs 212 and 216 may be standard digital highpass filters, each having a break frequency at around 2 MHz. A 15-tap horizontal highpass filter is preferred, yielding a response characteristic which is −6 dB at 1.75 MHz. In regard to the diagonal spatial prefiltering performed in the encoder prior to folding and also the diagonal spatial post-filtering after unfolding (as will be described later), the diagonal filters in the encoder and decoder have matched filter characteristics. In the diagonal filtering process, the input signal is vertically highpass-filtered by VHPF 202; then the vertically high-passed part of the signal is horizontally highpass-filtered with HHPF 212; then the resultant signal is subtracted from the input signal in the subtractor 208 to provide a diagonally lowpass filtered output signal; and in turn the diagonally lowpass filtered output signal is horizontally lowpass-filtered by HLPF 209, having a break frequency at around 3.3 MHz, to produce the spatially-filtered luminance signal $Y_S$.

In operation, the horizontally and vertically highpass filtered signal $HV_{HP}$ produced by the cascaded VHPF 202 and HHPF 212 contains all the chrominance information present in the composite video signal V in addition to all the spatial detail information. This signal $HV_{HP}$ is subtracted from the composite video signal V by differencing in subtractor 208 to produce a diagonally lowpass-filtered signal $HV_{LP}$ containing only the luminance information. The output signal $HV_{LP}$ from subtractor 208 is applied to HLPF 209. HLPF 209 removes the horizontal frequency spectrum components above its break frequency (3.3 MHz, for example) from $HV_{LP}$ to avoid aliasing noise in the spatially reconstructed luminance signal during playback processing, thereby providing at the output of HLPF 209 a spatially-filtered luminance signal $Y_S$. The spatially-filtered luminance signal $Y_S$ produced by HLPF 209 therefore contains only luminance information, but has reduced diagonal resolution. Temporally and horizontally highpass filtered signal $HT_{HP}$, produced by the cascaded THPF 204 and HHPF 216, also contains all the chrominance information present in the composite video signal V, in addition to most of the temporal detail information. This signal $HT_{HP}$ is subtracted from the composite video signal V by differencing in subtracter 210 to produce a temporally-filtered luminance signal. The temporally-filtered luminance signal $Y_T$ produced by subtracter 210 therefore contains only luminance information at full spatial resolution, but has reduced temporal resolution.

The temporally highpass filtered signal $T_{HP}$ from THPF 204 contains motion information at horizontal low frequencies and chrominance information at high horizontal frequencies. Thus, the output signal $HT_{HP}$ from HHPF 216 is subtracted by differencing in subtracter 218 from the temporally highpass filtered signal $T_{hp}$ to derive a horizontally lowpass-filtered, temporally highpass-filtered signal $H_{LP}T_{HP}$ which is a bipolar motion-representative signal. The signal $H_{LP}T_{HP}$ varies in magnitude as a function of both the magnitude of the motion in the image (that is, the greater the degree of motion in the image, the greater the signal magnitude) and the contrast between the moving and still portions of the image. This signal $H_{LP}T_{HP}$ has greatest magnitude at the edges of an object having high contrast with respect to the background against which it is moving. Where the background and the moving object are close in intensity, the motion-representative signal $H_{LP}T_{HP}$ has a low magnitude. In addition, quickly moving objects with soft edges also produce a low magnitude motion signal. Finally, even with quickly moving, high contrast objects, the motion-representative signal $H_{LP}T_{HP}$ is usually only strong within several pixels of the moving object's edge.

In order to minimize the effect of these variations in the filtered motion-representative signal $H_{LP}T_{HP}$, magnitude detector 220 detects the magnitude of the motion-representative signal $H_{LP}T_{HP}$ from the subtracter 218 and produces a single-bit signal indicating either the presence or absence of motion for that pixel. A known magnitude detector 220 may include a multiplexer having a control input terminal responsive to a sign bit of the applied motion- representative signal $H_{LP}T_{HP}$. The motion-representative signal $H_{LP}T_{HP}$ would be coupled to a first input terminal of the multiplexer and an input terminal of an arithmetic negator circuit. An output terminal of the arithmetic negator circuit would be coupled to a second input terminal of the multiplexer. The output terminal of the multiplexer produces the magnitude (absolute value) of the motion- representative signal $H_{LP}T_{HP}$. If the sign bit is a logic "0", indicating, for example, that the motion-representative signal value is positive, then the multiplexer couples the first input terminal, carrying the motion-representative signal $H_{LP}T_{HP}$ to the output terminal. If the sign bit is a logic "1", indicating that the motion-representative signal value is negative, then the multiplexer couples the second input terminal, carrying the arithmetic negative of the motion-representative signal $H_{LP}T_{HP}$ (which would be a positive valued signal) from the negator to the output terminal.

This magnitude signal is then supplied to a known comparator circuit. The comparator circuit compares the magnitude signal to a predetermined threshold value. If the magnitude signal exceeds the threshold value, then the comparator circuit produces an output signal which is a logic "1" signal. If the magnitude signal is less than the threshold value, then the comparator circuit produces an output signal which is a logic "0" signal. The output of this comparator is a single bit motion-representative signal which is a logic "1" in the presence of motion, and a logic "0" otherwise.

This single-bit motion-representative signal is spread vertically and horizontally by signal spreader 222 to generate the spread motion signal M. Optionally, the signal may be spread temporally, vertically and horizontally by signal spreader 222. Apparatus for spreading such a single bit motion-representative-signal is described in detail in U.S. Pat. No. 5,083,203 issued 21 Jan. 1992 to J. W. Ko et alii and entitled CONTROL SIGNAL SPREADER, and assigned to Samsung Electronics Co., Ltd., pursuant to the obligations of the inventors to so assign their inventions at the time those inventions were made. The spread motion signal M produced by signal spreader 222 is a multi-bit digital signal whose value gradually decreases from a maximum value in moving areas (as indicated by the single-bit hi-level signal having a logic "1" value) to a minimum (zero) value in the still region area around the moving area in the vertical and horizontal directions (and optionally, temporally). This spread motion signal M is used in the adaptive luma separator 104 for adaptively processing the video signal V as described below. The motion signal M is also compatibly encoded so as to be recordable and reproducible, to be recovered and utilized by a decoder as will be described in detail later.

As described above, in the absence of image motion, the luminance signal Y is preferably the temporally-filtered luminance signal $Y_T$, but in the presence of image motion, the luminance signal Y is preferably the spatially-filtered luminance signal $Y_S$. Soft switch 214 will continuously vary the proportion of the two input signals $Y_T$ and $Y_S$ which can be coupled to the luminance signal Y output terminal 215 in response to the value of the motion signal M. If the value of the motion signal M is zero, or nearly zero, indicating no motion or a low level of motion, then the soft switch produces an output signal Y which is composed completely of the temporally-filtered luminance input signal $Y_T$. If the value of the motion signal M is at a maximum, or nearly maximum, indicating a high level of motion, then the soft switch 214 produces an output signal Y which is composed completely of the spatially-filtered luminance signal $Y_S$. At intermediate values of the motion signal M, the output signal contains some proportion of each of the input signals $Y_T$ and $Y_S$. The operation of soft switch 214 will be described in more detail below.

The NTSC chrominance component is extracted from the composite video signal V in a known manner using the horizontal, BPF 206. The separated chrominance component signal (modulated on the 3.58 MHz NTSC chroma subcarrier) from horizontal BPF 206 is processed to avoid crosstalk by anti-crosstalk processor 224, and then supplied as chrominance signal C to the input of the chroma modulator 226 of chrominance/motion signal combining circuit 116, to be down-converted in frequency to a 629 kHz color-under signal for VHS format recording by chrominance signal modulator 226. This can be done in a known manner_e.g., by heterodyning 3.58 MHz NTSC chroma signal against a 4.21 MHz four-phase carrier and selecting only the lower resultant sidebands, to provide the color-under chrominance component signal amplitude modulated on a 629 kHz carrier. Before its down-conversion by the modulator 226, the chrominance component signal is processed by the anti-crosstalk element 224 to reduce adjacent line crosstalk with the motion signal M in the composite chrominance-plus-motion signal (C+M). Anti-crosstalk element 224 may be, for example, a vertical highpass filter (VHPF), which may be implemented as a three-tap line-comb lowpass filter. Optionally, a vertical filtering of the composite video signal V may precede the horizontal bandpass filtering by horizontal BPF 206 at the chroma separation stage.

Figure 6:
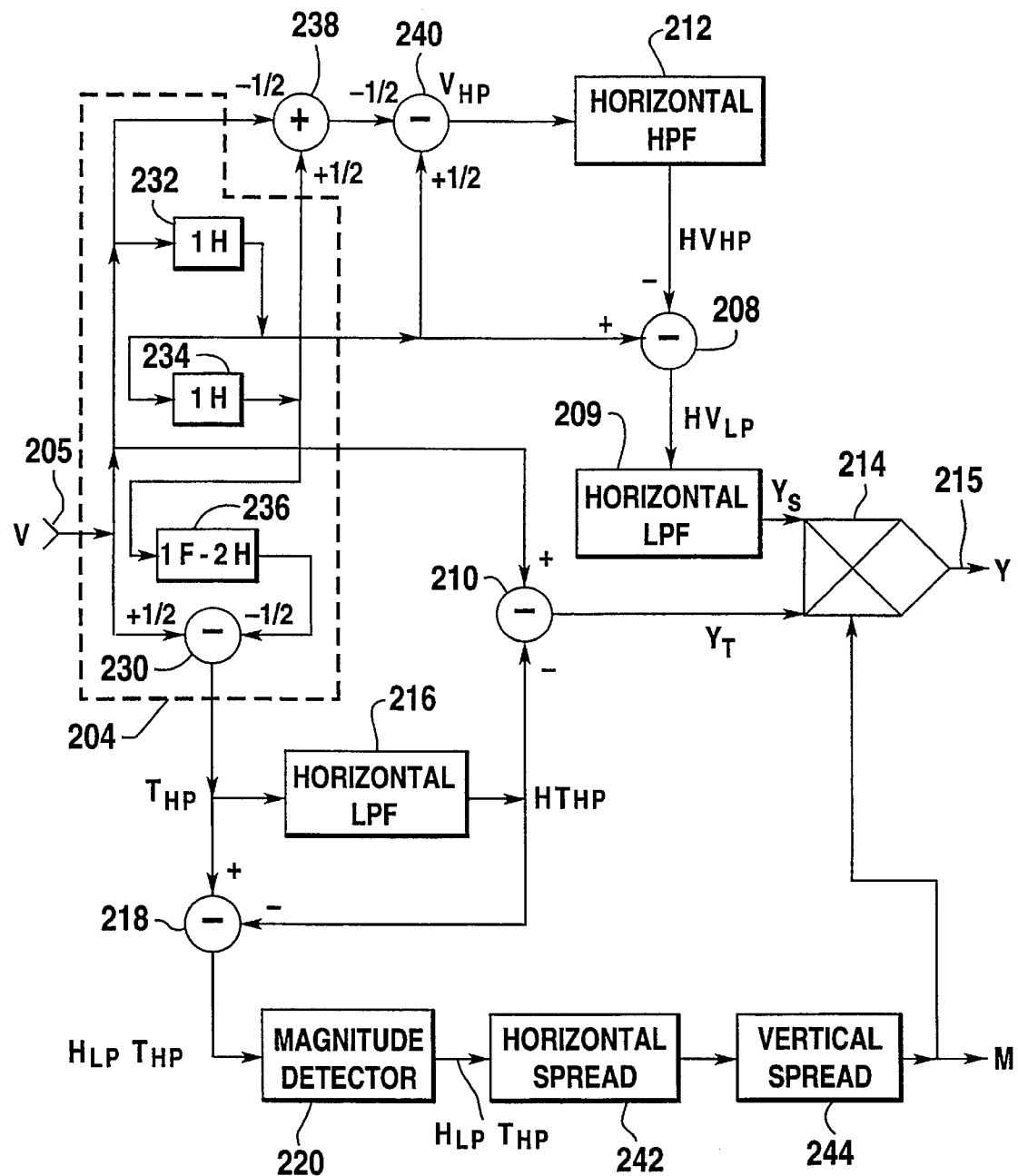
FIG. 6 is a block diagram showing an implementation of the adaptive luminance separation portion and motion signal generating portion of the FIG. 5 encoder.

FIG. 6 shows a particular construction of the FIG. 5 circuitry in which the comb filters VHPF 202 and THPF 204, both responsive to the composite video signal V are implemented so they can share delay lines. In FIG. 6, elements which are the same as those in FIG. 5 have the same reference number designation and are not described in further detail below.

In FIG. 6, THPF 204 is shown as including a subtractor 230 having a minuend input terminal connected to the input terminal 205 for receiving the digitized composite video signal V and having a subtrahend input terminal for receiving the signal V as delayed by one frame. The signal V is delayed by one frame by the cascade connection of a first 1H delay line 232, a second 1H delay line 234 and a 1F–2H delay line 236, also included in THPF 204. The 1H delay lines 232 and 234 each provide a respective delay equal to the duration of one horizontal scan line; and the 1F–2H delay line 236 provides a respective delay shorter than the duration of one frame scan by the duration of two horizontal scan lines. The difference output of the subtractor 230 supplies the response $T_{HP}$ of THPF 204.

VHPF 202 also incorporates the 1H delay lines 232 and 234, sharing them with THPF 204, as well as including an adder 238 and a subtractor 240 not included in THPF 204. The digitized composite video signal V as received at terminal 205 is halved by a bit place shift for application as a first summand input to the adder 238; and the signal V is delayed by the duration of two horizontal scan lines in the 1H delay lines 232 and 234, then halved by a bit place shift for application as a second summand input to the adder 238. The sum output signal of the adder 238 is halved by a bit place shift for application as a subtrahend input signal of the subtractor 240. The digitized composite video signal V received at terminal 205 and delayed by the duration of one horizontal scan line in the 1H delay line 232 is halved by a bit place shift for application as a minuend input signal of the subtractor 240. The difference output signal from the subtractor 240 is supplied to the input terminal of HHPF 212 as the response of VHPF 202, when VHPF 202 is implemented per FIG. 6.

The separated chrominance and luminance detail information response at the output terminal of HHPF 212 is supplied as the subtrahend input signal for the subtractor 208 in FIG. 6, just as in FIG. 5. The digitized composite video signal V received at terminal 205 and delayed by the duration of one horizontal scan line in the 1H delay line 232 is further delayed (by means not shown in FIG. 6) to compensate for the delays through the subtractor 240 and HHPF 212, and after being so further delayed is supplied as a minuend input signal for the subtractor 208. The difference output signal from the subtractor 208 is a diagonally lowpass filtered output signal horizontally lowpass-filtered by HLPF 209 to produce the spatially-filtered luminance signal $Y_S$.

In FIG. 6 the output terminal of subtractor 218 is followed by the cascade connection of the magnitude detector 220, a horizontal spreader 242 and a vertical spreader 244. The combination of horizontal spreader 242 and vertical spreader 244 forms the motion signal spreader 222 of FIG. 5 and operates as described above. The remainder of the FIG. 6 block diagram is the same as illustrated in FIG. 5 and described above. It will be understood that FIG. 6 does not purport to show timing accuracy, or timing matching. That is, FIG. 6 does not show all the delay lines which would be utilized for equalizing the delays along the respective signal paths to maintain pixel correlation. A person of ordinary skill in the signal processing art would understand the need for providing correction for timing mismatching, and would also have knowledge of various ways in which such correction could be implemented, and it is therefore not necessary to describe such in detail here.

Figure 7:
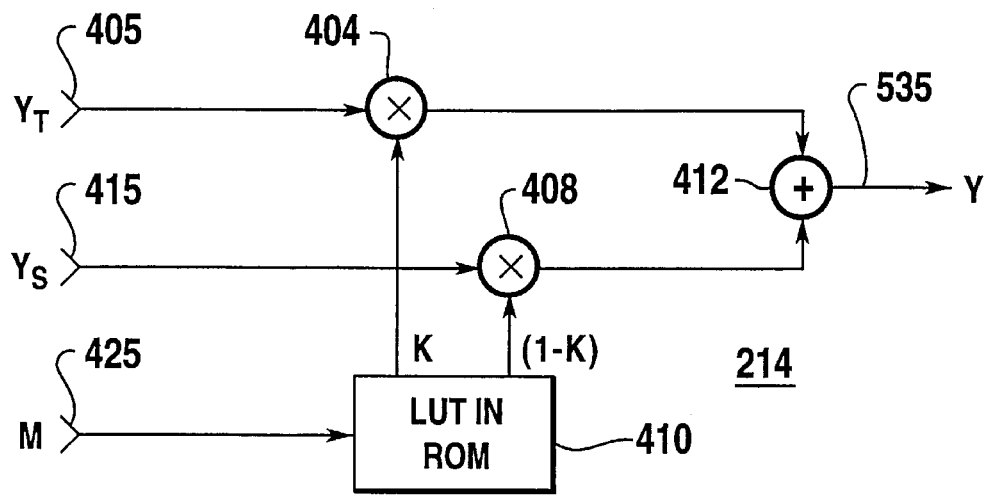
FIG. 7 is a block diagram showing in more detail a soft switch employed in an adaptive luminance filtering section of the FIG. 2 encoder.

FIG. 7 is a more detailed block diagram of the soft switch 214 illustrated in FIG. 5. Soft switch 214 is utilized for motion-adaptive processing of the spatially-filtered luminance signal $Y_S$ and the temporally-filtered luminance signal $Y_T$. In FIG. 7, a first signal input terminal 405 of soft switch 214 is coupled to the output terminal of subtractor 210 of FIG. 5 for receiving the temporally-filtered luminance signal $Y_T$ therefrom. Input terminal 405 is coupled to a first input terminal of a multiplier 404. An output terminal of multiplier 404 is coupled to a first input terminal of an adder 412. An output terminal of adder 412 is coupled to an output terminal 435. Output terminal 435 is coupled to the deemphasis and folding circuitry 108 of FIG. 2.

A second signal input terminal 415 of soft switch 214 is coupled to an output terminal of the HLPF 209 of FIG. 5 for receiving the spatially-filtered luminance signal $Y_S$ therefrom. Input terminal 415 is coupled to a first input terminal of a multiplier 408. An output terminal of multiplier 408 is coupled to a second input terminal of adder 412. A control input terminal 425 of soft switch 214 is coupled to the spread motion signal (M) output terminal of signal spreader 222 of FIG. 5. Input terminal 425 is coupled to an input terminal of a read-only memory (ROM) 410 storing a look-up fable. A portion of the readout from the read-only memory 410 provides a first scaling factor K to a second input terminal of multiplier 404, and another portion of the readout from the read-only memory 410 provides a second scaling factor (1-K) to a second input terminal of multiplier 408.

In operation, the spread motion signal M from input terminal 425 is applied to the address input of a read-only memory 410 storing a look-up table of the two scaling factors, K and (1-K) which are related to the value of the control signal M. The first scaling factor K is the proportion of the temporally-filtered luminance signal $Y_T$ which should be in the luminance output signal Y. The second scaling factor (1-K) is the proportion of the spatially-filtered luminance signal Y S which should be in the motion-adapted luminance output signal Y. The sum of K and (1-K) is one. The multiplier 404 scales the temporally-filtered luminance signal $Y_T$ by the scaling factor K, and multiplier 408 scales the spatially-filtered luminance signal $Y_S$ by the scaling factor (1-K). Adder 412 sums the two scaled signals output by the multipliers 404 and 408 to produce the motion-adaptively spatio-temporally filtered separated luminance signal Y.

The motion adaptive spatio-temporal luminance processing function K(M) is selected such that when M is equal to zero or nearly zero (corresponding to a low level of motion in the luminance component), K is equal to one (all temporally-filtered luminance) and (1-K) is equal to zero (no spatially-filtered luminance), and when M is at maximum or nearly maximum (corresponding to a high level of motion in the luminance component), K is equal to zero (no temporally-filtered luminance) and (1-K) is equal to one (all spatially-filtered luminance). The function K(M) is continuous and may be linear or non-linear. As the value of the motion signal M gradually changes from zero to maximum, the proportion of the temporally-filtered luminance signal $Y_T$ in the luminance output signal Y gradually decreases and the proportion of the spatially-filtered luminance signal $Y_S$ in the luminance signal output Y gradually increases, and vice versa.

In a modification of the FIG. 5 circuitry, the second scaling factor (1-K) instead of being stored in ROM could be generated by subtracting from unity the first scaling factor K as supplied from ROM addressed by the spread motion signal M. Or, alternatively, the first scaling factor K instead of being stored in ROM could be generated by subtracting from unity the second scaling factor (1-K) as supplied from ROM addressed by the spread motion signal M.

As described above, during recording. It is possible to derive a motion-representative signal during the processing of the input composite video signal to separate its luminance signal component. So-called "false motion" may be introduced into this motion-representative signal by the chrominance signal (i.e., chrominance information which aliases as motion), but this erroneous detection of motion can be largely eliminated by temporally lowpass-filtering the spatially lowpass-filtered composite signal as shown in FIG. 5 (or, alternatively, by vertically and horizontally lowpass filtering the temporally highpass-filtered signal). Because the NTSC chrominance component sidebands do not extend down below 2 MHz, the horizontal lowpass filtering ensures that chrominance components which might give rise to false motion are removed from the motion-representative signal during the motion derivation process.

Also as described above, the luminance high frequencies are folded into the low-frequency luminance signal spectrum by modulating them on a folding carrier which is placed in a Fukinuki hole, similar to the manner in which the NTSC chrominance subcarrier is placed in the composite NTSC video signal. However, there are no restrictions on how far down in frequency the lower sidebands of the folded luminance high frequencies can extend. In fact, diagonal detail in the high-band luminance signal, when folded into the luminance low-band frequencies, can extend all the way down to spatial DC. Because the folding carrier is alternated on a frame-to-frame basis (to maximize the temporal distance from DC) these diagonal details may be erroneously detected as motion, and no degree of spatial filtering can suppress this type of "false motion". Thus, to properly remove the folding byproducts from the unfolded luminance signal on playback, it is necessary to supply a separate channel for passing the motion-representative signal, derived during the encoding side processing and utilized for motion-adaptively filtering the separated luminance component signal, to the decoder side for utilization in motion adaptively prefiltering the unfolded luminance signal.

Providing a separate channel for supplying the motion representative signal to the playback circuitry facilitates the maintenance of correspondence of the motion-adaptive luminance reconstruction process in the playback circuitry to the motion-adaptive processing used in the luminance signal separator of the record circuitry. For example, suppose the luminance signal separator in the record circuitry uses temporal processing in some region of the image to derive the luminance signal with extended resolution in the diagonal directions. It would be undesirable to use spatial processing on the playback side to reconstruct in the same region of the image, since the extended resolution in the diagonal directions would be discarded, making fruitless the effort made during recording to preserve such resolution.

Further, the chrominance/luminance signal separation process performed on the composite NTSC signal in the encoder, no matter how well done, can introduce some artifacts into the image (e.g., chrominance aliasing as luminance and luminance aliasing as chrominance. The full-bandwidth luminance signal reconstruction process performed in the decoder can also introduce artifacts into the image. If the second process is independent of the first process, then the artifacts introduced by the upstream process have artifacts introduced upon them by the downstream process, intensifying them. Artifact intensification can be greatly reduced if the downstream processing can be made to faithfully follow, that is, to parallel, the upstream processing.

In an implementation compatible with the VHS format, a separate channel in the transmission or recording medium for the motion representative signal is provided for by encoding the motion signal into vacant quadrants of the VHS format color-under carrier on the record side. On the playback side, the encoded motion signal must be separated from the reproduced color-under carrier component, in order that the recovered motion signal may be utilized for motion-adaptive filtering of the unfolded luminance signal.

Figure 8:
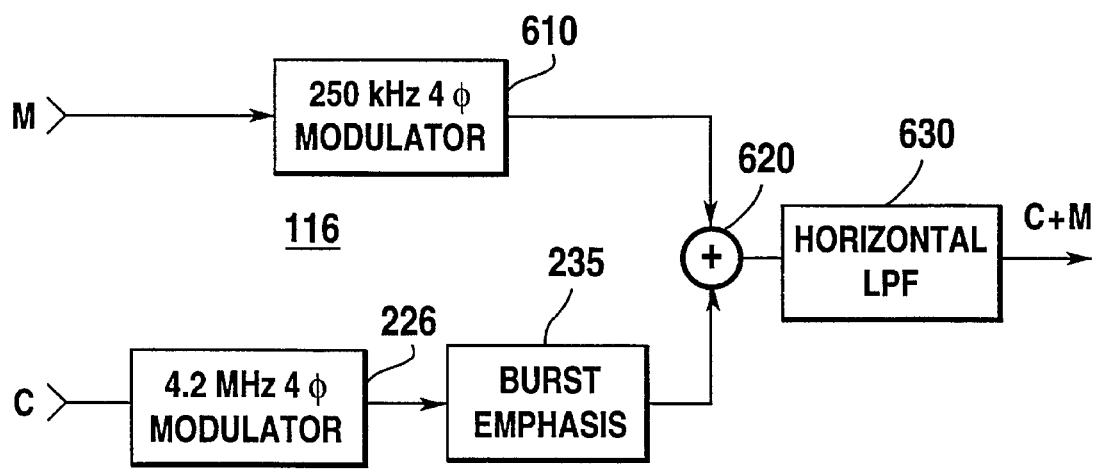
FIG. 8 is a detailed block diagram of a chrominance/motion combining circuit in the FIG. 2 encoder.

FIG. 8 shows the chrominance/motion combining circuit 116 of FIG. 2 according to a VHS format-compatible embodiment in more detail. The spread motion signal M from output terminal 225 is input to a modulator 610 and modulated on a 250 kHz four-phase carrier to generate a modulated motion signal component having a horizontal frequency of 250 kHz and with its phase shifting forward or backward 90° per line in alternate fields in complementary fashion (phase complement) to that of the 629 VHS kHz color-under carrier C, so that in those fields (tracks) where the color-under carrier C occupies the first and third quadrants, the motion signal M occupies the second and fourth quadrants, while in opposite fields (tracks) the color-under carrier C and motion signal M reverse quadrants. The down-converted color-under carrier component C from chroma modulator 226 in FIG. 5 and the modulated motion signal component M from modulator 610 are input to respective signal inputs of an adder 620 to be combined into the resultant chrominance-plus-motion signal (C+M). One skilled in the art that the chrominance signal C may be appropriately processed for color burst emphasis by way of example, using burst emphasis or gating circuitry 235 to boost the amplitude of color burst portions of the chrominance signal C prior to that signal being supplied to adder 620. The chrominance-plus-motion signal (C+M) supplied from the adder 620 thus contains the chrominance information C as well as the spread motion signal information M modulated on a four-phase carrier but occupying complementary quadrants of the carrier, advancing and retarding 90° in phase and alternating between even and odd quadrants in alternate fields. The chrominance-plus-motion signal (C+M) from the adder 620 is then filtered by a horizontal lowpass filter (HLPF) 630 having a break frequency around 1.2 to 1.3 MHz. The response of the filter 630 supplied to DAC 118 to be converted to an analog signal $(C+M)_R$ included as an under signal in the frequency-multiplexed signal supplied to the VCR 40 for recording.

The choice of the 250 kHz carrier frequency for the motion signal is made in order best to reduce the visibility of interference during slowest playback of an encoded recording on a conventional VHS format playback device. However, it is also possible to modulate the motion information on a 629 kHz carrier like the chroma, so long as the quadrants occupied by the respective signals are complementary as described above. This procedure is satisfactory except at the slowest playback speeds. The generation of under signals encoding chrominance signal C and motion signal M is described in further detail in the above-referenced U.S. patent application Ser. No. 059,765 filed 11 May 1993.

Figure 9:
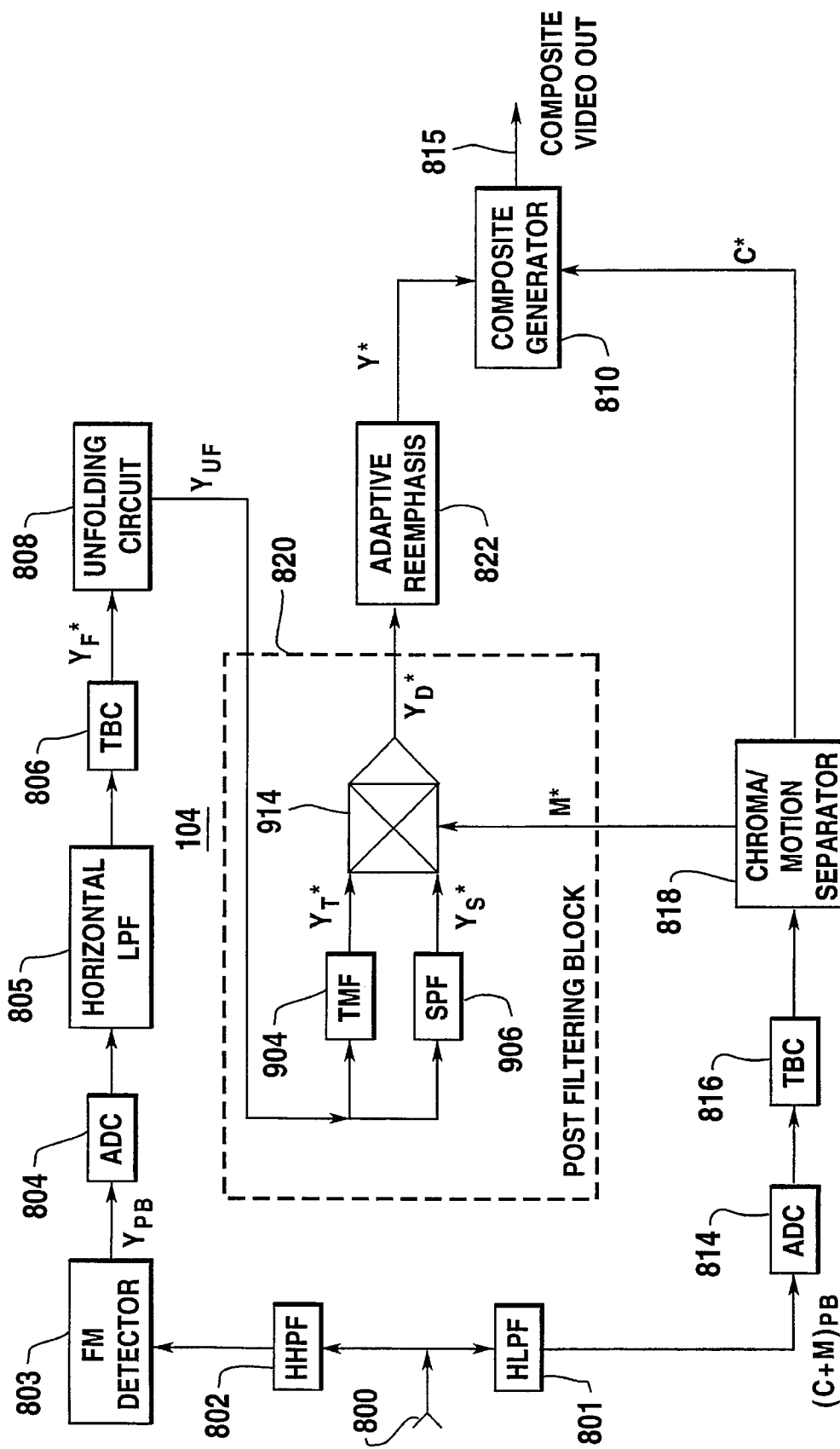
FIG. 9 is a block diagram of a decoder used in the playback portion of the FIG. 1 system.

FIG. 9 is a more detailed block diagram of the signal separator 50, the unfolder 60 and the reemphasis circuitry 70 following the VCP 45 in FIG. 1. In FIG. 9, an input terminal 800 receives the frequency-multiplex signal reproduced by the VCP 45 of FIG. 1 when playing back from the video tape cassette. Input terminal 800 is coupled to the input terminal of a horizontal highpass filter 802 that separates the frequency-modulated luminance carrier from the reproduced frequency-multiplex signal for application to FM detector circuitry 803, which circuitry typically comprises a limiter amplifier and an edge-counting FM detector. The folded luminance signal $Y_{PB}$ recovered by the FM detector circuitry 803 is supplied to the input terminal of an analog-to-digital converter (ADC) 804. An output terminal of ADC 804 is coupled to an input terminal of a horizontal lowpass filter (HLPF) 805 having a passband cutting off at around 2.5 MHz or 3 MHz, depending on the bandwidth of the folded luminance signal $Y_{PB}$. An advantage of filtering the playback luminance signal digitally is that the group delay characteristics of the digital HLPF 805 may be made flat, which is difficult to achieve in an analog implementation. The output terminal of HLPF 805 is coupled to an input terminal of a time base corrector (TBC) 806. An output terminal of TBC 806 is coupled to a data input terminal of an unfolding circuit 808. An output terminal of unfolding circuit 808 is coupled to a luminance signal input terminal of a spatio-temporal post-filter 820. An output terminal of post-filter 820 is coupled to an input terminal of an adaptive reemphasis circuit 822. An output terminal of the adaptive reemphasis circuit 822 is coupled to a luminance signal input terminal of a composite video signal generator 810 for supplying it a (digital) reproduced luminance signal Y* (where "*" indicates a playback signal representing the same signal as previously recorded on the cassette). The composite video signal generator 810 of a known type combines a digital chrominance signal C* with the luminance signal Y* to form a standard (digital or analog) composite video signal. Composite video signal generator 810 typically includes a DAC or DACs for converting the applied digital luminance and chrominance component signals Y* and C* to analog signals.

An output terminal of composite video signal generator 810 is coupled to an output terminal 815. Output terminal 815 is coupled to utilization circuitry (not shown) which, for example, may be a television receiver for reproducing the images which were previously recorded on the cassette or a Y-C output jack. Alternatively, the recovered luminance and chrominance signals Y* and C*, which are in digital form, may be output directly in digital form for utilization in further processing, or may be converted to analog form by respective DACs and output directly as analog Y and C signals for further utilization.

Input terminal 800 is coupled to the input terminal of a horizontal lowpass filter 801 that separates the under signal component encoding (C+M) from that reproduced frequency-multiplex signal. An output terminal of the lowpass filter 801 connects to an input terminal of an analog-to-digital converter (ADC) 814, to supply for digitization the under signal component encoding (C+M) separated from the reproduced frequency-multiplex signal. An output terminal of ADC 814 is coupled to an input terminal of a time base corrector (TBC) 816. An output terminal of TBC 816 is coupled to an input terminal of a chrominance/motion signal separator 818. Tile chrominance/motion signal separator 818 includes an upconverter for generating a digitized chrominance signal C* from the color-under signal. A chrominance signal output terminal of the chrominance/motion signal separator 818 is coupled to a chrominance input terminal of the composite video signal generator 810 for supplying it the digitized chrominance signal C*. A motion signal output terminal of the chrominance/motion signal separator 818 is coupled to a control input terminal of the spatio-temporal prefilter 820.

In operation, the elements 802, 803, 804, 805, 806, 808, 820 and 822 in FIG. 9 operate to extract the full-bandwidth luminance signal from the reduced bandwidth luminance signal previously recorded on the cassette. ADC 804 produces a sampled multi-bit digital signal representing the playback folded luminance signal. The TBC 806 operates to correct any timing inaccuracies which are introduced by jitter in the tape mechanism or any other source of timing inaccuracy, and produces the recovered folded luminance signal $Y_F^*$.

After time base correction by TBC 806, the folded luminance signal $Y_F^*$ is applied to one input of the unfolding circuit 808. The low-band luminance component tends to be in-phase from frame to frame, and the folded luminance high-band component tends to reverse phase from frame to frame. The unfolding circuit 808 unfolds (i.e., re-shifts) the luminance high-band frequencies which were previously folded into the luminance low-band frequency spectrum and combines the low-band and high-band luminance signals to output the full-bandwidth unfolded luminance signal $Y_{UF}$. This full-bandwidth unfolded luminance signal $Y_{UF}$ is supplied to the spatio-temporal post-filter 820 where the unfolded full-bandwidth luminance signal $Y_{UF}$ is motion-adaptively spatio-temporally filtered to provide the deemphasized luminance signal $Y_D^*$ having the high-frequency luminance components still deemphasized due to the record side deemphasis processing. This unfolded deemphasized luminance signal $Y_D^*$ is supplied to the adaptive reemphasis circuit 822 where the deemphasized, high-frequency components are adaptively reemphasized to restore them to their original amplitude to provide the recovered full-bandwidth luminance signal Y* with proper amplitude relationship.

The recovered full-bandwidth luminance signal Y* is supplied to the luminance signal input terminal of the composite video signal generator 810. Composite video signal generator 810 operates in a known manner to combine the luminance signal Y* and chrominance signal C* to form a standard (digital or analog) composite video signal. This signal may be used by any equipment which utilizes such a signal, for example, a television receiver or display monitor.

The elements 801, 814, 816 and 818 in FIG. 9 operate to extract the chrominance-plus-motion (C+M) signal previously recorded on the cassette. The ADC 814 produces a sampled multi-bit digital signal representing the chrominance-plus-motion signal and the TBC 816 operates to correct any timing inaccuracies in this signal, and produces the recovered chrominance-plus-motion signal (C+M)*. A chrominance motion separator 818 processes the recovered chrominance-plus-motion signal (C+M)* to produce a recovered motion signal M*, which is supplied to the control input terminal of the spatio-temporal post-filter 820, and to up-convert the color-under signal to produce the chrominance signal C*, which is supplied to the chrominance signal input terminal of the composite video signal generator 810.

When recorded, the chrominance signal and the luminance signals were in phase synchronism. However, they are passed through two separate independent paths in the record circuitry (illustrated in FIG. 1) and are frequency-division-multiplexed on the cassette. This separate processing may introduce phase inaccuracies between the two signals which are not compensated for in the two separate TBCs 806 and 816. Apparatus for restoring the proper phase relationship between the chrominance and luminance signals is described in detail in U.S. Pat. No. 5.083,197 issued 21 Jan. 1992 to J. W. Ko et alii, entitled APPARATUS FOR RESTORING THE CORRECT PHASE RELATION OF THE CHROMA AND LUMINANCE SIGNALS PASSED THROUGH SEPARATE PATHS, and assigned to Samsung Electronics Co., Ltd., pursuant to the obligations of the inventors to so assign their inventions at the time those inventions were made.

Figure 10:
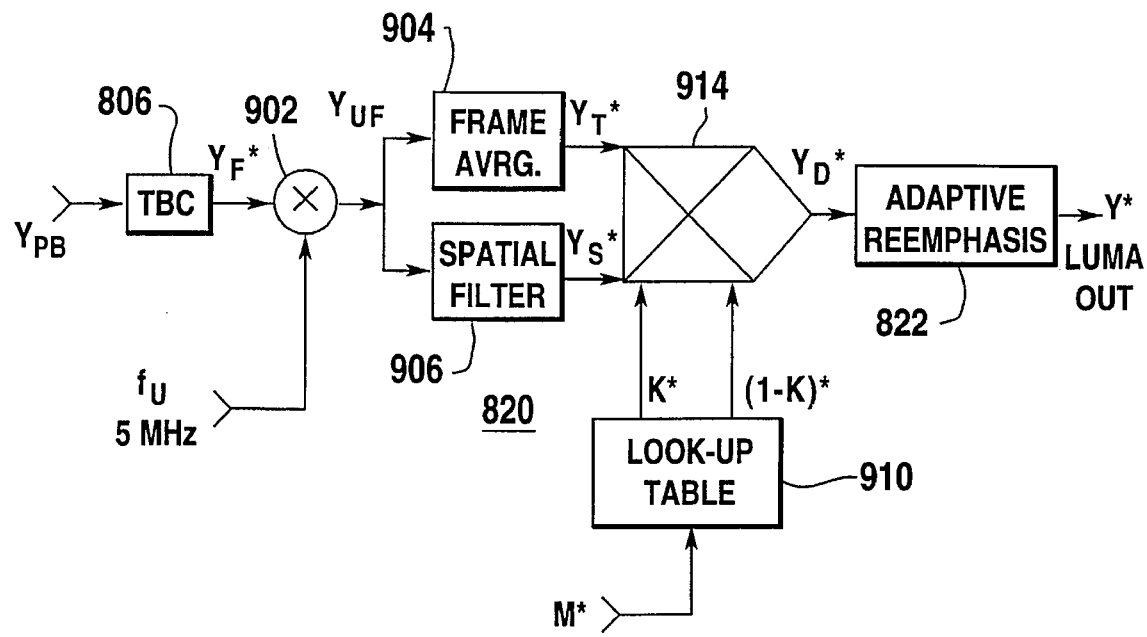
FIG. 10 is a block diagram of unfolding circuitry used in the FIG. 9 decoder.

FIG. 10 is a block diagram of a portion of the luminance recovery section illustrated in the upper half of FIG. 9, showing in more detail the unfolding circuit 808 and the spatio-temporal post-filter 820. After time base correction by TBC 806, the folded luminance signal $Y_F^*$ is applied to one input of unfolding circuit 808, which may be implemented by a modulator 902 to which is also supplied an unfolding carrier having a frequency $f_U$. The folded luminance signal is unfolded by direct or "straight" sub-Nyquist sampling $Y_F^*$ (as contrasted to the "offset" technique employed during folding) around the unfolding frequency (selected to be 5 MHz, for example, in accordance with the criteria described above in the description of the folding modulator 512 of FIG. 35) by the modulator 902, to provide the unfolded luminance signal $Y_{UF}$. Unfolding modulator 902 may be constructed in a known manner using a four quadrant multiplier, and is preferably a +1, 0 type modulator operating to insert zero values replacing odd or even samples depending on the unfolding phase, driven by a clock signal at one-half the sampling frequency, which in this example is a sampling frequency of 10 MHz.

The unfolded (i.e., remodulated)luminance signal $Y_{UF}$ is then applied to the input terminal of spatio-temporal post-filter 820 for removal of byproducts of the unfolding process prior to reemphasis of the unfolded high-frequency luminance component. The post-filter 820 includes a temporal lowpass filter (TLPF) 904 configured as a frame-comb lowpass filter (which may be identical in structure and operation to THPF 204, HHPF 216 and subtractor 210 in FIGS. 5 and 6) which provides frame averaging and removes components all the way down to spatial DC from the unfolded luminance signal $Y_{UF}$ for providing temporally-filtered unfolded luminance signal $Y_T^*$. Temporal filter 904 is arranged in parallel with a spatial filter (SPF) 906 (which may be identical in structure and operation to VHPF 202, HHPF 212, subtractor 208 and HLPF 209 in FIGS. 5 and 6) acting as a diagonal lowpass filter for providing spatially-filtered unfolded luminance signal $Y_S^*$.

A soft switch 914 having its data inputs connected to the $Y_T^*$ and $Y_S^*$ outputs of TMF 904 and SPF 906, respectively, varies its data output proportionally between the temporally filtered and spatially filtered unfolded luminance signals applied at its data inputs from TMF 904 and SPF 906, under control of motion-adaptive scaling factor signals K* and (1–K)* which are applied to control input terminals of soft switch 914 from a look-up table (LUT) stored in a read-only memory 910. The ROM 910 generates scaling factor signals K* and (1–K)* for each LUT table entry stored therein, as individually addressed in accordance with the recovered motion signal M* supplied to the input address terminals of ROM 910 from chrominance/motion separation circuit 818, for performing motion-adaptive post-filtering of the unfolded luminance signal $Y_{uf}$ prior to the reemphasis stage processing. The output terminal of soft switch 914 is coupled to an output terminal of post-filter 820 at which is provided the spatio-temporally post-filtered unfolded deemphasized luminance signal $Y_D^*$ which is in turn coupled to the luminance signal input terminal of adaptive reemphasis circuit 822.

As noted, SPF 906 may correspond in structure and operation to the luminance spatial filter section of the adaptive luma separation circuit 104 formed by VHPF 202, HHPF 212, subtracter 208 and HLPF 209 shown in FIG. 5. SPF 906 provides a diagonal lowpass filter response for spatially processing the unfolded signal to remove unfolding artifacts i.e., remodulation byproducts and residual unfolding carrier which may be present during image motion and which manifest strongly in the diagonal. This correspondence permits utilization of the same filter in encoding and decoding.

Soft switch 914 controls the proportion of the temporally-filtered and spatially-filtered unfolded full-bandwidth luminance signals $Y_T^*$ and $Y_S^*$ to be included in the spatio-temporally post-filtered unfolded deemphasized luminance signal $Y_D^*$ in response to the recovered motion control signal M*. When the level of image motion is zero or nearly zero, the output of the soft switch 914 consists entirely of temporally-filtered unfolded luminance signal $Y_T^*$ from TMF 904, and does not contain any of spatially-filtered unfolded luminance signal $Y_S^*$. As the magnitude of motion in the image gradually increases, the proportion of the temporally-filtered luminance signal $Y_T^*$ input from the TMF 904 in the output of the soft switch 914 correspondingly decreases and the proportion of the spatially-filtered luminance signal $Y_S^*$ input from SPF 906 correspondingly increases. In the presence of relatively high levels of motion, the output from the soft switch 914 will consist entirely of the spatially-filtered signal $Y_S^*$ from SPF 906.

Figure 11:
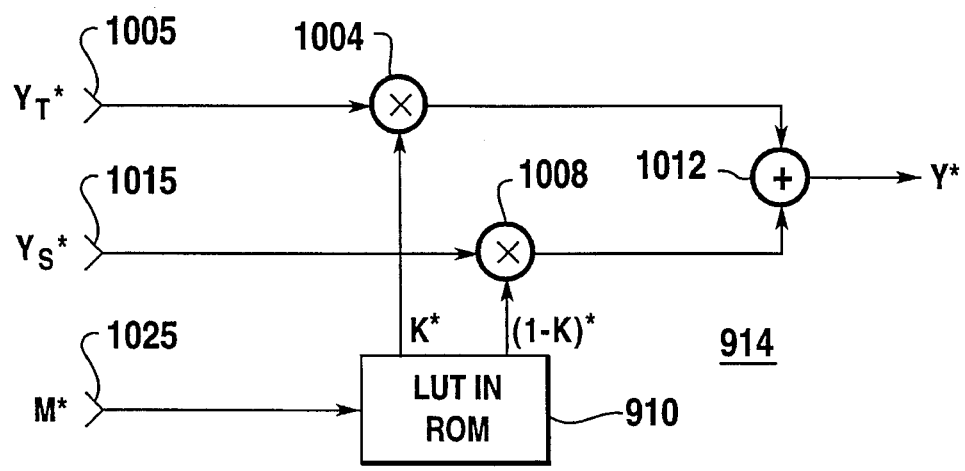
FIG. 11 is a block diagram showing in more detail a soft switch employed in a spatio-temporal post filter circuit of the FIG. 10 unfolding circuitry.

Referring now to FIG. 11, there is shown a more detailed block diagram of the soft switch 914 of the post-filter 820 in FIG. 9 or 10. Soft switch 914 is constructed in identical fashion to soft switch 214 shown in FIG. 7. In FIG. 11, input terminals 1005 and 1015 for temporally-filtered unfolded luminance signal $Y_T^*$ and spatially-filtered unfolded luminance signal $Y_S^*$ respectively correspond to input terminals 405 and 415 in FIG. 7. Multipliers 1004 and 1008 correspond to multipliers 404 and 408, respectively, in FIG. 7. Likewise, ROM 910 in FIG. 11 having motion signal M* input terminal 1025 corresponds to ROM 410 in FIG. 5 having motion signal M input terminal 425. Similarly, adder 1012 in FIG. 11 corresponds to adder 412 in FIG. 7, summing the outputs of modulators 1004 and 1008 to provide thereby the motion adaptively spatio-temporally filtered unfolded deemphasized luminance signal $Y_D^*$ at output terminal 1012. Generation of the scaling factor signals K* and (1–K)* by ROM 910 in accordance with the applied recovered motion signal M* is performed in the same manner as was previously described above with regard to the operation of soft switch 214 in FIG. 7 for generating scaling factors K and (1–K) in accordance with motion signal M, and will not be described in further detail here.

Advantageously, the ROMs 410 and 910 respectively used during recording and during playback may be one and the same. Furthermore, because the combining circuitry 30 and signal separator 50 will typically not be operated simultaneously, for advantages of convenience and economy the prefilter 820 in the playback electronics may share many common elements such as filter blocks and the soft switch with the luminance separation circuit 104 in the recording electronics.

Figure 12:
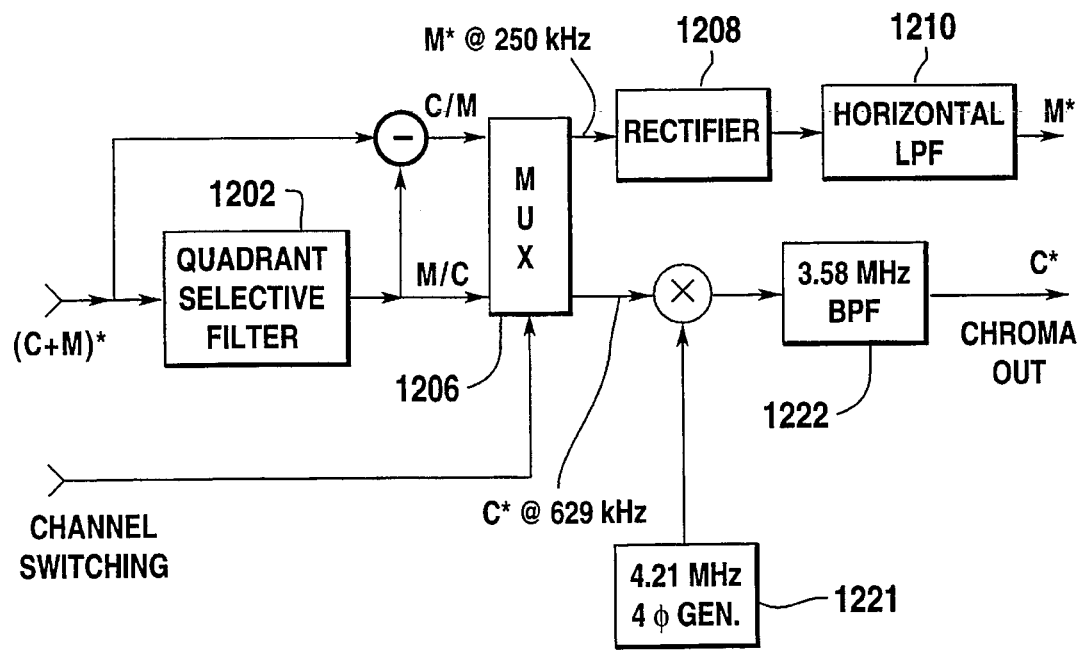
FIG. 12 is a detailed block diagram of chrominance/motion signal separating circuitry in the FIG. 9 decoder.
Figure 13:
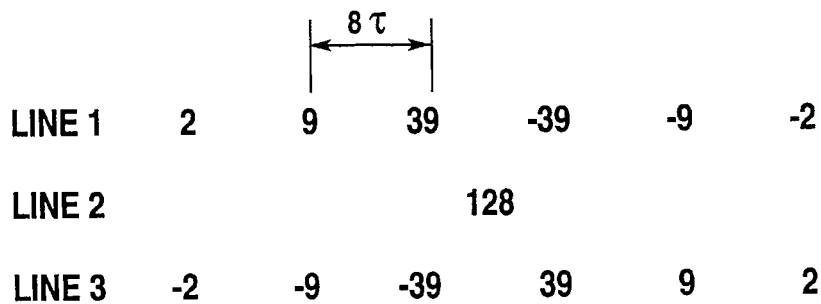
FIG. 13 shows the coefficients of a digitally implemented quadrant selective filter in the FIG. 12 chrominance/motion signal separating circuitry.

The separation of the composite chrominance-plus-motion signal (C+M)* in chrominance/motion separation circuit 818 of FIG. 9 as implemented for application to use with the conventional VHS format will now be described in more detail with reference to FIGS. 12 and 13. In FIG. 12 the separation process is performed directly on the (C+M)* signal prior to up-conversion, while it is still at the color-under frequency. As shown in FIG. 12, the chrominance-plus-motion signal (C+M)* from TBC 816 is applied to the input of a quadrant selective filter QSF 1202 and also to the minuend input of a subtracter 1204. QSF 1202 selects between odd and even quadrants of the input (C+M)* signal and may be implemented by a diagonal filter with delay of 2H (i.e., twice the duration of a horizontal scan line) and having four unique coefficients and a structure as shown in FIG. 13. The horizontal frequency response or selectivity of QSF 1202 is centered on 629 kHz. The bandwidth of the pass region is approximately 1 MHz, providing 500 kHz bandwidth for each sideband for maintaining good chroma response. Due to the fixed nature of QSF 1202, it will be appreciated that for those reproduced tracks (i.e., fields) from the encoded recorded videotape in which the chrominance component of the signal (C+M)* is in a quadrant of QSF 1202 with the positive peaks (pass bands), the filter will pass only the chrominance component, while in the next track (field) only the motion signal component will be passed. Accordingly, QSF passes the motion component or the chroma component, depending on whether the track being decoded is odd or even.

For each track (field/channel) reproduced by the VCP 45, QSF 1202 will pass either the C* or the M* component of the reproduced composite (C+M)* signal to its output, depending on which component is located in the filter's pass region during that track. The output of QSF 1202 is coupled to the subtrahend input of subtracter 1204 in order to obtain the opposite signal component, M* or C*, by differencing the filter output against the composite (C+M)* signal applied at the minuend input of subtracter 1204. The output of QSF 1202 (i.e., M* or C*) and the output of subtracter 1204 (i.e., C* or M*) are coupled to respective inputs of a multiplexer (MUX) 1206 having a pair of inputs and a pair of outputs which are switched at the field rate of 60 Hz under control of a signal (e.g., field pulse or channel-1/channel-2 switching signal) which may be generated in known manner by a conventional head switching circuit (not shown) of the VCP 45, or by conventional channel switching circuitry associated with playback preamplifier circuits. One output of MUX 1206 therefore will continuously provide only the separated chrominance component C* for each track/channel reproduced, while the other output of MUX 1206 will continuously provide only the separated motion signal component The separated motion signal M* is coupled to the input of a full-wave rectifier 1208. As described further on with regard to FIG. 14 the full-wave rectifier 1208 may comprise a synchronous detector for 250 kHz. The output of the rectifier 1208 is coupled to the input of a horizontal lowpass filter (HLPF) 1210 which may be implemented with 15 taps at about 500 kHz. The recovered spread motion signal M* output from HLPF 1210 is supplied to the address input of ROM 910 of the spatio-temporal post-filter 820 for controlling the motion-adaptive filtering of the unfolded luminance signal $Y_{UF}$ as previously described.

The separated chrominance signal component C* supplied from MUX 1206 may be converted to an analog signal by a respective DAC and then processed by a conventional VHS chroma recovery circuit in known manner to obtain the 3.58 MHz NTSC chroma component. This may in fact be preferable from the viewpoint of chroma phase control processing during picture-search and still modes, which is more complex if performed digitally. However, the separated chrominance signal component C* output from MUX 1206 may be also be digitally processed by a digital implementation of a conventional VHS chroma recovery circuit employing a modulator 1220 (e.g., a multiplier) supplied with a 4.21 MHz four-phase carrier, whereby the 629 kHz chroma component carrier is frequency up-converted to 3.58 MHz by heterodyning, then passed through a 3.58 MHz bandpass filter (BPF) 1222 to pass the 3.58 MHz chroma. The chrominance component may be filtered further for removing residual up-conversion carrier and modulation byproducts, and processed for burst deemphasis, if desired. The recovered digital 3.58 MHz chrominance sub-carrier component signal may then be converted to an analog NTSC chroma component signal by a respective DAC, supplied to composite video signal generator 810 (which may include a DAC), or utilized in further processing.

Figure 14:
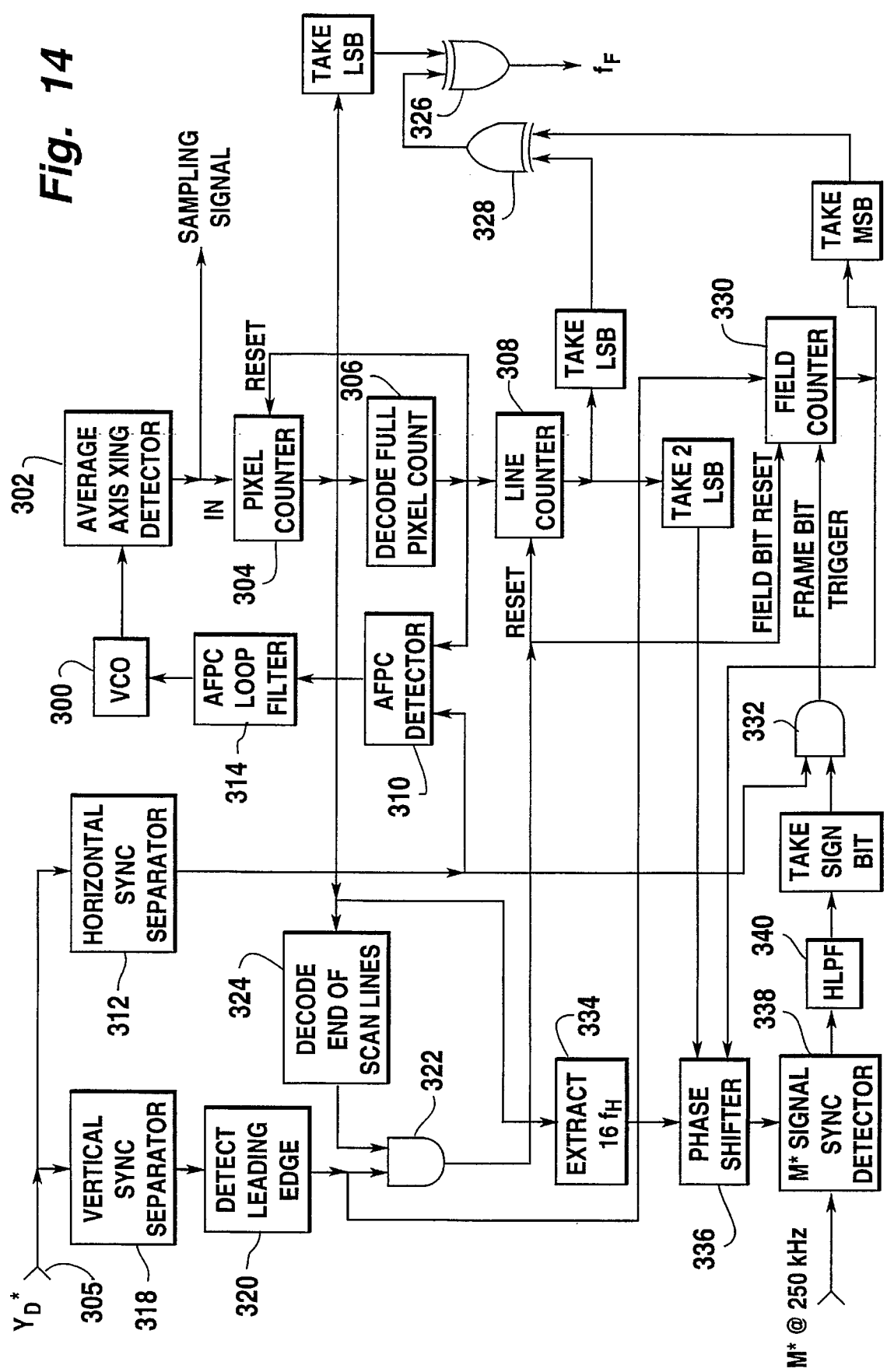
FIG. 14 is a block diagram of circuitry for generating a folding carrier of a frequency that is a multiple of scan line frequency, the phase of which folding carrier is reversed between each pair of successive scan lines.

FIG. 14 shows apparatus included in the playback electronics of a VCR or VCP for generating an unfolding carrier suitable for unfolding luma highs from the Fukinuki areas. The unfolding carrier, which is the same as the folding carrier, is a harmonic of an even multiple of both the line and the frame scan rates, which harmonic reverses phase from scan line to scan line within each frame and from frame to frame.

The generation of the unfolding carrier begins with a line-locked voltage-controlled oscillator (VCO) 300, which oscillates at 640 times scan line frequency (i.e., at 10.07 MHz). Crossings of their average-value axis by those oscillations, which crossings are in a prescribed direction, are detected by an average-axis crossing detector 302 to generate pulses at 10.07 MHz rate that are used to time certain sampling procedures. These pulses are also supplied to a pixel counter 304 for counting in a frequency-dividing procedure. (The word "pixel" is shod for "picture element".) A decoder 306 generates a logic "1" when the pixel counter 304 count reaches the value indicating the counter 304 has counted 640 pixels since last being reset. This logic "1" resets the pixel counter 304 to initial count on the next 10.07 MHz rate pulse supplied to its count input, so the logic "1" condition exists as a pulse of about one sample duration. This pulse is supplied from the decoder 306 to a scan line counter 308 and to an AFPC detector 310.

The AFPC detector 310 compares this pulse (or a portion thereof, such as its trailing edge) with separated horizontal synchronizing pulses supplied from a horizontal sync separator 312 to develop an error voltage, which is lowpass filtered by an AFPC loop filter 314. The AFPC loop filter 314 responds to the error voltage to supply automatic frequency and phase control (AFPC) voltage for controlling the VCO 300, closing the AFPC loop. This AFPC loop "line-locks" the 10.07 MHz oscillations of the VCO 300 to the horizontal sync pulses occurring at the 15,734 kHz scan line rate.

The scan line counter 308 is reset to initial count by the output signal from a two-input AND gate 322 going from logic "1" to logic "0". The leading edges of separated vertical synchronizing pulses supplied from a vertical sync separator 318 are detected by a leading edge detector 320 to generate a logic "1" applied as count input to a field counter 330. The output signal from the leading edge detector 320 is also applied as one input signal to the AND gate 322. A decoder 324 decodes the last 160 pixels at the end of scan lines to generate a logic "1" at the time when separated vertical sync pulses supplied to the AND gate 322, if they begin, must be those occuring at the beginning of a frame rather than midway through. The AND gate 322 accordingly generates a logic "1" pulse at the conclusion of each frame. This logic "1" resets the pixel counter 308 to initial count on the next 15,734 kHz rate pulse supplied to its count input from the decoder 306.

The least significant bit of the pixel counter 304 is applied to one input of an exclusive-OR gate 326, the output of which is to control the generation of a +1, −1 carrier of 5 MHz frequency used as the unfolding carrier $f_F$. The other input of the XOR gate 326 receives a signal that alternates between logic "1" and logic "0" respectively on successive scan lines. FIG. 14 shows this signal being supplied from the output of another exclusive-OR gate 328 receiving at a first input thereof a modulo-two frame count bit from a field counter 330 and receiving at a second input thereof the least significant bit of the scan line count from the scan line counter 308, which scan line counter is assumed to be of the above-described type reset once per frame.

The field counter 330 is assumed to be a two-stage counter counting fields on a modulo-four basis, with the field count being supplied both to a four-phase 4.21 MKz carrier generator and to a four-phase 250 kHz carrier generator. The four-phase 4.21 MHz carrier generator generates the carrier used for up-converting the color-under signal to reproduce the chroma sidebands of the 3.58 MHz color subcarrier. The four-phase 250 kHz carrier generator generates the carrier used for detecting the M signal. The field count stored in the field counter 330 during playback must correspond to the field count during recording. The logic "1" the AND gate 322 generates at the conclusion of each frame resets the counter stage supplying the less significant modulo-twofield-count bit of the modulo-four field counter 330 to "1" when the field counter 330 next receives at its count input a logic "1" to logic "0" transition from the leading edge detector 320. Error in the more significant modulo-two-frame-count bit of the modulo-four field counter 330 is corrected by a trigger pulse being applied from an AND gate 332 to the counter stage supplying that more significant bit.

The fact of the more significant modulo-two-frame-count bit of the modulo-four field counter 330 being in error can be determined by the sign bit of the signal M* as synchronously detected in accordance with its four-phase 250 kHz carrier. The 250 kHz carrier is the sixteenth harmonic of horizontal scan line frequency $f_H$. Carrier extraction circuitry 334 responds to two appropriately selected bits of the pixel count from the counter 304 to generate a repeating 0, +1, 0, −1 sequence of samples descriptive of one phasing of $16f_H$, which repeating sequence a phase shifter 336 shifts by one sample position each successive scan line responsive to the two least significant bits of the scan line count from the line counter 308 and the modulo-four field count from the field counter 330. The four-phase repeating 0, +1, 0, −1 sequence of samples from the phase shifter 336 is supplied to a synchronous detector 338 as the four-phase 250 kHz carrier against which the signal M* from the multiplexer 1206 is synchronously detected thereby to rectify it. A horizontal lowpass filter 340 rejects the image of the M* baseband signal and smooths it against high-frequency noise that can alter its sign bit.

The sign bit of the filter 340 response to the synchronously detected M* signal is supplied to one of the two inputs of the AND gate 332, the other input of which is supplied recurring triggering purses (e.g., from the horizontal sync separator, as shown in FIG. 14). The sign bit of the synchronously detected M* signal will invariably be a "0" if the field count in the field counter 330 is properly synchronized with the field count during recording. This will inhibit the AND gate 332 from responding to the recurring triggering pulses supplied to its other input to apply triggering to the counter stage supplying the more significant modulo-two-frame-count bit of the modulo-four field counter 330. The sign bit of the synchronously detected M* signal will be a "1" if the field count in the field counter 330 is not properly synchronized with the field count during recording or will become a "1" within a field or so. The sign bit of the synchronously detected M* signal being "1" will enable the AND gate 332 to apply the next occurring triggering pulse supplied to its other input to the counter stage supplying the more significant modulo-two-frame-count bit of the modulo-four field counter 330, toggling the output condition of that stage to correct its state.

In the FIG. 14 apparatus included in the playback electronics of a VCR or VCP for generating an unfolding carrier, the horizontal sync separator 312 and the vertical sync separator 318 respectively separate horizontal and vertical synchronizing pulses the post-filtered unfolded luminance signal $Y_D^*$ from the output of soft switch 914 shown in FIGS. 9 and 10. The signal $Y_D^*$ applied to the horizontal sync separator 312 may be delayed by some portion of a scan line respective to the signal $Y_D^*$ applied to the vertical sync separator 318 to avoid timing problems.

Apparatus included in the record electronics of a VCR for generating a folding carrier is generally similar to the FIG. 14 apparatus for generating an unfolding carrier, except as follows. The horizontal sync separator and the vertical sync separator respectively separate horizontal and vertical synchronizing pulses from the signal Y or the signal $Y_D$. Further, there is no need to correct the more significant modulo-two-frame-count bit of the modulo-four field counter, so elements corresponding to elements 332 through 340 can be dispensed with. Quite obviously, in a single-deck VCR the apparatus for generating a folding carrier and the apparatus for generating an unfolding carrier may be constructed so as to share many elements. The apparatus for generating a folding carrier and the apparatus for generating an unfolding carrier can take a variety of forms, including analog circuit forms; many design variations from that specifically described will readily occur to those skilled in the art of designing digital circuits or video signal processing circuitry.

Next, the deemphasis and folding processing in accordance with an aspect of the invention will be described. As described above, in prior luminance signal folding systems, the luminance high frequencies were folded back as aliases into the luminance low-frequency spectral bandwidth at their original amplitude (or, boosted to a higher amplitude, if pro-emphasized per the teaching of Howson and Bell). If such folded lunlinance signals are recorded and then played back on a conventional narrow bandwidth VCR which has no provision for removing the folded high luminance frequency aliases, high objectionable artifacts will be present in reproduced images, preventing such a video recording from being backward compatible for conventional playback apparatus reproduction. By appropriately deemphasizing the folded high-frequency luminance components in the band-limiting folding operation during the encoder side processing, it is advantageously made possible to reduce the artifacts in the video image displayed on playing back the band-limited folded luminance signal on the videotape with a conventional narrow bandwidth reproduction device to a level which is not objectionable to the viewer, thereby providing desirable backward compatibility with existing playback apparatus.

Figure 15:
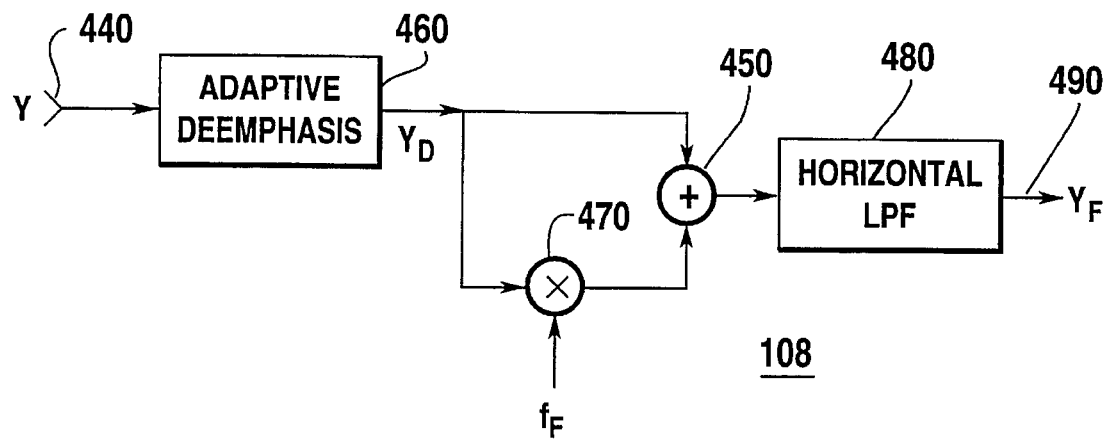
FIG. 15 is a block diagram of folding circuitry that can be used after adaptive deemphasis circuitry which in accordance with the invention compresses the high-frequency luminance signal.

FIG. 15 shows adaptive deemphasis and folding circuitry 108 of a type in which folding of the luminance signal frequency spectrum is done after the upper frequencies have been adaptively deemphasized respective to the lower frequencies. Except for preferably being carried out digitally, the spectrum folding itself is done in substantial conformity with the second technique described by Howson and Bell.

Spatio-temporally processed luminance signal Y from the output terminal of the adaptive luminance separator 104 of FIG. 2 (i.e., from the terminal 215 of soft switch 214 in FIG. 5) is supplied to an input terminal 440 of the adaptive deemphasis ciruitry 460. The deemphasis circuitry 460 deemphasized luminance signal $Y_D$ from an output terminal thereof to an adder 450 as a summand input signal thereto. The deemphasis circuitry 460 also supplies the deemphasized luminance signal $Y_D$ to a modulator 470 as a modulating signal input thereto, for modulating the amplitude of a folding carrier of frequency $2f_F$ supplied to another input of the modulator 470. The modulator 470 is preferably a four-quadrant multiplier in which the product output signal from which the folding carrier of frequency $2f_F$ is suppressed. When the folding carrier comprises a string of repeating +1,−1 samples in each horizontal scan line the construction of the modulator 470 becomes very simple, essentially consisting of a multiplexer choosing between the deemphasized luminance signal $Y_D$ supplied thereto as a modulating signal input and $-Y_D$ as derived therein from $Y_D$, alternatively selecting $Y_D$ and then $-Y_D$.

The product output signal from the modulator 470 comprises a lower amplitude-modulation sideband, which is a reversed-spectrum signal extending down from the $2f_F$ folding carrier frequency to DC, and an upper amplitude-modulation sideband, which is a non-reversed-spectrum signal extending up from the $2f_F$ folding carrier frequency to a $4f_F$ upper frequency limit. This product output signal is supplied to the adder 450 as another summand input signal thereto. The sum output signal of the adder 450 is supplied to the input terminal of a horizontal lowpass filter 480, which has a passband extending at least to the 2.5 MHz folding frequency $f_F$. Preferably, for improving playback in accordance with reasons similar to those discussed further on in the application with reference to FIGS. 37 and 38, the pass band of the filter 480 extends somewhat past the 2.5 MHz folding frequency $f_F$ to 3 MHz or so. The lowpass response of the filter 480 appears at a terminal 90 as the signal $Y_F$. As described previously in regard to FIG. 2, the signal $Y_F$ is supplied to the DAC 110 to be converted to an analog signal $Y_R$, which modulates the frequency of the controlled oscillator 120.

FIG. 16 shows one type of adaptive deemphasis circuit with control signal generator, which adaptive deemphasis circuit is suitable for use as the adaptive deemphasis circuit 460 in FIG. 15 and embodies an aspect of the invention. This type of adaptive deemphasis circuit filters luminance signal Y received at its input terminal 501 from the adaptive luma separator 104 of FIG. 2, to reduce the high frequencies of that signal respective to its low frequencies, and supplies the resulting response at its output terminal 520 To the adaptive deemphasis and folding circuitry 108 of FIG. 2. More particularly, the luminance signal Y from the soft switch 214 is supplied to the terminal 501. A horizontal lowpass filter (HLPF) 502 responds to only the low-frequency (e.g., DC to 2.5 MHz) components of this signal Y to supply a low-band luma response $Y_L$. A horizontal highpass filter (HHPF) 504 responds to only the high-frequency (e.g., 2.5 to 5 MHz) components of this signal Y to supply a high-band luma response $Y_H$. The luma high frequencies are supplied from the horizontal highpass filter 504 to the multiplier 508 as an input multiplicand signal, to be multiplied by a control signal generated by a control signal generator 510 in response to the energy content in the high-band luma response $Y_H$ HHPF 504 supplies to the generator 510. An adder 506 is used to combine the low-band luma response $Y_L$ from HLPF 502 with the deemphasized high-band luma response $Y_{HD}$ supplied as product output signal by the multiplier 508.

Figure 17:
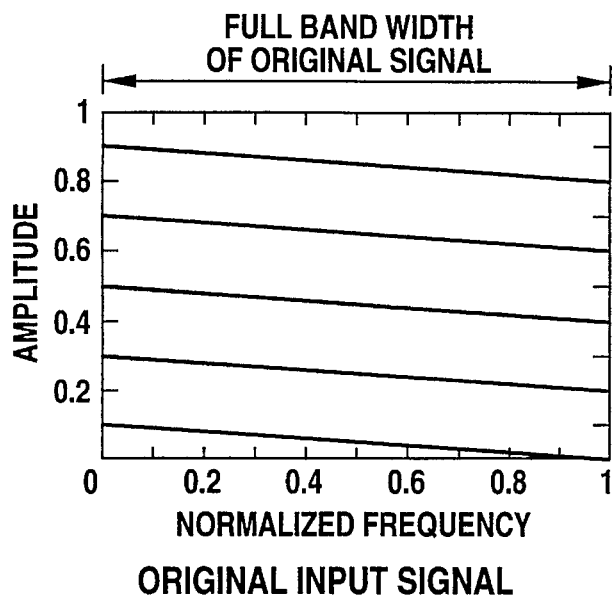
FIG. 17 is a plot of amplitude versus normalized frequency for a full-bandwidth input luminance signal supplied for folding.
Figure 18:
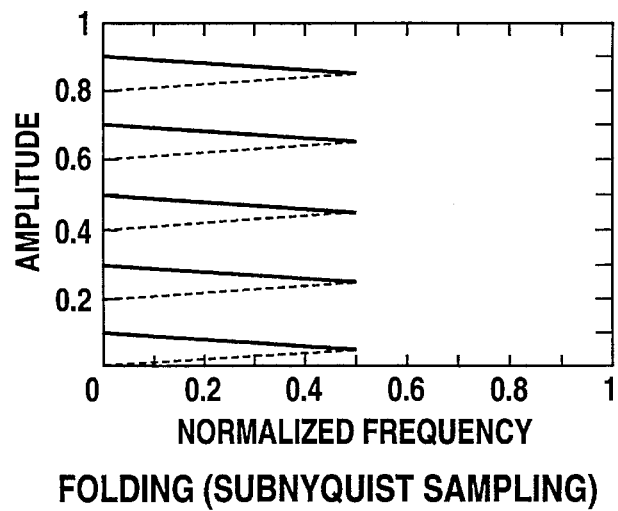
FIG. 18 is a plot of amplitude versus normalized frequency of the luminance signal as folded to half bandwidth by sub-Nyquist sampling procedure.
Figure 19:
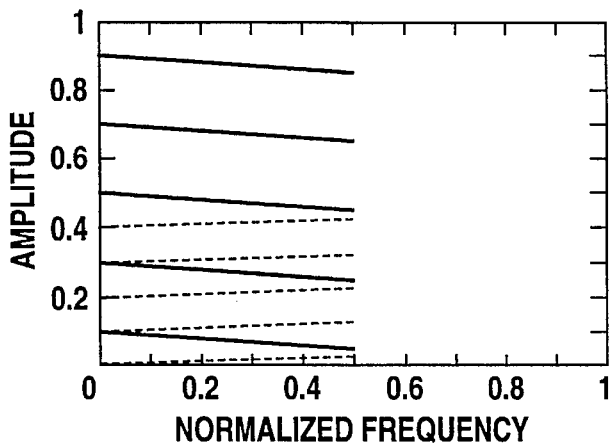
FIG. 19 is a plot of amplitude versus normalized frequency of the luminance signal as folded to half bandwidth by sub-Nyquist sampling procedure with fixed deemphasis of the high-frequency component.

FIG. 17 shows an input full-bandwidth signal, and FIG. 18 shows the same signal after folding of the high-frequency band by sub-Nyquist sampling to reduce it to one-half the bandwidth of the original, the folded high-band signal component being indicated by the broken lines. In a simple implementation of a deemphasis circuit for band-limiting during recording, in accordance with an aspect of the present invention, multiplier 508 and control signal generator 510 may be replaced by a simple attenuator providing a fixed amount of attenuation or amplitude reduction to high-frequency luminance signal component $Y_H$, so that the high-frequency luminance amplitude level in the folded luminance signal $Y_F$ is maintained below a level at which objectionable artifacts would become noticeable in the displayed narrow bandwidth video image on reproduction by a narrow band playback device. FIG. 19 shows the folded signal of FIG. 18 after it has undergone a fixed deemphasis of the amplitude of the folded high-frequency components by approximately one-half.

However, while providing against objectionable artifacts (i.e., dot crawl) in the displayed narrow band image which could result from high amplitude folded high-frequency components in the folded narrow band luminance signal, this fixed form of deemphasis can undesirably degrade the signal-to-noise ratio, S/N, on the playback side because portions of the high-band luminance signal which are at a relatively low amplitude, such as broad flat areas with little or no contrast change, may also be reduced in amplitude by the fixed de;emphasis process, degrading the S/N ratio of these portions of the recorded luminance signal during reproduction.

That is, because folding the high-band luminance at full amplitude will cause a severe disturbance in the reproduced images on conventional playback, as occurs in the case of the system described by Faroudja, it is therefore desirable, for preventing the folded high-frequency luminance components from manifesting as objectionable artifacts in the displayed image when playing back an encoded recording on a conventional narrow bandwidth VCR, to reduce the amplitude (i.e., modulation level) of the high-band luminance component interleaved with the low-band luminance component. Reducing the modulation level of the folded highs by one-half can provide improved backward compatibility, but at the cost of increased noise in the displayed wide bandwidth improved image. This noise increase occurs when the attenuated highs are boosted in the playback side decoding for restoring them to their original level. This noise is most noticeable in broad, low level, flat areas of the image.

In accordance with an aspect of the present invention, the deemphasizing of the folded high-band luminance component during the record side encoding and the accompanying reemphasis processing for restoring the unfolded deemphasized high-band luminance component to its original amplitude during playback side decoding are preferably performed adaptively. I.e., the level of the folded high-band luminance component is deemphasized adaptively during the encoding processing, and reemphasized adaptively during the decoding processing. Such adaptive deemphasis of the high-band luminance component during the folding process can significantly improve image noise performance during decoded playback of the encoded recording by a playback system in accordance with an aspect of the invention, while also providing enhanced backward compatibility to the encoded recording.

The adaptive deemphasis processing provides folding of the high-band luma $Y_H$ at a full level when the high-band luminance component is at a very low amplitude, and folding of the high-band luma $Y_H$ at a reduced level when the high-band luminance is at a high amplitude. When the high-band luminance is adaptively deemphasized in this manner prior to or during the folding process, the reemphasis operation during playback decoding only increases the noise level during high-frequency high-amplitude transitions where it is not noticeable on viewing the reproduced image.

Figure 20:
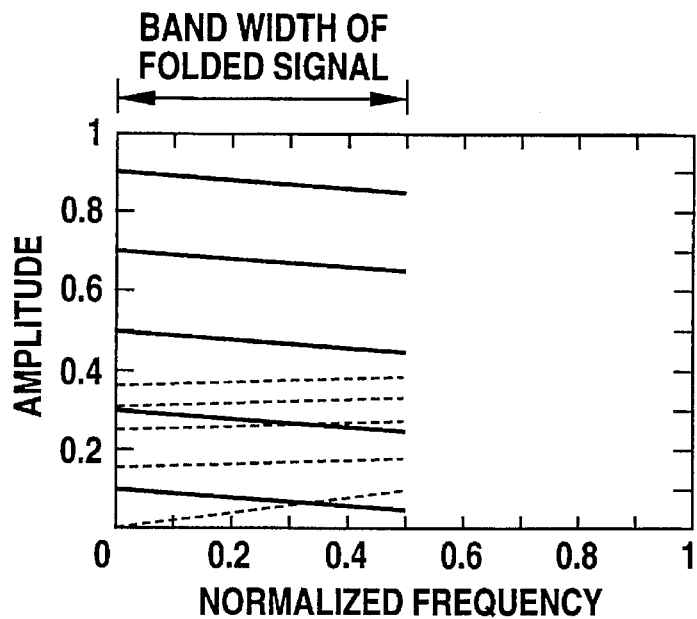
FIG. 20 is a plot of amplitude versus normalized frequency of the luminance signal as folded to half bandwidth by sub-Nyquist sampling procedure with adaptive deemphasis of the high-frequency component in accordance with an aspect of the invention.
Figure 21:
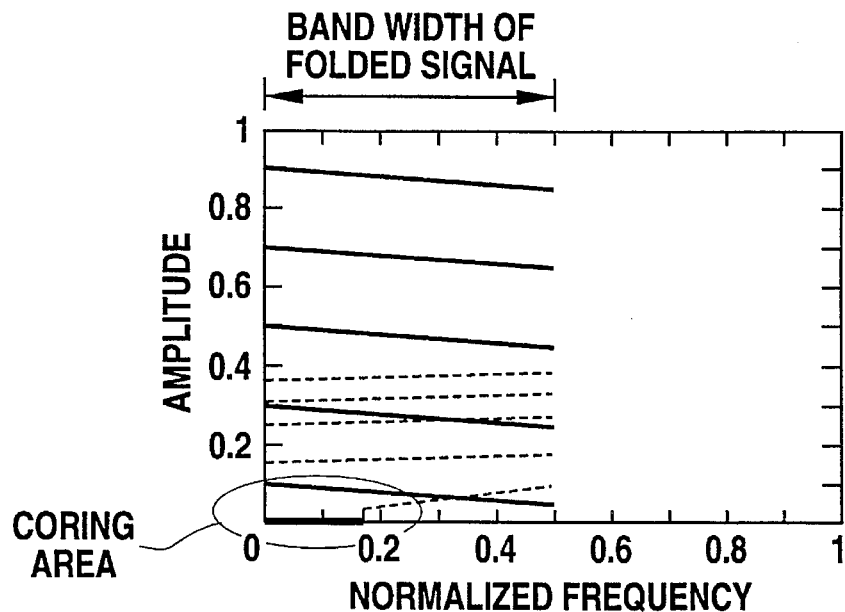
FIG. 21 is a plot of amplitude versus normalized frequency is a plot of amplitude versus normalized frequency of the luminance signal as folded to half bandwidth by sub-Nyquist sampling procedure with adaptive deemphasis of the high-frequency component and with noise coring.

FIG. 20 shows the folded high-band component of FIG. 18 after adaptive deemphasis in accordance with an aspect of the invention, from which it may be seen that the level of deemphasis of the folded high-band luma $Y_H$ is varied in comparison to the fixed deemphasis in FIG. 19. FIG. 21 corresponds to FIG. 20 but shows additionally the effect of a noise coring operation performed in adaptively deemphasizing the folded high-band luma $Y_H$.

Figure 22:
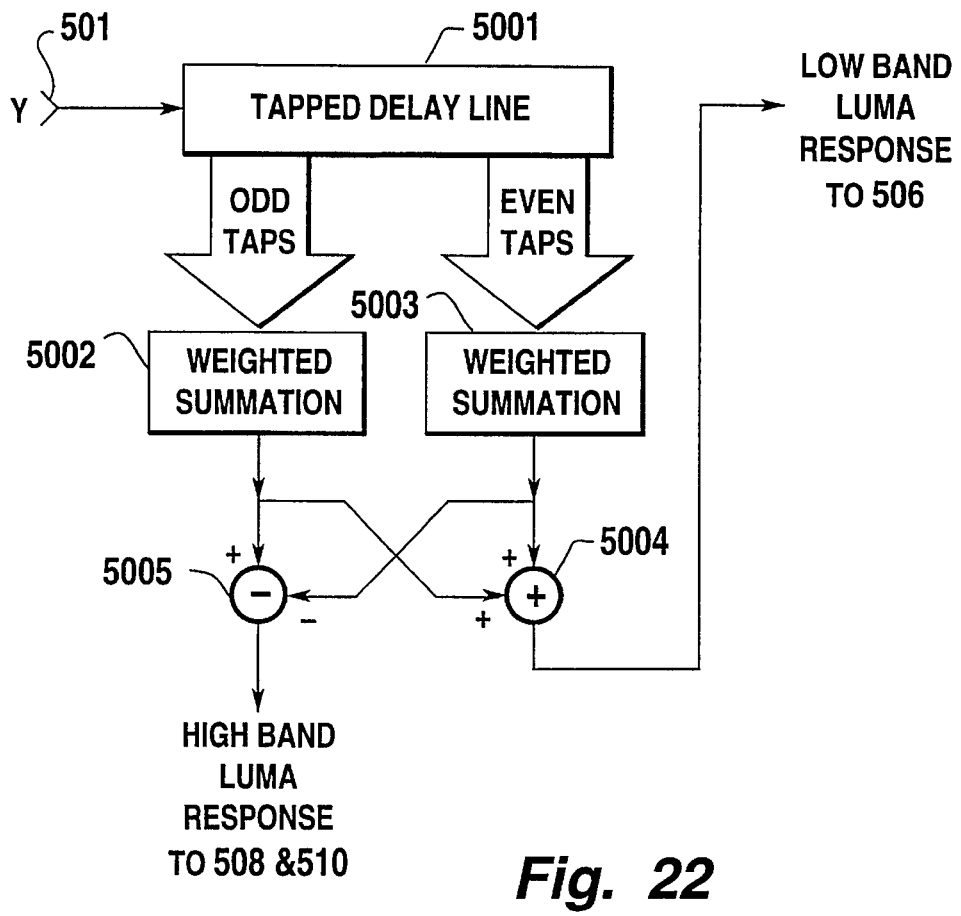
FIGS. 22, 23 and 24 are block diagrams of alternative ways of implementing the combination of lowpass filter and highpass filter used in the adaptive deemphasis and reemphasis circuits embodying aspects of the invention.
Figure 23:
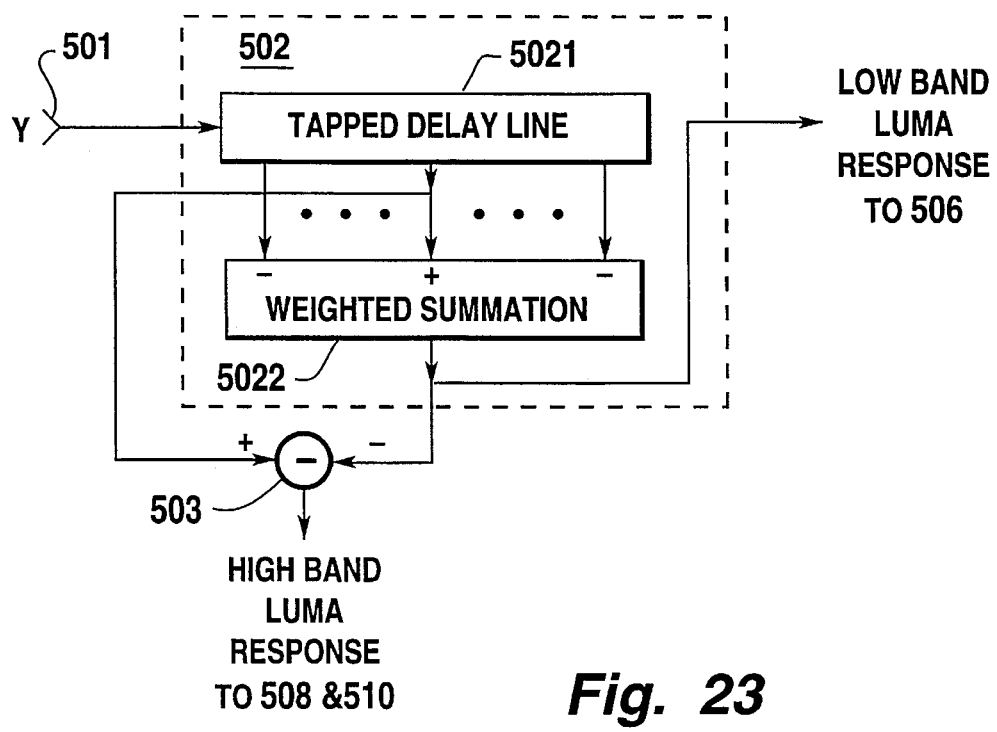
Figure 24:
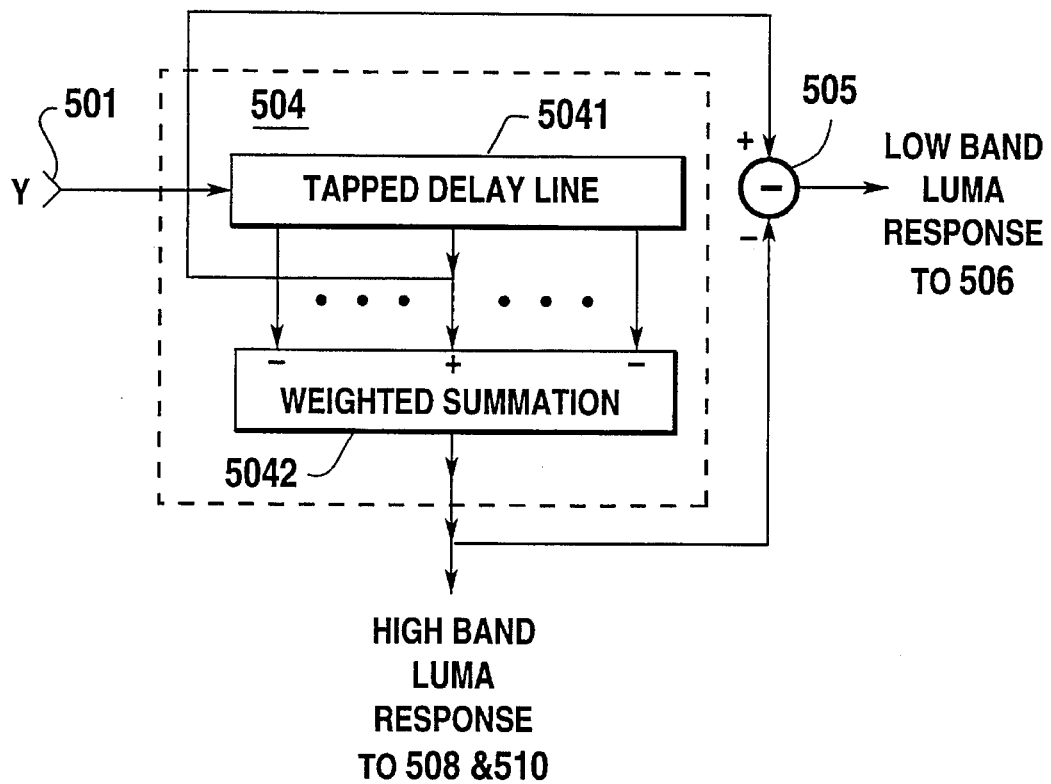

FIGS. 22, 23 and 24 illustrate ways in which the FIG. 16 band-splitting filter comprising the HHPF 502 and the HHPF 504 may be constructed in digital form so as to save hardware, which ways require that the −6 dB frequencies of the HLPF 502 and the HHPF 504 be the same. The FIG. 22, 23 and 24 band-splitting filters are tapped-delay-line filters.

In FIG. 22 tapped delay line 5001 with an odd number of taps receives at its input the Y signal at the terminal 501. The taps are considered as being consecutively numbered beginning at one on the input end and incrementing by one each successive tap, which successive tap exhibits a one-sample delay from the tap before. The odd-numbered taps supply their signals to a weighted summation circuit 5002 for weighting those samples with positive weights that are alternate samples of both the symmetrical kernel of the HLPF 502 and the symmetrical kernel of the HHPF 504. The even-numbered taps supply their signals to a weighted summation circuit 5003 for weighting those samples with positive weights that are alternate samples of the symmetrical kernel of the HHPF 502 and that are the negatives of alternate samples the symmetrical kernel of the HHPF 504. An adder 5004 receives as summands the weighted sums from the weighted summation circuits 5002 and 5003, adding them to generate the HHPF 502 response. A subtracter 5005 receives as minuend the weighted sum from the weighted summation circuit 5002, receives as subtrahend the weighted sum from the weighted summation circuit 5003, and supplies the HHPF 504 response as the difference between these weighted sums.

In FIG. 23 the HLPF 502 is a linear-phase finite-impulse-response (FIR) filter which comprises a tapped delay line 5021 with an odd number of taps spaced at one-sample intervals and a weighted summation circuit 5022 for weighting those samples with positive weights to provide a symmetrical kernel. The tapped delay line 5021 receives at its input the Y signal at the terminal 501. The weighted summation circuit 5022 supplies the HLPF 502 response for application to the adder 506 in the FIG. 16 adaptive deemphasis circuit. The central tap of the tapped delay line 5021 supplies Y signal delayed the same amount with respect to the Y signal at the terminal 501 as the HLPF 502 response is; and a subtracter 503 subtracts the HLPF 502 response from this delayed Y signal to obtain horizontal highpass frequency response. In the FIG. 16 adaptive deemphasis circuit the difference output signal from the subtracter 503 is applied to the multiplier 508 as its multiplicand signal and is also applied to the control signal generator 510 as its input signal.

In FIG. 24 the HLPF 504 is a linear-phase finite-impulse-response (FIR) filler which comprises a lapped delay line 5041 with an odd number of taps spaced at one-sample intervals and a weighted summation circuit 5042 for weighting those samples with alternately negative and positive weights to provide a symmetrical kernel. The lapped delay line 5041 receives at its input the Y signal at the terminal 501. In the FIG. 16 adaptive deemphasis circuit, the weighted summation circuit 5042 supplies the HHPF 504 response applied in the FIG. 16 adaptive deemphasis circuit to the multiplier 508 as its multiplicand signal and to the control signal generator 510 as its input signal. The central tap of the tapped delay line 5041 supplies Y signal delayed the same amount with respect to the Y signal at the terminal 501 as the HHPF 504 response is; and a subtracter 505 subtracts the HHPF 504 response from this delayed Y signal to obtain horizontal highpass frequency response for application to the adder 506 in the FIG. 16 adaptive deemphasis circuit.

FIG. 25 is a block diagram of a specific form the FIG. 16 adaptive deemphasis circuitry may take when used as the adaptive deemphasis circuit 10 and control signal generator 80 in the video signal recording/playback system illustrated in FIG. 1. In FIG. 25, input terminal 501 corresponds to input terminal 5 of FIG. 1. Input terminal 501 connects to the input terminals of HLPF 502 and HHPF 504. An output terminal of HLPF 502 connects to an input terminal of the adder 506 and to a first input terminal of the multiplier 508. An output terminal of the adder 506 connects to the output terminal 520. Output terminal 520 connects to the input terminal of the folding circuit 20 of FIG. 1.

FIG. 25 shows the control signal generator 510 as including a rectifier 512, a corer 513, a low-pass filter (LPF) 514, and an inverse function circuit 515. An output terminal of HHPF 504 connects to an input terminal of the rectifier 512. An output terminal of the rectifier 512 connects to an input terminal of the corer 513. An output terminal of the corer 513 connects to an input terminal of the LPF 514. An output terminal of the LPF 514 produces a control signal G, and connects to an input terminal of a (1−G) function circuit 515. An output terminal of the (1−G) function circuit 515 connects to a second input terminal of the multiplier 508. An output terminal of multiplier 508 connects to a second input terminal of the adder 506.

The operation of the adaptive deemphasis circuit 10 and the control signal generator 80 of FIG. 1, as exemplified in FIG. 25, may be better understood by referring to the waveform diagrams illustrated in FIG. 26. The HLPF 502 and the HLPF 504 respond separately to the the low-frequency and high-frequency portions of the luminance signal. The output signal from HLPF 502 contains only the low-frequency portion of the luminance signal referred to as "low-band luma". The output signal from HHPF 504 contains only the high-frequency portion of the luminance signal referred to as "highband luma".

The low-band luma is supplied to the adder 506 for combination with variably attenuated high-band luma to form the deemphasized luminance signal $Y_D$ supplied to the terminal 520. The high-band luma may contain luminance information representing vertical edges.

Figure 26A:
FIG. 26 is a set of related waveform diagrams which are useful in understanding the operation of the FIG. 25 adaptive deemphasis circuit.
Figure 26B:
Figure 26C:

FIG. 26A illustrates two examples of vertical edges. On the left hand side, a large amplitude vertical edge is illustrated and on the right hand side, a small vertical edge is illustrated. FIG. 26B illustrates the signal at the output terminal of the HHPF 504. As FIG. 26B shows, this high-pass filter response contains no low-frequency components nor any direct term of its own and exhibits excursions in both positive-going and negative-going directions with regard to an average value associated with the absence of signal. The absolute value of this high-pass filter response is obtained by rectifying the response, using the rectifier 512. FIG. 26C illustrates the signal at the output terminal of rectifier 512.

In digital circuitry the rectifier 512 takes the form of an absolute-value circuit. If the digital samples descriptive of luminance high frequencies use two's complement arithmetic, one known way that rectification can be done digitally is by exclusive-ORing the sign bit with each of the less significant bits, to generate respective bits of a number to which a ZERO sign bit is affixed and unity is then added. The addition generates the absolute-value response to the input signal in two's complement arithmetic.

Figure 26D:

The corer 513 receives the rectified luminance high frequencies from the rectifier 512 and operates as a type of threshold circuit sometimes referred to as a "baseline clipper", thereby to eliminate the effect of low-amplitude edges on the deemphasis function. If the value of the input signal from the rectifier 512 is less than the threshold value, then a zero-valued signal is produced by the corer 513. If the value of the input signal from the rectifier 512 is greater than the threshold value, then the value of the corer 513 output signal is the value of the input signal less the threshold value. FIG. 26D illustrates the signal at the output terminal of corer 513. Referring to FIG. 26C, the dotted line illustrates the threshold value. In FIG. 26D, only the portion of rectified signal illustrated in FIG. 26C which exceeds the threshold value passes through the corer 513, producing the signal illustrated in FIG. 26D.

This type of coring is well known in analog circuitry. This type of coring as realized in digital circuitry replaces samples below a threshold value by zeroes and reduces the amplitude of samples not below the threshold value by the threshold value. This type of coring differs from the type of coring often encountered in digital processing in which, when generating the cored signal, input signal samples below a threshold value are replaced by zeroes and samples not below the threshold value are reproduced without change. When the corer 513 is to be of a type suitable for inclusion in digital circuitry, it can be realized using a digital subtracter and a multiplexer. The digital subtracter is connected for subtracting the threshold value from the rectifier 512 output signal. The mutiplexer is controlled by the sign bit from the digital subtracter, generating the cored signal by selecting positive values of the difference output signal from the digital subtracter for inclusion in the cored signal and selecting zeroes for inclusion in the cored signal rather than negative values of the difference output signal from the digital subtracter.

Figure 26E:
Figure 26F:
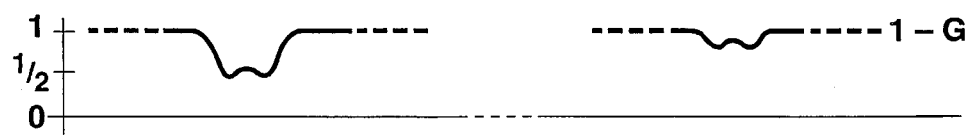
Figure 26G:
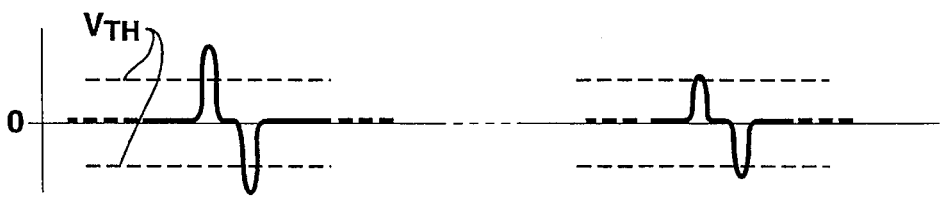

The output signal from corer 513 is supplied to a horizontal low-pass filter 514 to produce control signal G illustrated in FIG. 26E. The HLPF 514 operates to spread corer 513 output signal so that the control signal G changes gradually in the vicinity of the vertical edge. The control signal G is scaled to vary between zero, when the level of the luminance signal is small, and a value $G_{MAX}$ nearly one-half, when the level of the high-frequency portion is large. The control signal G is then subtracted from the value one in the (1−G) function circuit 515, producing the signal illustrated in FIG. 26F. The (1−G) function circuit 515 may be constructed in known manner of analog or digital arithmetic elements, or, in one type of digital implementation may be provided by a look-up table stored in read-only memory. This signal varies between one, when the level of the high-frequency portion of the luminance signal is small, to a value $(1-G_{MAX})$ somehat more than one-half when the level of the high-frequency portion is large. This signal is supplied to one input terminal of the multiplier 508. The multiplier 508 scales the level of the high-frequency portion of the luminance signal by multiplying the high-frequency portion of the luminance signal by the (1−G) signal. This scaled high-frequency portion is then added to the low-frequency portion of the luminance signal to form the deemphasized luminance signal.

When the level of the high-frequency portion of the luminance signal is high, the scaling factor approaches one-half and the level of the high-frequency portion is nearly halved. When the level of the high-frequency portion of the luminance signal is low, the scaling factor is nearly one and the level of the high-frequency portion is passed through unattenuated. When the high-frequency portion of the luminance signal is at intermediate levels, the scaling factor is intermediate between one-half and one and the level of the high-frequency portion in the deemphasized luminance signal is at a corresponding intermediate value.

The determination of the value $G_{MAX}$ will now be described in more detail. When the peak amplitude of the separated high-frequency portion of the luma signal is denoted as $Y_H$, the threshold level of the corer 513 is denoted as $T_D$, and g denotes the gain or scaling factor associated with the cascade connection of the corer 513 and the low-pass filter 514, the product signal P the multiplier 508 supplies to the adder 506 is expressed by the equation (1), following.

$$P = Y_H[1 - g(Y_H - T_D)] \quad (1)$$
$$= (1 + gT_D)Y_H - g\,Y_H^2$$

$T_D$ is a fraction of one, and $Y_H$ ranges from $T_D$ to one. $G_{MAX}$ is the value of the term $g(Y_H - T_D)$ in the function P when $Y_H$ has its maximum value of one.

$$G_{MAX} = g(1 - T_D) \quad (2)$$

The linearity of the function P respective to $Y_H$ is its slope, obtained by taking its derivative P' respective to $Y_H$.

$$P' = (1 + gT_D) - 2gY_H \quad (3)$$

It is desirable that P be monotonically increasing with $Y_H$ across its range from zero to one, so each value of P is associated with only one value of $Y_H$; this implies that P' must never be negative. Since P' decreases with increase in $Y_H$, the value of P' when $Y_H$ has its maximum value of one must be zero or more than zero.

$$(1 + gT_D) - 2g > 0 \quad (4)$$

This expression can be rearranged to derive an expression on the boundary conditions for g in order that the function P monotonically increase for $Y_H$ increasing across its range from zero to one.

$$(1 + gT_D) > 2g \quad (5)$$
$$1 > 2g - gT_D \quad (6)$$
$$1 > (2 - T_D)g \quad (7)$$
$$(2 - T_D)^{-1} > g \quad (8)$$
$$g < (2 - T_D)^{-1} \quad (9)$$

That is, if the threshhold $T_D$ were zero, g could be no larger than one-half. So, if the threshhold $T_D$ were zero, $G_{MAX}$ would have the value g which would be one-half. This limit condition is approached quite closely when the threshhold $T_D$ is close to zero.

For values of $T_D$ larger than zero, $G_{MAX}$ has to be reduced to somewhat less than one-half. Combining equation (2) with the expression (9) of inequality, the following expression (10) of inequality is obtained.

$$G_{MAX} < (1 - T_D)(2 - T_D)^{-1} \quad (10)$$

For $T_D = (1/16)$, $G_{MAX} = (15/31)$ and the high-band luma signal $Y_H$ can be reduced to as little as $(16/31)$ its original level without affecting the monotonicity of the compression function P. For $T_D = (1/8)$, $G_{MAX} = (7/15)$ and the high-band luma signal $Y_H$ can be reduced to as little as $(8/15)$ its original level without affecting the monotonicity of the compression function P. For $T_D = (1/4)$, $G_{MAX} = (3/7)$ and the high-band luma signal $Y_H$ can be reduced to as little as $(4/7)$ its original level without affecting the monotonicity of the compression function P.

If the (1−G) function circuit 515 is provided by a look-up table stored in read-only memory, the transfer function stored in the look-up table can be modified so it is no longer a linear transfer function, reducing the compression function P for values of $Y_H$ that are intermediate between $T_D$ and one, so the function P can be kept monotonic though the high-band luma signal $Y_H$ is reduced to one half or even less of its original level. Since the linearity of the reemphasis of the high-band luma signal $Y_H$ by the reemphasis circuits shown in FIGS. 27, 28 and 29 depends directly on the linearity of the compression function P, such modification of the transfer function stored in the look-up table also improves the fidelity of the reemphasized luminance signal to the luminance signal received for recording before being processed by the FIG. 25 circuitry to deemphasize its high-frequency portion $Y_H$.

The above-referenced U.S. patent application Ser. No. 008,813 uses adaptive deemphasis circuitry of the type shown in FIG. 25 in a video tape recording and playback system characterized by the signal G being encoded in a second under signal, This second under signal is included with the frequency-modulated luminance carrier and color-under signal in a frequency multiplex signal recorded on the video tape in accordance with modified VHS recording procedures.

FIG. 27 shows an embodiment of the FIG. 1 reemphasis circuit 70. The output terminal of the FIG. 1 unfolding circuit 60 connects to an input terminal 1100 shown in FIG. 27. Input terminal 1100 connects to respective input terminals of a horizontal lowpass filter (HLPF) 1102 and of a high-pass filter (HHPF) 1104. An output terminal of horizontal lowpass filter (HLPF) 1102 connects to a first input terminal of an adder 1106. An output terminal of the adder 1106 connects to output terminal 15, which corresponds to the output terminal 15 of FIG. 1. An output terminal of the HHPF 1104 connects to an input terminal of a corer 1113. An output terminal of corer 1113 connects to a first input terminal of multiplier 1118. A source of a scaling factor is connected to a second input terminal of multiplier 1118.

In operation, the HHPF 1104 and HLPF 1102 respectively respond only to the low-frequency and high-frequency portions of the reproduced unfolded deemphasized luminance signal from each other. The response of the HPF 1104 to the reproduced unfolded deemphasized luminance signal contains no low-frequency components nor any direct term of its own, exhibits excursions in both positive-going and negative-going directions with regard to an average value associated with the absence of signal and referred to conventionally as "zero" value, and is subjected to a coring operation in corer 1113.

Corer 1113 operates as a bidirectional threshold circuit, as opposed to corer 513 (of FIG. 25) which operates only in the positive signal direction. If the value of the input signal is closer to zero or average value than a predetermined threshold value $T_R$, then a zero-valued signal is produced. If the value of the input signal is farther from zero or average value than the threshold value $T_R$, then the value of the output signal is the value of the input signal less the threshold value $T_R$. FIG. 21G illustrates the signal at the input terminal of corer 1113 and the positive and negative thresholds as referred to an average value associated with the absence of signal and referred to conventionally as "zero" value. In FIG. 21G, the corer circuit responds only to the portion of input signal which exceeds the threshold value.

The coring operation by the corer 1113 removes low-amplitude noise in the high-frequency portion of luminance resulting from the recording and playback process. Such noise is particularly noticable in areas of the image where there is no detail. During recording the adaptive deemphasis did not reduce the amplitude of the high-frequency portion of luminance in areas of the image where the level of the high-frequency portion was small. Therefore, in those areas the level of the high-frequency portion of luminance will tend to remain higher than the noise. In the FIG. 27 circuit the threshold amplitude $T_R$ is set to be about one-half the threshold amplitude To used during recording. The corer 1113 will respond, then, only to excursions of the separated high-frequency portion of luminance signal that go below $-T_R$ and that go above $T_R$. The coring operation performed by the corer 1113 removes a higher fraction of the energy of the high-frequency portion of the deemphasized luminance where it exceeds threshold amplitude $T_D$ by a small amount than where it exceeds threshold amplitude $T_D$ by a greater amount; this phenomenon tends to restore in some degree the dynamic range in the luminance high-frequencies that was lost during deemphasis.

The corer 1113 may be constructed in analog circuitry by adjusting the level of the corer input signal supplied to a symmetrical clipper or limiter and then differentially responding to the corer input signal before and after its being clipped or limited (e.g. with an operational amplifier configured as an analog subtracter) to generate the cored response. Other analog coring circuits are known.

The type of coring performed by the corer 1113 differs from the type of coring usually encountered in digital processing in which, when generating the cored signal, input signal samples having amplitudes smaller than a threshold value are replaced by zeroes and samples having amplitudes larger than the threshold value are reproduced without change. Digital-signal coring in which samples having amplitudes larger than the threshold value are reproduced without change, removes substantially no energy from edge transients having amplitudes above the threshold value, which is desirable in most simple noise-coring operations. In the FIG. 27 reemphasis circuit, however, the goal of restoring dynamic range for the luminance high frequencies requires coring of a type that removes a substantial fraction of the energy from edge transients having amplitudes not much above the threshold value $T_R$, but not from edge transients having amplitudes the absolute values of which are way above the threshold value $T_R$.

In digital circuitry the corer 1113 may be implemented by using a look-up table (LUT) stored in ROM or by using circuitry for performing suitable arithmetic and logical operations. As an example of how the latter course can be pursued, the corer 1113 can constructed as follows, using two's complement arithmetic, so as to remove a substantial fraction of the energy from edge transients having amplitudes not much above the threshold value, but so as not to remove a reduced fraction of the energy from edge transients further above the threshold value. In a digital subtracter a positive digital threshold value is subtracted from the corer 1113 input signal, and in a first digital adder the corer 1113 input signal is added to the positive threshold value. Responsive to a ZERO sign bit in the difference signal from the subtracter, a first multiplexer selects that difference signal as its output signal; and responsive to a ONE sign bit in the difference signal from the subtracter, the first multiplexer selects arithmetic zero as its output signal, Responsive to a ZERO sign bit in the sum signal from the first adder, a second multiplexer selects arithmetic zero as its output signal; and responsive to a ONE sign bit in the sum signal from the first adder, the second multiplexer selects that sum signal as its output signal. A second digital adder adds the output signals of the digital subtracter and first digital adder to generate the cored response.

The cored high-frequency portion of the deemphasized luminance signal is scaled up by multiplier 1118 to compensate more or less for the energy of the high-frequency luminance lost in the coring by corer 1113. The scaling factor is applied to the scaling factor input terminal of multiplier 1118. This scaling factor may be fixed at a predetermined level between one and three. Preferably, the scaling factor is fixed at two when the threshold levels in the corer 1113 are set to halve the energy of the high-frequency portion of luminance recorded with a (1–G) scaling factor just less than one. This provides accurate scaling of the high-frequency portion of luminance recorded with a (1–G) scaling factors of one-half and just loss than one. This scaled high-frequency portion from multiplier 1118 is recombined with the low-frequency portion from subtracter 1102 in adder 1106. The output from adder 1106 is the full-bandwidth reemphasized luminance signal.

In alternative embodiments of the FIG. 27 reemphasis circuitry, instead of having fixed threshold values in the corer 1113 and a fixed scaling factor in the multiplier 1118, provision may be made for these parameters to be controlled by a user. A user threshold adjust input terminal 1115 may be coupled to a threshold input terminal of corer 1113, as illustrated in phantom in FIG. 27. A threshold adjust signal, supplied to the threshold adjust input terminal 1115, under the control of a user, will adjust the threshold of corer 1113. If the threshold is adjusted too low, then noise will appear in areas of the image having no detail; if the threshold is adjusted too high, then only the highest amplitude detail will be provided in the image, and the image may assume a smeared look. The user may adjust the threshold to produce the most pleasing image.

Also, a user gain adjust input terminal 1120 may be coupled to the scaling factor input terminal of multiplier 1118, illustrated in phantom in FIG. 27. A gain adjust signal, supplied to the gain adjust input terminal 1115, under the control of a user, will adjust the scaling factor. As described above, preferably this scaling factor can be selected by a user from a range extending between one and three, inclusive. Ganged controls for the threshold adjust and gain adjust signals can be used instead of individual user-adjusted controls.

In still further alternatives to the FIG. 27 reemphasis circuit, a plurality of corers with differing threshold levels and with differing scalings of their respective output signal levels as summed with the low-frequency portion of the unfolded luminance signal supplied from the HLPF 1102 can be used instead of the single corer 1113 and scaling multiplier 1108. This approach allows reemphasis to be exact at more than two levels of high-frequency luma. This approach tends to be more feasible in digital circuitry than in analog circuitry. However, it usually simpler to use a look-up table stored in read-only memory to obtain more sophisticated reemphasis characteristics, as will be described further on in this specification The FIG. 28 reemphasis circuit replaces the single corer 1113 and scaling multiplier 1118 with: a corer 1123 and scaling multiplier 1128 for passing luminance signal high frequencies that are above accompanying noise, and with a corer 1133 and scaling multiplier 1138 for augmenting luminance signal high frequencies that are above the threshold level used in adaptive deemphasis. This augmentation expands the dynamic range of the high frequencies of the luminance signal at the output terminal 15 so as to restore the dynamic range to be substantially the same as that of the luminance signal as originally received for recording. The two-input adder 1106 is replaced by a three-input adder 1116 for combining the low-frequency luminance signal component from the subtracter 1102 and the high-frequency luminance signal components from the scaling multipliers 1128 and 1138 to form the full-band luminance signal the adder 1106 supplies to the output terminal 15. The coring levels of the corers 1123 and 1133 are shown as being adjustable responsive to user-adjusted signals applied to 1125 and to threshold adjust input terminals 1125 and 1115, respectively, and the multiplier 1128 receives a user-adjusted signal applied to gain adjust input terminal 1120.

The threshold levels between which the corer 1123 provides coring are adjusted to closely bracket the zero-signal, or average, level of the compressed-in-dynamic-range high frequencies of luminance signal separated by the HHPF 1104. This is so noise unaccompanied by actual luminance signal high frequencies is suppressed in output signal from the corer 1123, while only a relatively small amount of energy is removed from those high frequencies that are substantially above the accompanying noise. A first scaling factor, which is little more than one, is applied by the multiplier 1128 to the output signal from the corer 1123 before the application of that signal to the adder 1116 as a summand input signal. Indeed, the output signal from the corer 1123 may be directly supplied to the adder 1116 as a summand input signal without any scaling up in amplitude; and the multiplier 1128, dispensed with. A user-determined noise threshold signal descriptive of the absolute values of the threshold levels between which the corer 1128 provides coring (as referred to zero-signal, or average, level of the compressed-in-dynamic-range high frequencies of luminance signal separated by the HHPF 1104) may be supplied to the corer 1128 for setting those threshold levels between which the corer 1123 provides coring. Providing for user control of the first scaling factor applied by the multiplier 1128 is not really necessary; where provided, such user control is preferably ganged together with the noise threshold signal adjustment control.

When the FIG. 28 reemphasis circuit is constructed using digital circuitry, the corer 1123 can be of the type usually encountered in digital processing. In this usual type of digital-signal corer, when generating the cored signal, input signal samples having amplitudes smaller than a threshold value are replaced by zeroes and samples having amplitudes larger than the threshold value are reproduced without change. This coring procedure removes less energy from samples having amplitudes larger than the threshold value and further reduces need for the scaling multiplier 1128.

The corer 1133, however, is used for restoring dynamic range for the luminance high frequencies and thus requires coring of a type that removes a substantial fraction of the energy from edge transients having amplitudes not much above the threshold value, but not from edge transients way above the threshold value. The threshold levels between which the corer 1133 provides coring can depart substantially from the zero-signal, or average, level of the compressed-in-dynamic-range high frequencies of luminance signal separated by the HHPF 1104. Those departures are large enough that the corer 1133 suppresses entirely the luminance signal high frequencies having amplitudes that are below the threshold level used in adaptive deemphasis. That is, the threshold level $T_R$ for the corer 1133 is set at least as high as the threshold level $T_D$ for the corer 513 used in the FIG. 25 recording circuitry. Therefore, only from the corer 1123 does the adder 1116 receive response to the luminance signal high frequencies that have amplitudes less than the threshold level $T_D$ used in adaptive deemphasis. So, except for noise coring by the corer 1123, these lower-level luminance signal high frequencies pass through the system without compression or subsequent expansion.

When the luminance signal high frequencies are of amplitude exceeding the threshold level $T_D$ used in adaptive deemphasis, the corer 1133 supplies to the scaling multiplier 1138 response to the positive and negative excursion peaks extending beyond the limits of its coring region. A second scaling factor nominally one is applied to these peaks by the scaling multiplier 1138 before their application to the adder 1116 as another summand input signal containing luminance signal high frequencies for augmenting those in the summand input signal supplied from the corer 1123 and scaling multiplier 1128. The higher-level luminance signal high-frequency peaks, compressed to half their original level during recording are doubled during playback in an expansion that restores them substantially to their original level. Note that there is no boosting of high-frequency noise when reemphasizing luminance signals with high-level high-frequency content when the threshold level $T_R$ for the corer 1133 is set at the threshold level $T_D$ for the corer 513 used in the FIG. 25 recording circuitry.

One can set the threshold level $T_R$ for the corer 1133 somewhat above the threshold level $T_D$ for the corer 513 and can boost the corer 1133 response somewhat before adding it back to full-spectrum luma in the adder 1116. This increases the error in high-frequency luma with amplitude just above the threshold level $T_R$, but decreases the error in high-frequency luma with higher amplitudes.

The FIG. 28 reemphasis circuitry can be modified to use additional coring at higher threshold levels, to detect higher-energy luma transients for scaling and addition to the full-spectrum luma to further boost higher frequency transients.

Providing for user control of the second scaling factor applied by the multiplier 1128 is not really necessary; where provided, such user control is preferably ganged together with a coring adjust control. The scaling multiplier 1138 can be dispensed with, with output signal from the corer 1133 directly supplied to the adder 1126 as a summand input signal without any scaling in amplitude. User control via the terminal 1125 of the limits of the coring region in input signal supplied to the corer 1123 accomodates variations in video recording and playback apparatus.

Self-adjusting reemphasis circuitry of the FIG. 28 type is possible. The envelope of the luminance signal high frequencies separated by the HHPF 1104 can be detected, and the troughs of that envelope can be detected to determine a noise coring adjustment signal for defining the coring region of the input signal supplied to the corer 1123. The coring thresholds in the corer 513 of modified FIG. 25 adaptive deemphasis circuitry and in the corer 1133 of modified FIG. 28 reemphasis circuitry can be tracked by reference to a shared standard reference level. Such shared standard reference level can be determined by scaling down from the change between synchronizing pulse tip and back porch levels in the luminance signal, for example, without further modification of VHS recording standards. Or standard reference level pulses can be incorporated in a vertical blanking interval (VBI) scan line, if one is willing to make further modification of VHS recording standards.

FIG. 29 shows reemphasis circuitry that does not core high-frequency noise from luminance signals with low-level high-frequency content, but also does not boost high-frequency noise when reemphasizing luminance signals with high-level high-frequency content. HHPF 1104 responds to the unfolded luminance signal received at input terminal 1100 to separate the compressed-in-dynamic-range high-frequency portion therefrom for application to a corer 1143, and the corer 1143 responds only to those luminance signal high frequencies that are smaller in amplitude than the threshold level used in adaptive deemphasis. An adder 1126 adds the corer 1143 response as multiplied by the scaling multiplier 1148 to the unfolded luminance signal received at the input terminal 1100, thereby to generate a sum output signal supplied as reemphasized luminance signal from the output terminal 15 corresponding to the output terminal 15 of FIG. 1. The FIG. 28 reemphasis circuit, when its noise threshold adjustment is set so the corer 1123 does not core the luminance signal high-frequencies separated by the HHPF 1104, performs the same as the FIG. 29 reemphasis circuit.

The FIG. 29 reemphasis circuit may be modified to include a symmetrical limiter or slicer circuit that limits the response of the HHPF 1104 just above noise level, possibly as adjusted by user or automatic control, which limited response is then subtractively combined with the luminance signal supplied to the terminal 15. This provides a way, alternative to that used in the FIG. 28 reemphasis circuitry, for coring low-level high-frequency noise from the luminance signal supplied to the terminal 15.

It is noted above that, if the (1–G) function circuit 515 is provided by a look-up table stored in read-only memory, the transfer function stored in the look-up table can be modified so it is no longer a linear transfer function. This, it is pointed out, reduces the compression function P for values of $Y_H$ that are intermediate between $T_D$ and one, so the function P can be kept monotonic though the luminance signal is reduced to one half or even less of its original level. The FIG. 25 adaptive deemphasis circuit can be modified by reversing the order in which the corer 513 and the HLPF 514 are connected in cascade. This juxtaposes the corer 513 and the (1–G) function circuit 515, so that a read-only memory can replace both of them. The G signal will no longer be available to be used as a recorded control signal for use in an adaptive reemphasis circuit as described in U.S. patent application Ser. No. 008,813 filed 25 Jan. 1993. However, the response of the repositioned HLPF 514, or the output signal supplied from the ROM replacing the corer 513 and the (1–G) function circuit 515, can be used as a recorded control signal. The recorded control signal will then have to be appropriately processed for use in the adaptive reemphasis circuit, which processing can be done using a look-up table stored in ROM.

FIG. 30 shows the control signal generator 510 comprising cascade connection of a full-wave rectifier 512, a horizontal lowpass filter (HLPF) 514 and read-only memory (ROM) 516 storing the function F in a look-up table (LUT). The high-band luminance signal $Y_H$ supplied to the rectifier 512 is full-wave rectified and then applied to HLPF 514 which has a break frequency of approximately 1 MHz. The output signal $E_H$ from HLPF 514 provides an accurate representation of the average energy in the luminance high-band signal $Y_H$ over a time period determined by the time constant of HLPF 514. That is, the value of signal $E_H$ represents the average "local" energy of $Y_H$. In broad flat areas, the signal $E_H$ will be at zero, whereas during sharp contrast, high amplitude transitions, the signal $E_H$ will have a high amplitude. The signal $E_H$ is applied as an address to ROM 516, the output signal 1/D of which controls the gain, $\Gamma$, of the deemphasis multiplier 508.

The gain $\Gamma$ transfer function tabulated in the LUT stored in ROM 516 is monotonically decreasing in characteristic, as depicted by the thick line in FIG. 31 where the energy level $E_H$ of the high-band luma $Y_H$ applied to control signal generator 510 is shown along the horizontal axis and the gain $\Gamma$ through multiplier 508 is plotted on the vertical axis. As may be seen in FIG. 31, as the level of the high-band luma increases, the gain $\Gamma$ through modulator 508 correspondingly decreases monotonically, thus providing the deemphasis transfer function $D(Y_H)$ through multiplier 508. The deemphasis amount D is depicted by the thin line in FIG. 31. Optionally, for improved noise performance, at low amplitudes of the high luma component $Y_H$ a coring function may be included in the gain $\Gamma$ transfer function tabulated in the LUT stored in ROM 516 as shown by the diagonally striped area in FIG. 31. The deemphasis gain control signal 1/D, is generated from the memory location in the ROM 516 addressed by $E_H$. If the measured average high luminance band energy $E_H$ is very low or at zero, then the gain $\Gamma$ is set near or equal to unity, passing the high luminance signal $Y_H$ through multiplier 508 without any deemphasis_i.e., with no attenuation. However, when $E_H$ is at a high level, the gain $\Gamma$ is set at a lower value, reducing the gain through multiplier 508 below unity and thereby reducing the effective level of the luminance high-band component passed through multiplier 508 to provide maximum deemphasis. At intermediate values of $E_H$ deemphasis gain control signal $\Gamma$ will assume correspondingly intermediate values between zero and one, and an intermediate deemphasizing of $Y_H$ will thus occur. The effect of this adaptive deemphasis processing is to provide little or no attenuation of the folded luminance high-band components when they are of low amplitude, but to provide significant attenuation when the folded luma highs have a high amplitude. The transfer function stored as a LUT in the ROM 516 may be such as to arrange for logarithmic compression of high-band luma, for example, starting from unity gain at the coring threshold.

FIG. 32 shows an alternative embodiment of the adaptive reemphasis circuit 822, which is similar in its construction to the adaptive deemphasis circuitry shown in FIG. 16. The FIG. 32 adaptive reemphasis circuit is preferred when an adaptive deemphasis circuitry as shown in FIG. 16 is used in the record section, particularly if the adaptive deemphasis circuitry is implemented as shown in FIG. 30. The FIG. 32 adaptive reemphasis circuit is also preferred when adaptive deemphasis and folding circuitry as shown in FIGS. 34 and 35 hereinafter described is used in the record section. The FIG. 32 adaptive reemphasis circuit may advantageously share many common elements with the adaptive deemphasis circuitry or the adaptive deemphasis and folding circuitry.

An input terminal 1100 of the FIG. 32 adaptive reemphasis circuit receives the post-filtered unfolded luminance signal $Y_D^*$ from the output of soft switch 914 shown in FIGS. 9 and 10. The signal $Y_D^*$ is applied to a band-splitting filter with a 2.5 MHz crossover frequency, structurally corresponding to the filters 502 and 504 of FIG. 16. FIG. 32 shows the band-splitting filter configured as in FIG. 34; i.e., as a horizontal lowpass filter (HLPF) 1102 with a 2.5 MHz break frequency and a horizontal highpass filter (HHPF) 1104 with a corresponding 2.5 MHz break frequency. The HHPF 1104 responds to the signal $Y_D^*$ to separate a recovered deemphasized high-band luminance component $Y_{HD}^*$, which corresponds to the deemphasized high-band luminance component $Y_{HD}$ output at the multiplier 508 in the FIG. 16 adaptive deemphasis circuitry during encoding. The deemphasized high-band luminance component $Y_{HD}^*$ is applied to the data input of a reemphasis multiplier 1108 structurally corresponding to the deemphasis multiplier 508 in the FIG. 16 adaptive deemphasis circuitry. $Y_{HD}^*$ is also supplied to the input of a control signal generator 1110. Control signal generator 1110 includes in cascade a rectifier 1112, a horizontal low pass filter (HLPF) 1114 and a ROM 1116 storing a look-up table (LUT), similar to the cascaded rectifier 512, HLPF 514 and ROM 516 in the control signal generator 510 of FIG. 16 and FIG. 30. However, the characteristics of the LUT stored in ROM 1116 for use in the reemphasis processing differ from the characteristics of the LUT stored in ROM 516 used in the deemphasis processing.

FIG. 33 shows characteristics of the LUT stored in ROM 1116 that are complementary to the FIG. 31 LUT characteristics that preferably are stored in ROM 516. The action of control signal generator 1110 corresponds to that of control signal generator 510 in FIG. 30, except that the respective transfer functions of these generators are substantially inverse to one another, as may soon from comparing the characteristic graphs in FIGS. 31 and 33. That is, whereas the deemphasis gain $\Gamma$ transfer function of the LUT stored in ROM 516 is preferably monotonically decreasing for providing luma deemphasis as shown in FIG. 31, the reemphasis gain $\Gamma^*$ transfer function of the LUT stored in ROM 1116 is preferably monotonically increasing as shown in FIG. 33, for providing unity gain through reemphasis multiplier 1108 at lower signal levels of $Y_{HD}^*$ and higher gain through reemphasis multiplier 1108 at higher signal levels of $Y_{HD}^*$. By way of more specific example, when during recording the transfer characteristic described by the LUT stored in ROM 516 provides for logarithmic compression of the high-band luma above a threshold, during playback the transfer function stored characteristic described by the LUT stored in ROM 1116 provides for exponential expansion of the high-band luma above that threshold.

Thus, reemphasis circuit 822 has the adaptive characteristic that in broad flat image areas it provides little or no gain to the deemphasized high-band luma signal $Y_{HD}^*$. This has the resultant effect that a high-frequency luminance component, which was originally at a low level in the wideband video signal input to the encoder (that is, in high-band luma signal $Y_H$ in the adaptive deemphasis and folding circuitry 108) and therefore did not undergo deemphasis during the encoding process, is not subjected to reemphasis during the decoding processing, but is instead passed through multiplier 1108 at substantially unity gain to be supplied at its original amplitude. On the other hand, for those portions of the deemphasized high-band luma signal $Y_{HD}^*$ which correspond to high-frequency, high-amplitude transitions in the original input video signal (that is, in high-band luma signal $Y_H$) and were therefore deemphasized during encoding, the gain through multiplier 1108 is increased to restore these high-frequency lunlinance components to their original level.

The adaptive reemphasis is accomplished by measuring the average energy level (i.e., the average "local" energy) in the deemphasized high-band luma signal $Y_{HD}^*$ by operation of rectifier 1112 and LPF 1114 to derive the average energy signal $E_H^*$ which is applied as an input address to ROM 1116. ROM 1116 then reads out a reemphasis gain control signal $\Gamma^*$ to the gain control data input of multiplier 1108 to control the gain through multiplier 1108, and thereby the amount R of reemphasis performed on the deemphasized high-band luma signal $Y_{HD}^*$. The relation between $E_H^*$, the gain $\Gamma^*$ through multiplier 1108 and the reemphasis amount R is shown in FIG. 33, wherein the gain $\Gamma^*$ is depicted by a heavy line and the reemphasis amount R is shown by a thin line.

Referring back to FIG. 32, the reemphasized unfolded high-frequency luminance component signal $Y_H^*$ output from reemphasis multiplier 1108 is supplied to adder 1106 to be added together with the unfolded low-frequency luminance component $Y_L^*$, and adder 1106 outputs the reconstructed baseband luminance signal $Y^*$ with proper amplitude relationship restored thereto and corresponding to the full-bandwidth luminance signal Y in the encoder. The reconstructed baseband luminance signal Y* is supplied to the luminance input of composite video signal generator 810.

In practice, on the recording side, some amplitude boosting of very low amplitude high-frequency luminance signal components may be done, allowing for some compression during playback, thus improving the S/N ratio in broad flat areas of the image without degrading backward compatibility of the encoded recorded signal. Correspondingly, in the reemphasis circuit 822 of FIG. 33, the control signal generator 1110 may provide a coring function, as by incorporating such a coring function in the transfer characteristic stored in the ROM 1122 as a LUT, as depicted by the shaded area in FIG. 34.

The transfer functions stored in LUT form in the ROMs 516 and 1116 may be modified so that the coring used to suppress noise takes place at lower levels than the coring used to set the level at which deemphasis of highband luma obtains, just as was done in the FIG. 28 reemphasis circuit. The FIG. 31 transfer function used during recording is modified to insert a unity-gain "plateau" extending from the noise coring region to the level at which deemphasis of highband luma obtains. The FIG. 33 transfer function used during playback is also modified to insert a unity-gain "plateau" extending from the noise coring region to the level at which deemphasis of highband luma obtains.

The types of deemphasis and folding circuitry 108 thusfar described are types in which the deemphasis of the luma high frequencies is carried out completely before proceeding with the folding of the luminance spectrum. In a first spectrum folding technique described by Howson and Bell, the video luminance signal spectrum is divided into two equal half-bands by band-splitter filtering, and the upper half-band is used to modulate a sub-carrier which has its frequency set to be near the upper frequency limit of the normal video band. The reversed-spectrum lower sideband of the modulator output is selected and combined with the original lower half-band to generate the folded-spectrum signal. Howson and Bell disfavored this type of spectrum folding because of its requirements for complementary lowpass and bandpass filters to carry out the initial band-splitting. However, since band-splitting is used anyway for carrying out the deemphasis of the luma high frequencies, the inventors perceived that variants of the first spectrum-folding technique described by Howson and Bell might actually prove to be at least as practical as the second spectrum-folding technique described by Howson and Bell, espoused by them, and later adopted by Faroudja. Indeed, such variants might be more practical.

The inventors note that, for reasons of phase linearity, the complementary lowpass and bandpass filters used for band-splitting in the first spectrum-folding technique described by Howson and Bell should be constructed as tapped-delay-line filters if band-splitting of analog signals is to be done. When constructed of reactive elements, complementary lowpass and bandpass analog filters respectively exhibit substantial lag and substantial lead at crossover frequency, making it difficult to achieve correct mid-band phasing when the folded-spectrum luminance signal is unfolded to full bandwidth.

The inventors point out that the complementary lowpass and bandpass filters avoided by Howson and Bell in analog design work have digital homologs that provide the desired complementary lowpass and bandpass responses, but are inexpensive to construct. In both its lowpass and bandpass responses a digital band-splitting filter of finite-impulse-response (FIR) type exhibits linearity of phase response with frequency that gives rise to uniform group delay. Accordingly, the phases of the lowpass and bandpass responses of FIR digital filters are the same at the crossover frequency between those responses.

FIG. 34 is a more detailed block diagram of an embodiment of the deemphasis and folding circuitry 108 illustrated in FIG. 2. This deemphasis and folding circuitry 108 band-splits the motion-adaptively spatio-temporally processed luminance signal in in connection with deemphasizing, preferably performed adaptively, of the amplitude of the high-frequency luminance components and folds the spectrum of the deemphasized high-frequency luminance components into the spectrum of the low-frequency luminance components to produce the band-limited luminance signal for recording. As will be more fully described below, deemphasis and folding circuitry 108 performs band splitting of the luminance signal into low-frequency components and high-frequency components, appropriately de-emphasizes the high-frequency luminance components, and folds the high-frequency luminance components into the spectral bandwidth of the low-frequency luminance components thereby to compress the full-bandwidth luminance information of the input video signal into a narrow frequency band corresponding to the bandwidth of the narrow band video medium.

In the deemphasis and folding circuitry 108 shown in FIG. 34, an input terminal 501 is coupled to the output terminal of the adaptive luminance separator 104 of FIG. 2, that is, to the spatio-temporally processed luminance signal Y output from terminal 215 of soft switch 214 in FIG. 5. Input terminal 501 receives the baseband motion-adaptively spatio-temporally processed luminance signal Y output from soft switch 214 and couples it to an input terminal of a horizontal lowpass filter (HLPF) 502 as well as an input terminal of a horizontal highpass filter (HHPF) 504. HLPF 502 and HHPF 504 may be designed to have their −6 dB points each at approximately 2.5 MHz to correspond to one-half the folding frequency. HLPF 502 and HHPF 504 are then configured to form a band-splitting filter with a 2.5 MHz crossover frequency, with HLPF 502 supplying the low-frequency luminance component (low-band luma) signal $Y_L$ below 2.5 MHz and with HHPF 504 supplying the high-frequency luminance component (high-band luma) signal $Y_H$ above 2.5 MHz.

The low-band luma signal $Y_L$ output of HLPF 502 is coupled to a first input terminal of an adder 506. The high-band luma signal $Y_H$ output of HHPF 504 is coupled to a signal input terminal of a first multiplier 508 which performs a deemphasis operation thereon, and also to an input terminal of a control signal generator 510 which controls The operation of the deemphasis multiplier 508. The control signal generator 510 generates a deemphasis gain control signal, which is coupled to a gain data input terminal of deemphasis multiplier 508. The control signal generator 510 by way of example can be of the type shown in FIG. 30, with a ROM 516 therein storing a look-up table for the function Γ as shown in FIG. 31. The deemphasis amount D corresponds inversely to the amount of gain Γ through multiplier 508 for $Y_H$. I.e., $D=\Gamma^{(-1)}$, and $\Gamma=D^{(-1)}$. Control signal generator 510 and deemphasis multiplier 508 form a deemphasis section for deemphasizing, that is, attenuating, the amplitude of the high-frequency luminance component signal $Y_H$. Deemphasis processing of high-band luma $Y_H$ in multiplier 508 produces a deemphasized high-frequency luminance signal $Y_{HD}$.

An amplitude modulator 524 is used to fold the frequency spectrum of $Y_{HD}$ over in frequency, to form a reversed frequency spectrum translated in frequency so as to reside in a low-band extending downward from 2.5 MHz. This reversed frequency spectrum is suitable for spectrally interleaving with the low-band luminance signal $Y_L$. A modulation clock input terminal 526 of the amplitude modulator 524 is coupled to a source (not shown) of a folding carrier signal having a frequency $2f_F$ that is at the top of the frequency spectrum of $Y_{HD}$ (e.g., about 5 MHz), which folding carrier signal is phase-shifted from field to field to implement a form of amplitude modulation referred to as 4-field offset modulation. The folding carrier signal is modulated by the deemphasized high-band luminance output signal $Y_{HD}$ supplied to a data input terminal of the folding modulator 524 thereby generating a shifted-in-frequency deemphasized high-band luminance signal $Y_{HDF}$ with a reversed frequency spectrum residing in a low-band extending downward from 2.5 MHz. The shifted deemphasized high-band luminance signal $Y_{HDF}$ is then supplied to the other input of adder 506, to be added back into the baseband of the low-frequency luminance component $Y_L$ to thereby produce the interleaved band-limited folded luminance signal $Y_F$ (e.g., having a bandwidth 2.5 MHz) that can be accommodated by the narrow luminance component recording bandwidth of a conventional VCR (e.g., a VHS VCR).

In digital circuitry embodying the invention in certain of its aspects, the folding carrier of frequency $2f_F$ is supplied to the amplitude modulator 524 in digitized, sampled-data form. Modulator 524 may be a standard four quadrant multiplier, or preferably, if the sampling frequency $f_S$ is properly selected, a +1,−1 type modulator. Since the signal $Y_{HD}$ is randomly phased respective to the folding carrier of frequency $2f_F$, in order to meet the Nyquist sampling criterion in the amplitude modulator 524 a sampling rate fs of at least $4f_F$ is required for the signal $Y_{HD}$ and the folding carrier. Choosing the sampling rate fs to be exactly $4f_F$ allows the folding of the deemphasized high luminance signal $Y_{HD}$ about a folding frequency $f_F$ one-half the folding carrier frequency $2f_F$ to be carried out in modulator 524 by a +1,−1 type modulation operation. A +1,−1 type modulator modulates a sampled signal by a frequency equal to one-half the sampling frequency by arithmetically negating every other sample. For example, if the sampling frequency is selected to be at about 10 MHz, then the folding frequency will be about 5 MHz, with the actual frequency selected so as to satisfy the above criteria relating to vertical and temporal spectral distance from vertical and temporal DC. The output signal contains a component of one-half the sampling frequency, and upper and lower sidebands centered around +½ and −½ the sampling frequency containing the spectral information contained in the input signal. Thus the +1,−1 amplitude modulation will shift (i.e., alias) the high-band luma $Y_H$ to a −½ lower sideband in the 2.5 MHz bandwidth of the low-band luma $Y_L$.

As shown in FIG. 35, the amplitude modulator 524 of FIG. 34 may be implemented using a multiplexer (MUX) 528 and an arithmetic negator 530. The signal $Y_{HD}$ supplied by the data output terminal of the deemphasis multiplier 508 is applied both to an input terminal of the amplitude modulator 524 and to a first data input terminal of the MUX 528. An output terminal of the arithmetic negator 530 is coupled to a second data input terminal of the multiplexer 528. An output terminal of the multiplexer 528 is coupled to an input terminal of the adder 506. A folding clock signal, which has a frequency equal to one-half the sampling clock frequency, is coupled to the control input terminal 532 of the multiplexer. This signal alternates between a logic "1" value and a logic "0" value at the sampling frequency, and may be generated by a flip-flop coupled to the sampling clock signal.

In operation, when the folding clock signal is a logic "1" signal, then the multiplexer 528 couples the non-negated (+1) signal from the input terminal to its output terminal. When the folding clock signal is a logic "0" signal, then the multiplexer couples the negated (−1) signal from the arithmetic negator 530 to its output terminal. In this fashion, a (+1,−1) modulated signal is reproduced. The lower sideband of the modulated signal contains a spectral image of the deemphasized high-band luminance signal $Y_{HD}$ that is in reversed spectrum form. That is, the deemphasized high-band luminance signal $Y_{HD}$ is folded about the folding frequency such that the lower frequency components of the deemphasized luminance high-band frequencies are folded into the bandwidth below 2.5 MHz, and the higher frequency components of the deemphasized high-band luminance frequencies of 4.2 MHz, for example, are folded into the neighborhood of 800 kHz, thus producing the folded deemphasized high-band luminance signal $Y_{HDF}$.

The folded deemphasized high-band luminance signal $Y_{HDF}$ is then combined with the low-band luminance signal $Y_L$ in the adder 506. The adder 506 supplies the composite folded luminance signal $Y_F$ which contains the luminance information of the input luminance wide baseband signal Y compressed within a folded bandwidth of 2.5 Mhz, thus making it possible to transmit the 4.2 MHz NTSC baseband luminance information via a narrow 2.5 MHz bandwidth medium such as by a conventional narrow bandwidth format VCR and videocassette.

The folded luminance signal $Y_F$ may then be supplied to a record equalization section 522, as shown in FIG. 35, where the signal is equalized prior to digital-to-analog conversion, to pre-compensate for loss in the tape path and to compensate for encoder processing losses. This equalization boosts the frequencies around the 2.5 MHz region to compensate for the signal attenuation characteristic in the band split region of the deemphasis circuit band splitting filter, for example. The folded luminance signal $Y_F$ from the folding section 108 is then supplied to the DAC 110 as shown in FIG. 2 to be converted to an analog luminance signal $Y_R$ that frequency modulates the luma carrier, and is ultimately recorded onto videotape by the VCR 40 of FIG. 1.

FIG. 36 shows a modification of the FIG. 34 deemphasis and folding circuitry, in which modification elements corresponding to those in FIG. 34 are designated with like reference numerals. In FIG. 34 the luminance high-band signal $Y_H$ is adaptively deemphasized prior to folding modulation and addition with the low-band luma signal $Y_L$. In the FIG. 36 deemphasis and folding circuitry an equivalent result is effected by reversing the order of the multiplier 508 and modulator 524 from that shown in FIG. 34. In FIG. 36 the luma high-band signal $Y_H$ is folded in the folding modulator 524 and then the folded high-band output signal $Y_{HF}$ from the folding modulator 524 is adaptively deemphasized in the deemphasis multiplier 508.

In the combined adaptive deemphasis and folding circuitry shown in FIGS. 34 and 36 the modulator 524 performs the folding operation only upon the high-band luminance component signal. The image of the high-band luminance component signal folded into the DC to 2.5 MHz frequency range as a reversed spectrum has an image in the 7.5–10 MHz range, which image has a non-reversed spectrum. The 3–8 MHz range is essentially free of signal. Referring back to FIG. 2, the image in the 7.5–10 MHz range is suppressed by the sampling clock rejection lowpass filter of the digital-to-analog converter 110 preceding the VCO 120 that modulates the frequency of the luma carrier with the folded luminance signal, assuming the digital sampling rate is chosen to be about 10 MHz. Unless one wishes to suppress noise in the range immediately above 2.5 MHz in the output signal from the folding section 108, it is not necessary to follow the adder 506 with a lowpass filter cutting off at the folding frequency. The cut-off frequency of the sampling clock rejection lowpass filter associated with the DAC 110 can be below the $2f_F$ folding carrier frequency so as to suppress that carrier (or remnants of it where the carrier is suppressed by the modulator 524 being of balanced nature), but at the same time being well above the 2.5 MHz folding frequency $f_F$ so as not to lose energy in the region of the folding frequency $f_F$. This contrasts with the second type of folding procedure as described by Howson and Bell and as implemented both by them and by Faroudja where a lowpass filter cutting off at the folding frequency $f_F$ is used. As will be described below, the second type of folding procedure can be modified so the lowpass filter cuts off at a frequency somewhat higher than the folding frequency $f_F$, but it is desirable that a lowpass filter be used after the combining of the normal-spectrum and reversed-spectrum luma signals or artifacts caused by spurious horizontal high frequencies are noticeable in an image played back from tape.

In the folding circuit embodiments shown in FIGS. 34 and 36 employing in the deemphasis processing a band-splitting filter as thusfar described, the bandwidth of the compatibly-recorded luminance signal $Y_R$ extends only to around 2.5 MHz (i.e., the upper limit of the low-band luma out of the band splitting filter), while the luma frequencies above 2.5 MHz are carried in the folded signal. This limiting of the recorded luminance bandwidth is of no significant consequence when the recorded signal is reproduced by a playback apparatus including (in accordance with an aspect of the present invention) a decoder for unfolding the compatibly encoded recorded folded luminance signal and reconstructing a wide bandwidth luminance signal therefrom. In such playback apparatus the folded luminance frequencies extending beyond 2.5 MHz are recovered in playback decoding, so as to display an image having full horizontal resolution. However, when playing back the compatibly encoded recording on a conventional playback apparatus lacking such a decoding facility, the displayed horizontal resolution is limited by the limited bandwidth of the reproduced luminance signal, since the higher luma frequencies carried in the folded signal are not recovered.

FIG. 37 shows a modification that can be made to the FIG. 34 or FIG. 36 adaptive deemphasis and folding circuit. The HLPF 502 and HHPF 504 forming the band-splitting filter in FIGS. 34 and 36 are replaced respectively by a horizontal lowpass filter (HLPF) 1502 which may have its characteristics selected to provide a –6 dB response at around 3 MHz, and a vertical highpass filter (VHPF) 1504 providing a –6 dB response at 2 MHz, with both HLPF 1502 and VHPF 1504 receiving the input luminance signal Y. HLPF 1502 and HHPF 1504 together perform a band-splitting function, however, their respective output signals $Y_L'$ and $Y_H'$ are not substantially within abutting half- or split-bands but rather are in respective bands that substantially overlap each other in frequency by 1 MHz or so. The high-band luma signal $Y_H'$ from HHPF 1504 is adaptively deemphasized and heterodyned with the folding carrier by adaptive deemphasis and folding circuitry 1560, which can take a form similar to that in FIG. 34 or in FIG. 36. Circuitry 1560 responds to the high-band luma signal $Y_H'$ to provide a band-shifted deemphasized high-frequency luma signal $Y_{HFD}'$ to the adder 1506 for combining with the low-band luma signal $Y_L'$. The sum output signal from the adder 1506 is a folded luma signal $Y_F'$ supplied to VCR 40 of FIG. 1.

Because the low-band luminance signal $Y_L'$ from HLPF 1502 has a bandwidth extending up to approximately 3 MHz, so also the folded luminance signal $Y_F'$ will have a bandwidth extending to approximately 3 MHz at the high end. I.e., its frequency characteristic will be 6 dB down at 3 MHz, thereby providing the advantage of the folded luminance signal $Y_F'$ having approximately 0.5 MHz greater bandwidth over the folded luminance signal $Y_F$ output by the folding circuitry previously described. Thus, the recorded luminance signal $Y_R'$ will contain the low-band luminance components up to 3 MHz, as well as the band shifted high luminance frequencies above 2 MHz folded within the limited bandwidth occupied by the low-frequency luminance components. Accordingly, the folded limited-bandwidth luminance signal $Y_F$, when recorded and then reproduced by conventional narrow bandwidth playback apparatus lacking a facility for recoloring the folded high-frequency luminance component will provide greater horizontal resolution than will the folded limited-bandwidth luminance signal $Y_F$ provided by the folding circuitry previously described, offering the advantage of higher horizontal resolution in compatible playback.

Additional advantages of the use of HLPF 1502 and VHPF 1504 in the folding circuit of FIG. 37 are that both the low and high bands have full energy in the 2.5 MHz region, reducing or avoiding the need for equalization of the folded luminance signal $Y_F'$ prior to recording. Having both the low and high bands have full energy in the 2.5 MHz region is desirable when unfolding during playback. The folded luminance signal $Y_F'$ can be lowpass filtered with an FIR filter 6 dB down at 2.5 MHz, then unfolded without incurring in the 2.5 MHz crossover region a dip in energy or a distortion of phasing.

While HLPF 1502 and VHPF 1504 can be constructed so as to share the same tapped delay line for the folded luminance signal $Y_F'$, the two filters will have to use different-amplitude weighting coefficients; so their weighted summation networks will, at least for the most part, have to be separate from each other.

FIG. 38 shows adaptive deemphasis processing according to an aspect of the present invention being applied to a folding system in which folding is performed on the baseband luminance signal Y, as in the second type of folding procedure described by Howson and Bell. The baseband luminance signal Y is applied to one input of an adder 550 and also to an adaptive deemphasis circuit 560, where the high-frequency luminance component is adaptively deemphasized with a monotonically decreasing transfer function. The deemphasized baseband luminance signal is then applied to folding modulator 570, where it is shifted as by +1, –1 multiplexing in accordance with a folding clock as described above, and the deemphasized shifted baseband luminance signal is then applied to the other input of adder 550 to be combined with the input baseband luminance signal. The interleaved luminance signal from adder 550 is then passed through a horizontal lowpass filter 580, then converted to analog form and recorded as previously described. The HLPF 580 can be designed to have a cut-off frequency just above the folding frequency $f_F$ of 2.5 MHz as described by Howson and Bell or by Faroudja.

However, it is preferred by the present inventors to extend the response of the HLPF 580 so the recorded luminance signal $Y_R'$ will contain the low-band luminance components up to 3 MHz, as well as the band shifted high luminance frequencies above 2 MHz folded within the limited bandwidth occupied by the low-frequency luminance components. This offers the advantage of higher horizontal resolution in compatible playback on a conventional VHS VCR or VCP. Also, when playing back on a VCR or VCP having unfolding circuitry, the folded luminance signal $Y_F'$ can be lowpass filtered with an FIR filter 6 dB down at 2.5 MHz, then unfolded without incurring in the 2.5 MHz crossover region a dip in energy or a distortion of phasing.

A number of other folding and unfolding circuits suitable for use together with the adaptive deemphasis and reemphasis circuitry embodying aspects of the invention are decribed by C. H. Strolle et alii in U.S. patent application Ser. No. 819,890 filed 13 Jan. 1992. entitled DIGITAL MODULATORS FOR USE WITH SUB-NYQUIST SAMPLING OF RASTER-SCANNED SAMPLES OF IMAGE INTENSITY, and incorporated herewithin.

Alternatively, folded-spectrum signals can be formed by subtractively combining a reversed-frequency-spectrum signal with a non-reversed-frequency-spectrum, or normal-frequency-spectrum, signal as well as by additively combining such signals. Reversing of the polarity of the signal modulating the folding carrier may alternatively or additionally be done. Reversing of the polarity of the signal the folding carrier may alternatively or additionally be done. These various procedures only invert the phase of the reversed-frequency-spectrum signal and do not affect the amplitude of its frequency spectrum. A similar variety of ways to invert the phase of the reversed-frequency-spectrum signal during unfolding also are possible. Modifications of this sort of the embodiments of the invention described above are considered to be further embodiments of the invention. In the claims which follow, the term "means for linearly combining" is to be regarded to be a generic term including within its scope both adders and subtracters, with or without weighting of signal inputs before adding or subtracting.

Deemphasis and subsequent reemphasis of high-energy reversed-spectrum components of the reversed-spectrum components of a folded video signal is described above with particular attention to a modified video recording/playback system for recording magnetic tape cassettes in substantial accordance with the VHS standard. One skilled in the ad and acquainted with the foregoing disclosure will be enabled to design other video processing systems improved by embodying the invention in its various aspects, and this should be borne in mind when construing the scope of the claims which follow.

Appendix

The specification and drawing of U.S. patent application Ser. No. 008,813 filed 25 Jan. 1993 by C. H. Strolle et alii, entitled ADAPTIVE DEEMPHASIS AND REEMPHASIS OF HIGH FREQUENCIES IN VIDEO TAPE RECORDING, UTILIZING A RECORDED CONTROL SIGNAL, and assigned to Samsung Electronics Co., Ltd., are appended hereto for purposes of incorporation into the foregoing specification.

The specification and drawing of U.S. patent application Ser. No. 819,890 filed 13 Jan. 1992 by C. H. Strolle et alii, entitled DIGITAL MODULATORS FOR USE WITH SUB-NYQUIST SAMPLING OF RASTER-SCANNED SAMPLES OF IMAGE INTENSITY, and assigned to Samsung Electronics Co., Ltd., are appended hereto for purposes of incorporation into the foregoing specification.

What is claimed is:

1. A recording system for recording on a recording medium a representation of a luminance signal received for recording, said recording system comprising:

means, responding to said luminance signal received for recording, for producing a control signal indicative of a desired amount of reduction of a high-frequency portion of said luminance signal vis-a-vis a low-frequency portion of said luminance signal during recording;

means for reducing the level of the high-frequency portion of said luminance signal by said desired amount in response to said control signal, thereby to generate a luminance signal with deemphasized high frequencies; and means for recording on said medium said luminance signal with deemphasized high frequencies, wherein said means for producing a control signal comprises:

means for separating from said luminance signal received for recording a high-frequency portion thereof;

a rectifier connected for generating a rectified response to said high-frequency portion separated from said luminance signal;

a threshold circuit connected for responding only to those portions of said rectified response exceeding said threshold level; and a lowpass filter connected for producing said control signal in response to the response of said threshold circuit, for reducing the level of the high-frequency portion of said luminance signal only if the level of said separated high-frequency portion exceeds a predetermined threshold level.

2. A recording system, as set forth in claim 1, wherein said means for separating said high-frequency portion from said luminance signal received for recording comprises a highpass filter.

3. A recording system, as set forth in claim 1, wherein said control signal has an amplitude indicative of said desired amount of reduction of the high-frequency portion of said luminance signal vis-a-vis its low-frequency portion, and wherein said means for reducing the level of the high-frequency portion of said luminance signal includes:

means for generating a multiplier signal having an amplitude that varies in response to said control signal, growing smaller with increase in said control signal and growing larger with decrease in said control signal;

means for multiplying the separated high-frequency portion of said luminance signal by said multiplier signal, thereby to generate a product signal;

means for separating from said luminance signal received for recording a low-frequency portion thereof; and means for additively combining with said product signal the separated low-frequency portion of said luminance signal received for recording, thereby to generate said luminance signal with deemphasized high frequencies.

4. A recording system as set forth in claim 3 wherein said means for generating a multiplier signal essentially consists of:

means for subtracting said control signal from a prescribed level for generating said multiplier signal.

5. A recording system as set forth in claim 4 wherein said means for separating from said luminance signal received for recording a low-frequency portion thereof comprises, in addition to said means for separating from said luminance signal received for recording a high-frequency portion thereof, means for differentially combining said luminance signal received for recording and said separated high-frequency portion thereof.

6. A recording system as set forth in claim 1, in combination with a reproducing system for reproducing said luminance signal from said representation thereof recorded on said recording medium, said reproducing system comprising:

means for recovering from said medium said luminance signal with deemphasized high frequencies; and means for boosting the level of the high-frequency portion of the recovered luminance signal with deemphasized high frequencies, thereby to reproduce said luminance signal as received for recording.

7. A combination as set forth in claim 6, wherein in said reproducing system said means for boosting the level of the high-frequency portion of said luminance signal with deemphasized high frequencies comprises:

means for separating the low-frequency and high-frequency portions of said recovered luminance signal with deemphasized high frequencies from each other;

means for coring the separated high-frequency portion of said recovered luminance signal;

means for boosting the level of said cored high-frequency portion of said recovered luminance signal by a scaling factor, thereby to generate reemphasized luminance high-frequencies; and means for additively combining said reemphasized luminance high-frequencies with the separated low-frequency portion of said recovered luminance signal, thereby to reproduce said luminance signal as received for recording.

8. A combination as set forth in claim 6, wherein in said reproducing system said means for boosting the level of the high-frequency portion of said luminance signal with deemphasized high frequencies comprises:

means for separating from said recovered luminance signal with deemphasized high frequencies the high-frequency portion thereof;

means for coring the separated high-frequency portion of said recovered luminance signal, thereby to generate a cored response to the high-frequency portion of said recovered luminance signal; and means for additively combining with said recovered luminance signal said cored response to the high-frequency portion of said recovered luminance signal, thereby to reproduce said luminance signal as received for recording.

9. A recording system for recording on a recording medium representations of a full-spectrum luminance signal received for recording, said recording system comprising:

means for separating from said luminance signal received for recording an upper-frequency portion thereof that comprises those spectral components in an upper-frequency band extending above a crossover frequency;

a rectifier connected for generating a rectified response to said upper-frequency portion separated from said luminance signal received for recording;

a threshold circuit connected for responding only to those portions of said rectified response exceeding a threshold level;

a lowpass filter connected for producing in response to the response of said threshold circuit a control signal, which control signal is dependent on the amount the level of said upper-frequency portion exceeds a predetermined threshold level;

means for generating a folded-spectrum luminance signal that occupies just a lower-frequency band extending below a crossover frequency, which means includes means for translating said upper-frequency portion of said full-spectrum luminance signal received for recording into the lower-frequency band also occupied by a lower-frequency portion of said full-spectrum luminance signal received for recording, thereby generating a folded luminance signal;

means responsive to said control signal for reducing in said folded luminance signal the level of that portion of said full-spectrum luminance signal which is translated from the upper-frequency band into the lower-frequency band, vis-a-vis those portions of said full-spectrum luminance signal which originally are in the lower-frequency band; and means for recording on said medium said folded luminance signal.

10. A recording system, as set forth in claim 9, wherein said means for separating from said luminance signal received for recording an upper-frequency portion thereof comprises a highpass filter.

11. A system for recording as set forth in claim 9 in combination with a reproducing system for recovering during play back from said recording medium a replica of said full-spectrum luminance signal received for recording, which said reproducing system comprises:

means for recovering from said medium said folded luminance signal;

means for unfolding said folded luminance signal to generate an unfolded luminance signal; and means for generating in response to said unfolded luminance signal said replica of said full-spectrum luminance signal received for recording, which said means for generating includes means for boosting the level of the upper-frequency portion of said unfolded luminance signal as it appears in said replica of said full-spectrum luminance signal received for recording.

12. A combination as set forth in claim 11, wherein in said reproducing system said means for boosting the level of the upper-frequency portion of said unfolded luminance signal comprises:

means for separating the lower-frequency and upper-frequency portions of said unfolded luminance signal from each other;

means for coring the separated high-frequency portion of said unfolded luminance signal;

means for boosting the level of said cored high-frequency portion of said unfolded luminance signal by a scaling factor, thereby to generate reemphasized luminance high-frequencies; and means for additively combining said reemphasized luminance high-frequencies with the separated low-frequency portion of said unfolded luminance signal, thereby to generate said replica of said full-spectrum luminance signal received for recording.

13. A combination as set forth in claim 11, wherein in said reproducing system said means for boosting the level of the upper-frequency portion of said unfolded luminance signal comprises:

means for separating from said unfolded luminance signal the upper-frequency portion thereof;

means for coring the separated upper-frequency portion of said unfolded luminance signal, thereby to generate a cored response to the high-frequency portion of said unfolded luminance signal; and means for additively combining with said unfolded luminance signal said cored response to the upper-frequency portion of said unfolded luminance signal, thereby to generate said replica of said full-spectrum luminance signal received for recording.

14. A recording system for recording on a recording medium representations of a full-spectrum luminance signal received for recording said recording system comprising:

a band-separation filter responding to said luminance signal received for recording for separating lower-frequency and upper-frequency portions thereof, said lower-frequency portion comprising only those spectral components in a lower-frequency band extending up to a crossover frequency, and said upper-frequency portion comprising only those spectral components in an upper-frequency band extending above a crossover frequency;

a rectifier connected for generating a rectified response to said upper-frequency portion separated from said luminance signal received for recording;

a threshold circuit connected for responding only to those portions of said rectified response exceeding a threshold level;

a lowpass filter connected for producing in response to the response of said threshold circuit a control signal, which control signal is dependent on the amount the level of said upper-frequency portion exceeds a predetermined threshold level;

means responsive to said control signal for generating a multiplier signal the amplitude of which grows smaller in response to increase in said control signal and grows larger in response to decrease in said control signal;

means for multiplying by said multiplier signal the separated upper-frequency portion of said luminance signal received for recording, thereby to generate a product signal;

means for additively combining said product signal with the separated lower-frequency portion of said luminance signal received for recording, thereby to generate a full-spectrum luminance signal with deemphasized high frequencies;

means, responsive to said full-spectrum luminance signal with deemphasized high frequencies, for generating a folded-spectrum luminance signal that occupies just a lower-frequency band extending below said crossover frequency, which means includes means for translating said upper-frequency portion of said full-spectrum luminance signal with deemphasized high frequencies into the lower-frequency band also occupied by a lower-frequency portion of said full-spectrum luminance signal with deemphasized high frequencies, thereby generating a folded luminance signal; and means for recording on said medium said folded luminance signal.

15. A recording system, as set forth in claim 14, wherein said band-separation filter comprises:

a highpass filter responding to said luminance signal received for recording for separating the upper-frequency portion thereof; and means for supplying a differential response to said luminance signal received for recording and the separated upper-frequency portion thereof, said differential response corresponding to the separated lower-frequency portion of said luminance signal received for recording.

16. A recording system, as set forth in claim 14, wherein said means responsive to said control signal for generating a multiplier signal essentially consists of:

means for subtracting said control signal from a prescribed level for generating said multiplier signal.

17. A system for recording as set forth in claim 14 in combination with a reproducing system for recovering during play back from said recording medium a replica of said full-spectrum luminance signal received for recording, which said reproducing system comprises:

means for recovering from said medium said folded luminance signal;

means for unfolding said folded luminance signal to generate an unfolded luminance signal; and means for generating in response to said unfolded luminance signal said replica of said full-spectrum luminance signal received for recording which said means for generating includes means for boosting the level of the upper-frequency portion of said unfolded luminance signal as it appears in said replica of said full-spectrum luminance signal received for recording.

18. A combination as set forth in claim 17, wherein in said reproducing system said means for boosting the level of the upper-frequency portion of said unfolded luminance signal comprises:

means for separating the lower-frequency and upper-frequency portions of said unfolded luminance signal from each other;

means for coring the separated high-frequency portion of said unfolded luminance signal;

means for boosting the level of said cored high-frequency portion of said unfolded luminance signal by a scaling factor, thereby to generate reemphasized luminance high-frequencies; and means for additively combining said reemphasized luminance high-frequencies with the separated low-frequency portion of said unfolded luminance signal, thereby to generate said replica of said full-spectrum luminance signal received for recording.

19. A combination as set forth in claim 17, wherein in said reproducing system said means for boosting the level of the upper-frequency portion of said unfolded luminance signal comprises:

means for separating from said unfolded luminance signal the upper-frequency portion thereof;

means for coring the separated upper-frequency portion of said unfolded luminance signal, thereby to generate a cored response to the high-frequency portion of said unfolded luminance signal; and means for additively combining with said unfolded luminance signal said cored response to the upper-frequency portion of said unfolded luminance signal, thereby to generate said replica of said full-spectrum luminance signal received for recording.

* * * * *